United States Patent [19]
Oka et al.

[11] Patent Number: 5,976,297
[45] Date of Patent: Nov. 2, 1999

[54] TRANSPARENT FUNCTIONAL MEMBRANE CONTAINING FUNCTIONAL ULTRAFINE PARTICLES, TRANSPARENT FUNCTIONAL FILM, AND PROCESS FOR PRODUCING THE SAME

[75] Inventors: Motohiro Oka; Mitsuru Tsuchiya; Norinaga Nakamura; Kiyotaka Takematsu; Yurie Ota; Hiroko Suzuki; Natsuko Yamashita; Hiroomi Katagiri; Hiroshi Yamada; Toshio Yoshihara, all of Tokyo-To, Japan

[73] Assignee: Dai Nippon Printing Co., Ltd., Japan

[21] Appl. No.: 08/897,689

[22] Filed: Jul. 21, 1997

Related U.S. Application Data

[62] Division of application No. 08/352,129, Dec. 1, 1994, Pat. No. 5,747,152.

[30] Foreign Application Priority Data

| Dec. 2, 1993 | [JP] | Japan | 5-338941 |
| Dec. 2, 1993 | [JP] | Japan | 5-338942 |
| Aug. 31, 1994 | [JP] | Japan | 6-230801 |
| Sep. 30, 1994 | [JP] | Japan | 6-261119 |
| Oct. 20, 1994 | [JP] | Japan | 6-281198 |

[51] Int. Cl.⁶ .......... B44C 1/165; B32B 31/00; B32B 5/16; G02F 1/1335
[52] U.S. Cl. .......... 156/241; 156/247; 156/287; 428/328; 349/137; 349/162
[58] Field of Search .......... 156/230, 233, 156/237, 238, 240, 241, 247, 287; 428/195, 212, 332, 328; 349/127, 137, 162

[56] References Cited

U.S. PATENT DOCUMENTS

| 4,409,285 | 10/1983 | Swerdlow | 428/332 |
| 4,590,117 | 5/1986 | Taniguchi et al. | 428/212 |
| 4,753,516 | 6/1988 | Doi et al. | 350/321 |
| 4,904,525 | 2/1990 | Taniguchi et al. | 428/328 |
| 4,956,227 | 9/1990 | Hirayama et al. | 428/331 |
| 5,178,955 | 1/1993 | Aharoni et al. | 428/421 |
| 5,189,337 | 2/1993 | Endo et al. | 313/479 |
| 5,200,255 | 4/1993 | Matsubara et al. | 428/212 |
| 5,238,736 | 8/1993 | Tseng et al. | 428/327 |
| 5,283,105 | 2/1994 | Groner et al. | 428/195 |
| 5,387,463 | 2/1995 | Nakamura et al. | 428/327 |
| 5,462,806 | 10/1995 | Konishi et al. | 428/451 |

FOREIGN PATENT DOCUMENTS

| 0 278 060 A2 | 8/1988 | European Pat. Off. . |
| 0 278 060 A3 | 8/1988 | European Pat. Off. . |
| 278 060 | 8/1988 | European Pat. Off. . |
| 0 404 111 A2 | 12/1990 | European Pat. Off. . |
| 0 404 111 A3 | 12/1990 | European Pat. Off. . |
| 0 518 687 A1 | 12/1992 | European Pat. Off. . |
| 0 539 099 A2 | 4/1993 | European Pat. Off. . |
| 1 390 605 | 4/1975 | United Kingdom . |
| 2 255 044 | 10/1992 | United Kingdom . |

Primary Examiner—Richard Crispino
Assistant Examiner—J. A. Lorengo
Attorney, Agent, or Firm—Parkhurst & Wendel, L.L.P.

[57] ABSTRACT

The present invention provides a transparent functional film comprising a transparent plastic substrate film and a hard coat layer provided thereon, wherein functional ultrafine particles are present in a highly localized form, thereby enabling the functional ultrafine particles to effectively exhibit their function and, at the same time, the hard coat layer to have a good adhesion to the functional ultrafine particle layer; and also an antireflection film and processes for producing the transparent functional film and the antireflection film.

A functional ultrafine particle layer 2 is formed on a release film 1. Separately, a resin composition for a hard coat layer is coated on a transparent plastic substrate film 3. The coated release film is laminated by press bonding to the coated transparent plastic substrate film so that the functional ultrafine particle layer 2 faces the resin composition coating, thereby causing part of the functional ultrafine particles 5 to be embedded in the resin composition coating for a hard coat layer. The resultant laminate is cured, and the release film 1 is then peeled off. In the resultant transparent functional film, the functional ultrafine particle layer 2 is partly embedded in and fixed to the hard coat layer 4, and the functional ultrafine particles 5 are localized in the hard coat layer 4 on its surface side.

18 Claims, 19 Drawing Sheets

BACK LIGHT

BACK LIGHT

BACK LIGHT

TRANSPARENT FUNCTIONAL MEMBRANE CONTAINING FUNCTIONAL ULTRAFINE PARTICLES, TRANSPARENT FUNCTIONAL FILM, AND PROCESS FOR PRODUCING THE SAME

This is a Division of application Ser. No. 08/352,129 filed Dec. 1, 1994, now U.S. Pat. No. 5,747,152.

BACKGROUND OF THE INVENTION

The present invention relates to a transparent functional membrane wherein functional ultrafine particles having various functions, such as a UV screening effect, an antistatic effect, and an antireflection effect, are localized in a coating, particularly localized and fixed in a coating on its surface layer in contact with or near air, thereby enabling the functions of the functional ultrafine particles to be developed, a transparent functional film, and a process for producing the same. Further, the present invention relates to an antireflection film comprising the above transparent functional film having an antireflection effect, and a process for producing the same.

It is known that a transparent functional film having functions, such as a UV screening property, an antistatic property, or an antireflection property, can be produced by coating on a transparent plastic substrate film a transparent resin composition with functional ultrafine particles having particular properties, such as a UV screening effect, an antistatic effect, and an antireflection effect, being dispersed therein, thereby forming a functional coating.

Further, it is also known that, in order to impart additional properties, such as scratch resistance and chemical resistance, to the above transparent functional film, a transparent functional film having a hard property can be produced by forming as an intermediate layer a hard coat layer of, for example, an ionizing radiation curing resin on a transparent plastic substrate film and coating thereon a transparent resin composition with functional ultrafine particles being dispersed therein.

In the transparent functional film containing the above functional ultrafine particles, the functional ultrafine particles are present in a dispersed form in a transparent functional membrane due to the nature of the process. The incorporation of a larger amount of functional ultrafine particles in the membrane can further enhance the function of the functional ultrafine particles. In this case, however, the filling ratio of the functional ultrafine particles dispersed in the resin should be increased, making it difficult to form a film. Further, the transparent functional film having a hard coat layer of an ionizing radiation curing resin or the like has a problem that the adhesion between the hard coat layer and the transparent functional membrane is so low that the transparent functional membrane is likely to peel off.

DISCLOSURE OF THE INVENTION

The present invention can be divided into three groups A, B, and C which will now be described one by one.

Invention Belonging to Group A

An object of the present invention belonging to group A is to provide a transparent functional membrane, wherein functional ultrafine particles are localized in a high density as a functional ultrafine particle layer in a hard coat layer, thereby enabling the functions of the functional ultrafine particles to be developed and, at the same time, the hard coat layer and the functional ultrafine particles to have excellent adhesion to each other, a transparent functional film, an antireflection film, and process for producing the same.

Another object of the present invention is to provide an antireflection film comprising a transparent functional film having an antireflection effect and a process for producing the same.

The first transparent functional membrane of the present invention comprises a hard coat layer and functional ultrafine particles localized in and fixed to said hard coat layer on the side of at least one surface thereof in contact with an external atmosphere.

The second transparent functional membrane comprises a hard coat layer and functional ultrafine particles localized in and fixed to said hard coat layer on the side of at least one surface thereof in contact with an external atmosphere, a thin film of said hard coat layer being absent in the functional ultrafine particles in their portions in contact with an air layer (an external atmosphere) to cause part of the functional ultrafine particles to be exposed particularly on the hard coat layer.

The transparent functional films of the present invention respectively comprise the first and second transparent functional membranes each formed on a transparent plastic substrate film.

The first process for producing the first and second transparent functional films comprises the steps of: (1) forming a layer of functional ultrafine particles on a release film; (2) coating on a transparent plastic substrate film a resin composition for a hard coat layer; (3) laminating, by press-bonding, the coated transparent plastic substrate film prepared in said step (2), as such, when said resin composition for a hard coat layer contains no solvent, or after removing a solvent when said resin composition for a hard coat layer contains a solvent as a diluent, to the coated release film prepared in said step (1) so that the layer of functional ultrafine particles on the release film faces the resin composition coating for a hard coat layer on said transparent plastic substrate film, thereby causing said layer of functional ultrafine particles to be entirely or partly embedded in said resin composition coating for a hard coat layer; and (4) full curing said laminate prepared in said step (3) and peeling off said release film to transfer said layer of functional ultrafine particles to said transparent plastic substrate film.

Further, the present invention include other embodiment of the above production process, which will be described in detail later.

Invention Belonging to Group B

The present invention belonging to group B relates to an antireflection sheet having the effect of preventing reflection at various displays of word processors, computers, and television, surfaces of polarizing plates used in liquid crystal displays, optical lenses, such as sunglass lenses of transparent plastics, lenses of eyeglasses, finder lenses for cameras, covers for various instruments, and surfaces of window glasses of automobiles and electric railcars.

Transparent substrates, such as glasses and plastics, are used in curve mirrors, back mirrors, goggles, window glasses, displays of personal computers and word processors, and other various commercial displays. When visual information, such as objects, letters, and figure, is observed through these transparent substrates or, in the case of mirrors, when an image from a reflecting layer is observed through the transparent substrates, light reflects at the surface of the transparent substrates, making it difficult to see the visual information through the transparent substrates.

Conventional methods for antireflection of light include, for example, a method wherein an antireflection coating is coated on the surface of glass or plastics, a method wherein a very thin film of $MgF_2$ or the like having a thickness of about 0.1 μm or a metal deposited film is provided on the surface of a transparent substrate, such as glass, a method wherein an ionizing radiation curing resin is coated on the surface of plastics, such as plastic lenses, and a film of $SiO2$ or $MgF2$ is formed thereon by vapor deposition, and a method wherein a coating having a low refractive index is formed on a cured film of an ionizing radiation curing resin.

It is already known that, when incident light perpendicularly enters a thin film, in order for the antireflection film to prevent the reflection of light by 100% and to pass light by 100% therethrough, relationships represented by the equations (1) and (2) should be met (see "Science Library" Physics=9 "Optics," pp.70–72, 1980, Science Sha Ltd., Japan).

$$n_0 = \sqrt{n_g} \quad \text{equation (1)}$$

$$n_0 h = \lambda_0 / 4 \quad \text{equation (2)}$$

wherein $\lambda_0$ represents a particular wavelength, $n_0$ represents the refractive index of the antireflection film at this wavelength, h represents the thickness of the antireflection film, and ng represents the refractive index of the substrate.

It is already known that the refractive index ng of glass is about 1.5, the refractive index $N_0$ of an $MgF_2$ film is 1.38 and the wavelength $\lambda_0$ of incident light is 5500 Å (reference). When these values are substituted in the equation (2), the results of calculation show that the thickness h of the antireflection film is about 0.1 μm in terms of the optimal thickness.

From equation (1), it is apparent that the reflection of light by 100% can be attained by the selection of such a material that the refractive index of the upper coating is equal to a value of square root of the refractive index of the lower coating. The antireflection of light by utilizing the above principle, i.e., by making the refractive index of the upper coating slightly lower than the refractive index of the lower coating, has hitherto been carried out in the art.

In the case of the conventional antireflection sheet with a layer having a low refractive index being formed on the uppermost surface of a transparent substrate film, thickness of the layer having a low refractive index is as small as 0.1 μm, so that the formed antireflection sheet has a poor hard property, resulting in poor resistance to scratch. A hard property has hitherto been imparted to the antireflection sheet by coating a thermosetting resin or an ionizing radiation curing resin on a transparent substrate film, curing the coating, and forming thereon a layer having a low refractive index.

The conventional curable resin layer for forming a hard coat layer has a high crosslinking density, so that the internal cohesion of the coating is high, resulting in poor adhesion between the coating and a plastic film or a sheet as the transparent substrate film. Therefore, it is difficult to say that the above assembly has excellent durability as a conventional antireflection film which also has a surface protecting property. For example, the antireflection sheet, after elapse of a long period of time, causes cracking of the hard coat layer or falling of the coating of the hard coat layer. Further, since the adhesion is poor, the coating is likely to peel off and, at the same time, is less resistant to scratch.

In the production of an antireflection film by successively forming on a transparent substrate film a hard coat layer, a layer having a high refractive index, a layer having a low refractive index, and the like, the transparent substrate film as the first layer of the final product, i.e., an antireflection film, is likely to be damaged in each step, which has an adverse effect on the completion of the final product.

When a layer of an ionizing radiation curing resin is laminated in an uncured state on a transparent substrate film as the first layer of an antireflection film as the final product, followed by irradiation with UV or an electron beam to cure the coating, thereby forming a hard coat layer, the transparent substrate film is unfavorably colored due to irradiation with UV or an electron beam.

Accordingly, an object of the present invention is to provide an antireflection sheet, which is durable, i.e., causes neither cracking nor falling of the coating even after use for a long period of time, resistant to scratch, and less likely to cause damage to a transparent substrate film and coloring during the production of an antireflection film, and a process for producing the same.

In order to solve the above problems, the process for producing an antireflection sheet according to the present invention belonging to group B comprises the steps of: (1) forming or not forming on a release film at least one layer having a higher refractive index than a hard coat layer described below; (2) forming a hard coat layer; (3) laminating said hard coat layer to a transparent substrate film through an adhesive; (4) peeling off said release film from the resultant laminate; and (5) forming on said layer having a high refractive index or said hard coat layer a layer having a lower refractive index than said hard coat layer.

Another process for producing an antireflection sheet according to the present invention comprises the steps of: (1) forming on a release film a layer having a lower refractive index than a hard coat layer described below; (2) forming or not forming on the layer having a low refractive index at least one layer having a higher refractive index than a hard layer described below; (3) forming a hard coat layer; (4) laminating the layers on said release film to a transparent substrate film through an adhesive; and (5) peeling off said release film from the resultant laminate.

Invention Belonging to Group C

The present invention belonging to group C provides a transparent functional membrane wherein functional ultrafine particles having various functions, such as a UV screening effect, an antistatic effect, and an antireflection effect, are incorporated in a coating, particularly localized and fixed in a coating on its surface layer in contact with air by aggregating a plurality of types of functional ultrafine particles, thereby enabling the functions of the functional ultrafine particles to be developed, a transparent functional film, and a process for producing the same.

It is known that a transparent functional film having functions, such as a UV screening property, an antistatic property or an antireflection property, can be produced by coating on a transparent plastic substrate film a transparent resin composition with functional ultrafine particles having particular properties, such as a UV screening effect, an antistatic effect, and an antireflection effect, being dispersed therein, thereby forming a functional coating.

In the transparent functional film containing functional ultrafine particles, functional ultrafine particles are present in a dispersed form in a transparent functional membrane due to the nature of the process. The incorporation of a larger amount of functional ultrafine particles in the membrane can further enhance the function of the functional ultrafine particles. In this case, however, the filling ratio of the functional ultrafine particles dispersed in the resin should be increased, making it difficult to form a film.

In particular, in order to prepare a transparent functional film having an antireflection effect, the transparent functional film should be formed by a plurality of layers having different refractive indexes. The refractive index of each layer can be regulated by incorporating ultrafine particles having a different refractive index. However, the dispersion of a large amount of ultrafine particles in the resin makes it difficult to form a film.

Accordingly, an object of the present invention is to provide a transparent functional membrane, a transparent functional film, and a process for producing the same, which can sufficiently develop the functions of a plurality of types of functional ultrafine particles, enhance the filling ratio of the functional ultrafine particles in the resin for forming a functional membrane and have an excellent adhesion among functional ultrafine particles.

In order to attain the above object, the transparent functional membrane according to the present invention comprises (1) a functional ultrafine particle layer having a multilayer structure, two or more layers constituting said functional ultrafine particle layer being integrated with each other and comprising respective separate aggregates of two or more types of functional ultrafine particles or comprising respective aggregates of two or more types of functional ultrafine particles partly mixed with each other, (2) said functional ultrafine particle layer having a multilayer structure being in contact with a resin layer and localized in and fixed to said resin layer in a region ranging from the interface of said functional ultrafine particle layer and said resin layer to the interior of said resin layer.

The transparent functional film of the present invention comprises a transparent plastic substrate film and provided thereon the transparent functional membrane.

BEST MODE FOR CARRYING OUT THE INVENTION

Invention Belonging to Group A

Transparent Functional Membrane and Transparent Functional Film

The first transparent functional membrane of the present invention belonging to group A comprises a hard coat layer and functional ultrafine particles localized in and fixed to said hard coat layer in a region from the interface of said hard coat layer and an air layer (an external atmosphere) to the interior of said hard coat layer. That is, functional ultrafine particles are localized in and fixed to said hard coat layer on the side of at least one surface thereof in contact with an external atmosphere.

The second transparent functional membrane of the present invention comprises a hard coat layer and functional ultrafine particles localized in and fixed to said hard coat layer on the side of a surface thereof, no thin film of the hard coat layer being present on the functional ultrafine particles in contact with an air layer (external atmosphere), part of the functional ultrafine particles being exposed particularly on the hard coat layer.

The transparent functional films of the present invention respectively comprise the first and second membranes each formed on a transparent plastic substrate film.

Figure 1:
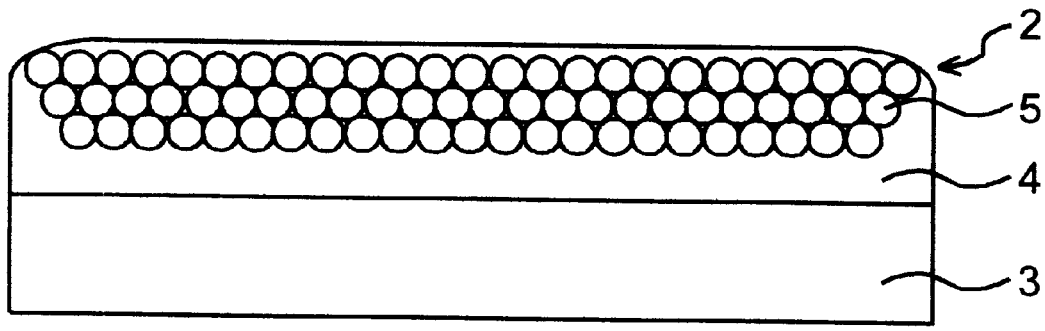
FIG. 1 is a cross-sectional view of the first transparent functional film of the present invention belonging to group A.

FIG. 1 shows a cross-sectional view of the first transparent functional film of the present invention. The transparent functional film has functional ultrafine particle layers 2 formed in a region from the surface to the interior of a hard coat layer 4 coated on a transparent plastic film 3. As shown in FIG. 1, the functional ultrafine particle layers 2 are mutually bound by the binding action of the functional ultrafine particles 5 per se, or the binding action of a binder resin used in such an amount that the functional ultrafine particles are not entirely embedded in the binder resin. The uppermost layer of the functional ultrafine particle layer 2 is embedded in the hard coat layer 4 to such an extent that a thin film of the resin for a hard coat layer is formed. It is noted that the hard coat layer 4 having the functional ultrafine particle layer 2, as such, is the first transparent functional membrane of the present invention.

Figure 2:
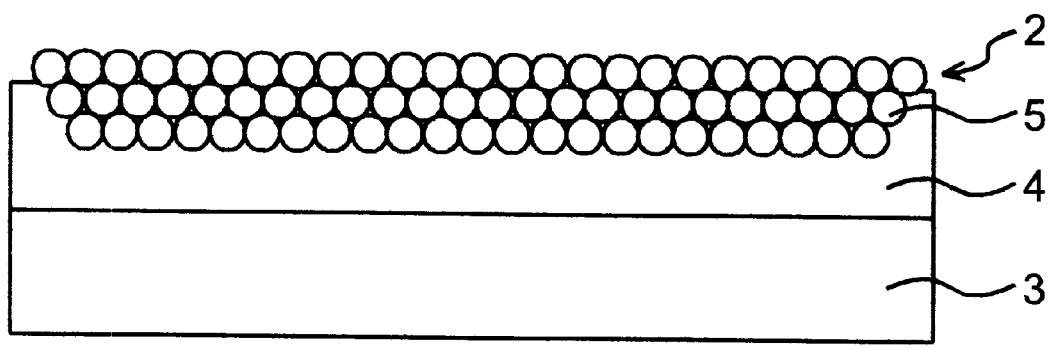
FIG. 2 is a cross-sectional view of the second transparent functional film of the present invention belonging to group A.

FIG. 2 is a cross-sectional view of the second transparent functional film of the present invention. The transparent functional film has functional ultrafine particle layers 2 formed in a region from the interior to the surface of a hard coat layer 4 coated on a transparent plastic substrate film 3. As shown in FIG. 2, the functional ultrafine particle layers 2 are mutually bound by the binding action of the functional ultrafine particles 5 per se, or the binding action of a binder resin used in such an amount that the functional ultrafine particles 5 are not entirely embedded in the binder resin. The whole functional ultrafine particle layer 2 is not embedded in the hard coat layer 4, and part of the functional ultrafine particles 5 is exposed on the surface of the hard coat layer 4. Therefore, the surface of the functional ultrafine particles has no thin film of the resin for a hard coat layer and is in direct contact with an air layer. The hard coat layer 4 having a functional ultrafine particle layer 2, part of which is exposed, as such, is the transparent functional membrane of the present invention.

In the first and second transparent functional membranes or transparent functional films according to the present invention, the functional ultrafine particles are localized in and fixed to the hard coat layer in a region from the interface of the hard coat layer and an air layer to the interior of the hard coat layer. This constitution enables the properties of the functional ultrafine particles to be easily developed without use of the functional ultrafine particles in a large amount and, at the same time, has the effect of providing a better adhesion between the functional ultrafine particles and the hard coat layer than the case where a layer containing functional ultrafine particles is simply formed on a hard coat layer.

Process for Producing Transparent Functional Film

The first process for producing the first and second transparent functional films according to the present invention comprises the steps of: (1) forming a layer of functional ultrafine particles on a release film; (2) coating on a transparent plastic substrate film a resin composition for a hard coat layer; (3) laminating, by press-bonding, the coated transparent plastic substrate film prepared in said step (2), as such, when said resin composition for a hard coat layer contains no solvent, or after removing a solvent when said resin composition for a hard coat layer contains a solvent as a diluent, to the coated release film prepared in said step (1) so that the layer of functional ultrafine particles on the release film faces the resin composition coating for a hard coat layer on said transparent plastic substrate film, thereby causing said layer of functional ultrafine particles to be entirely or partly embedded in said resin composition coating for a hard coat layer; and (4) full curing said laminate prepared in said step (3) and peeling off said release film to transfer said layer of functional ultrafine particles to said transparent plastic substrate film.

A modified embodiment of the first process for producing the first and second transparent functional films according to the present invention comprises the steps of: (1) forming a layer of functional ultrafine particles on a release film; (2) coating on a transparent plastic substrate film a resin composition for a hard coat layer; (3) laminating, by press-bonding, the coated transparent plastic substrate film prepared in said step (2), as such, when said resin composition for a hard coat layer contains no solvent, or after removing a solvent when said resin composition for a hard coat layer contains a solvent as a diluent, to the coated release film prepared in said step (1) so that the layer of functional ultrafine particles on the release film faces the resin composition coating for a hard coat layer on said transparent plastic substrate film, thereby causing said layer of functional ultrafine particles to be entirely or partly embedded in said resin composition coating for a hard coat layer; (4) half curing said laminate prepared in said step (3) and peeling off said release film to transfer said layer of functional ultrafine particles to said transparent plastic substrate film; (5) forming another functional membrane on said half cured hard coat layer; and (6) full curing the resultant assembly.

Figure 3A:
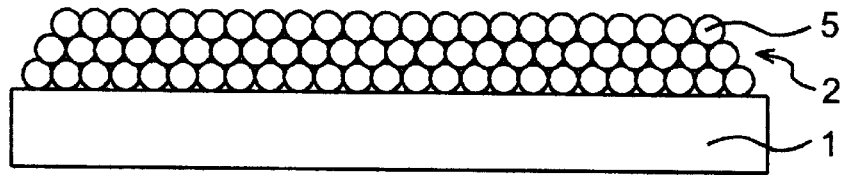
FIGS. 3a–d show a flow diagram showing the first process for producing the first transparent functional film of the present invention belonging to group A.
Figure 3B:
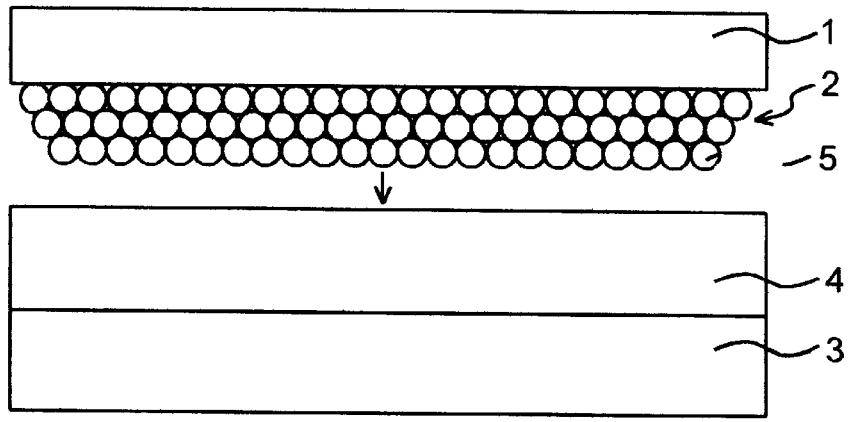
Figure 3C:
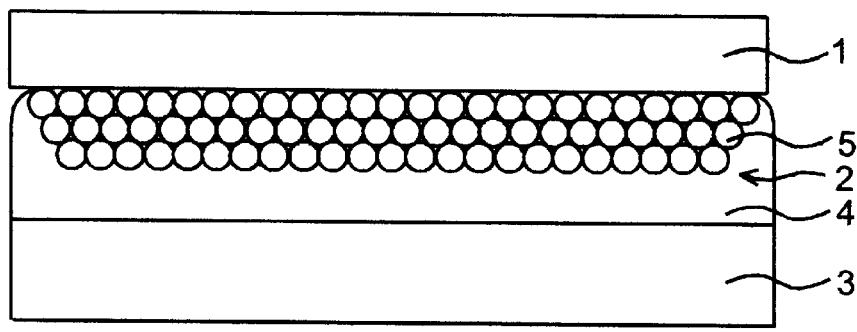
Figure 3D:
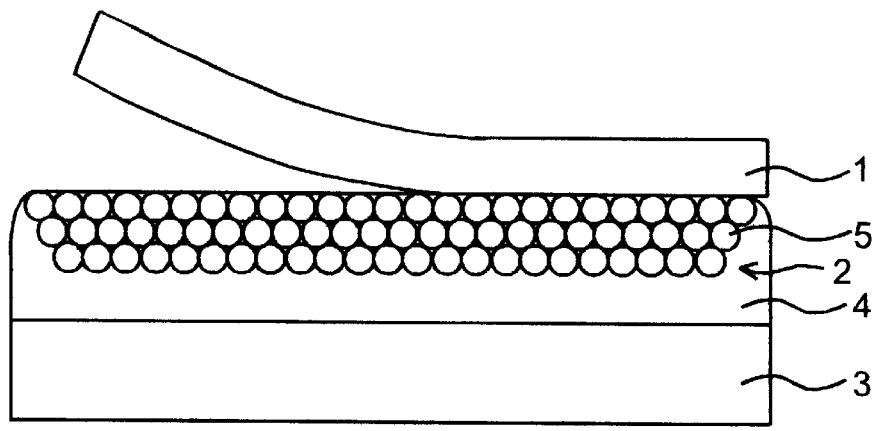

FIGS. 3a–d show a flow diagram showing the above first process for producing the first and second transparent functional films of the present invention. FIG. 3a shows the step of coating a sol of functional ultrafine particles 5 on a release film 1 to form a functional ultrafine particle layer 2. FIG. 3b shows the step of press-bonding the above functional ultrafine particle layer 2 formed on a release film 1 to a hard coat layer 4 provided on a transparent plastic substrate film 3. FIG. 3c shows the state of the functional ultrafine particle layer which has been press-bonded to the hard coat layer. FIG. 3d shows the step of peeling off the release film 1 after curing, in the press-bonded state, a resin constituting the hard coat layer.

In the step (d), the resin constituting the hard coat layer may be full cured (the first process). Alternatively, it is possible to use a method wherein the resin constituting the hard coat layer is half cured in the step (d) and transferred to the step (d) of peeling off the release film 1 and the resin constituting the hard coat layer is full cured (a modified embodiment of the first process). Curing of the hard coat layer in two stages, i.e., half cure and full cure, offers the advantage that, for example, when a layer is further provided on the hard coat layer after half curing, the adhesion between the hard coat layer and the layer provided thereon can be increased.

The second process for producing the first and second transparent functional films according to the present invention comprises the steps of: (1) forming a layer of functional ultrafine particles on a release film; (2) coating on said layer of functional ultrafine particles a resin composition for a hard coat layer to a larger thickness than said layer of functional ultrafine particles, thereby causing said layer of functional ultrafine particles to be entirely or partly embedded in said resin composition coating for a hard coat layer, and full curing the coating to form a hard coat layer; (3) laminating said release film with said hard coat layer formed thereon to a transparent plastic substrate film through an adhesive layer so that said hard coat layer faces said transparent plastic substrate film; and (4) peeling off said release film from the laminate prepared in said step (3) to transfer said hard coat layer to said transparent plastic substrate film.

A modified embodiment of the second process for producing the first transparent functional films according to the present invention comprises the steps of: (1) forming a layer of functional ultrafine particles on a release film; (2) coating on said layer of functional ultrafine particles a resin composition for a hard coat layer to a larger thickness than said layer of functional ultrafine particles, thereby causing said layer of functional ultrafine particles to be entirely or partly embedded in said resin composition coating for a hard coat layer, and half curing the coating to form a hard coat layer; (3) laminating said release film with said hard coat layer formed thereon to a transparent plastic substrate film through an adhesive layer so that said hard coat layer faces said transparent plastic substrate film; (4) peeling off said release film from the laminate prepared in said step (3) to transfer said hard coat layer to said transparent plastic substrate film; (5) forming another functional membrane on said half cured hard coat layer; and (6) full curing said hard coat layer.

Figure 4A:
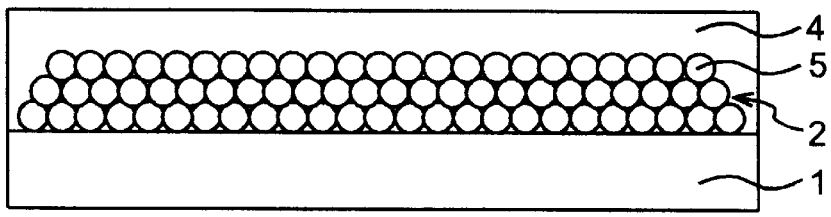
FIGS. 4a–d show a flow diagram showing the second process for producing the first transparent functional film of the present invention belonging to group A.
Figure 4B:
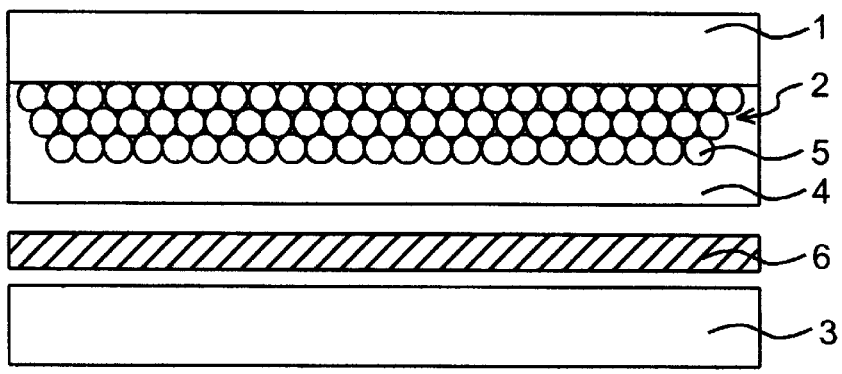
Figure 4C:
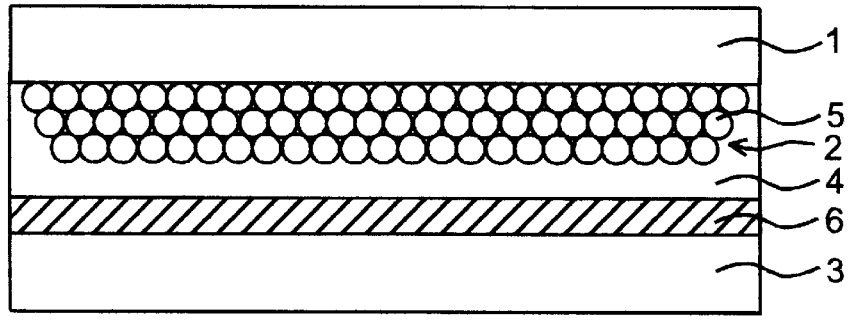
Figure 4D:
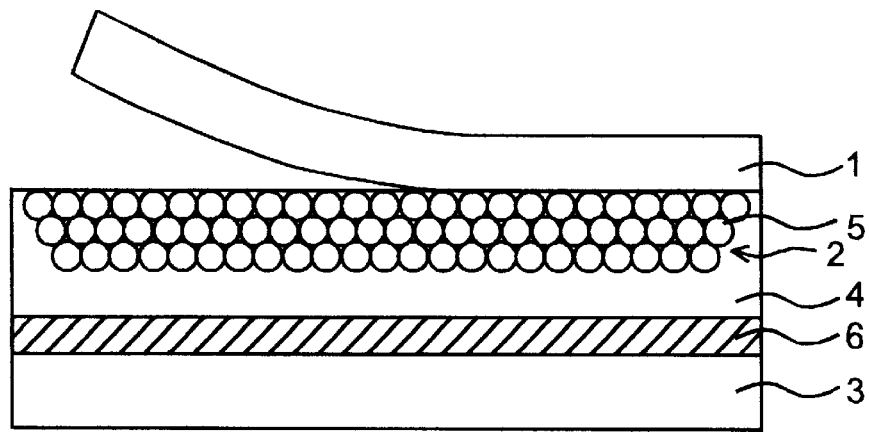

FIGS. 4a–d show a flow diagram showing the second process for producing the first and second transparent functional films according to the present invention. FIG. 4a shows the step of coating a sol of functional ultrafine particles 5 on a release film 1 to form a functional ultrafine particle layer 2 and coating thereon a resin composition for a hard coat layer to a larger thickness than the functional ultrafine particle layer 2, thereby forming a hard coat layer 4. In the step (a), the hard coat layer 4 may be full cured, or alternatively may be half cured (a modified embodiment). FIG. 4b shows the step of laminating the hard coat layer 4 provided on the release film 1 in the step (a) to a transparent plastic substrate film 3 through an adhesive layer 6. The adhesive layer 6 may be formed by coating on the hard coat layer 4 or coating on the transparent plastic substrate film 3. FIG. 4c shows the state of the hard coat layer 4 which has been press-bonded to the transparent plastic substrate film 3. FIG. 4d shows the step of peeling off, in this press-bonded state, the release film 1.

When the resin for a hard coat layer is half cured in FIG. 4a, the resin for a hard coat layer can be full cured after peeling off the release film 1 in step 4d. Curing of the hard coat layer in two stages, i.e., half cure and full cure, offers the advantage that, for example, when a layer is further provided on the hard coat layer after half curing, the adhesion between the hard coat layer and the layer provided thereon can be increased.

The third process for producing the first and second transparent functional film according to the present invention comprises the steps of: (1) forming a layer of functional ultrafine particles on a release film; (2) coating on said layer of functional ultrafine particles a resin composition for a hard coat layer to a larger thickness than said layer of functional ultrafine particles, thereby causing said layer of functional ultrafine particles to be entirely or partly embedded in said resin composition coating for a hard coat layer; (3) laminating a transparent plastic substrate film to said release film coated with said resin composition for a hard coat layer so that said resin composition coating for a hard coat layer faces said transparent plastic substrate film, and full curing the resultant laminate to form a hard coat layer; and (4) peeling off said release film from the laminate prepared in said step (3) to transfer said hard-coat layer to said transparent plastic substrate film.

A modified embodiment of the third process for producing the first and second transparent functional films according to the present invention comprises the steps of: (1) forming a layer of functional ultrafine particles on a release film; (2) coating on said layer of functional ultrafine particles a resin composition for a hard coat layer to a larger thickness than said layer of functional ultrafine particles, thereby causing said layer of functional ultrafine particles to be entirely or partly embedded in said resin composition coating for a hard coat layer; (3) laminating a transparent plastic substrate film to said release film coated with said resin composition for a hard coat layer so that said resin composition coating for a hard coat layer faces said transparent plastic substrate film, and half curing the resultant laminate to form a hard coat layer; (4) peeling off said release film from the half cured laminate prepared in said step (3) to transfer said hard coat layer to said transparent plastic substrate film; (5) forming another functional membrane on the half cured hard coat layer; and (6) full curing the hard coat layer.

Figure 5A:
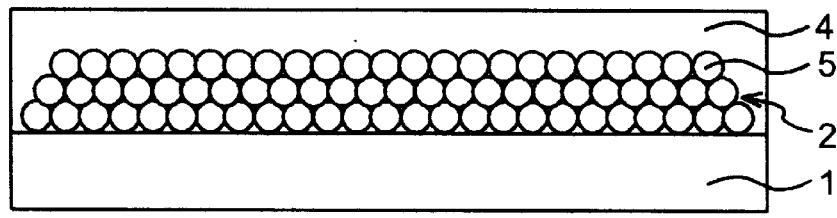
FIGS. 5a–d show a flow diagram showing the third process for producing the first transparent functional film of the present invention belonging to group A.
Figure 5B:
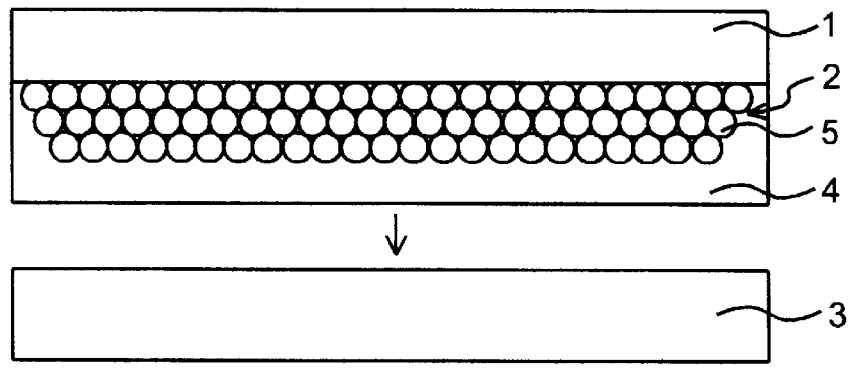
Figure 5C:
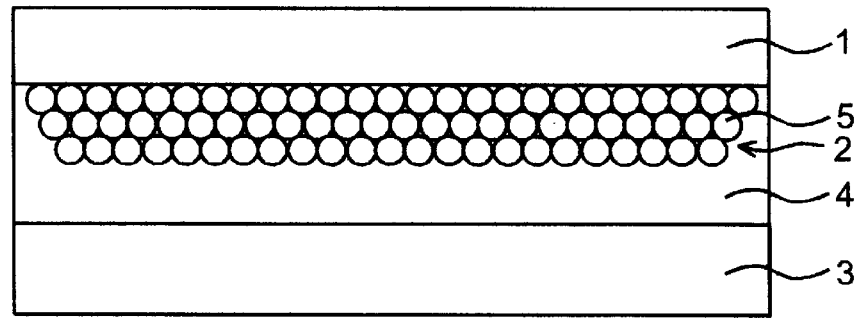
Figure 5D:
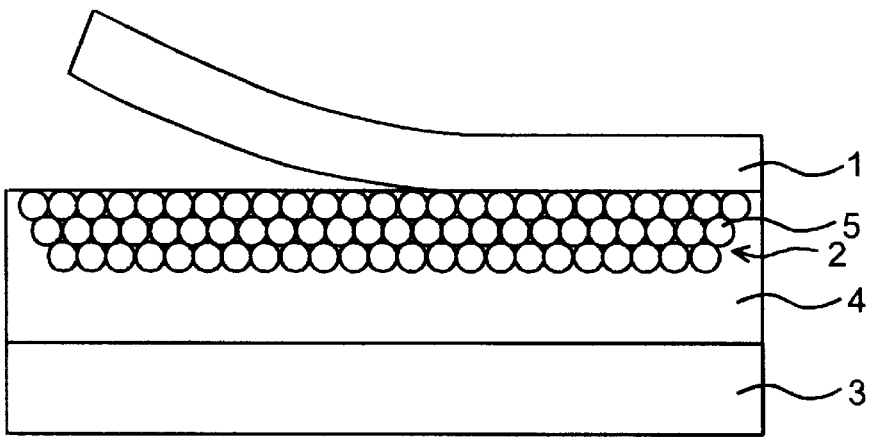

FIGS. 5a–d show a flow diagram showing the third process for producing the first and second transparent functional films according to the present invention. FIG. 5a shows the step of coating a sol of functional ultrafine particles 5 on a release film 1 to form a functional ultrafine particle layer 2 and coating thereon a resin composition for a hard coat layer to a larger thickness than the functional ultrafine particle layer 2, thereby forming a hard coat layer 4. In step 5a, the hard coat layer 4 has not been yet subjected to a curing treatment. FIG. 5b shows the step of laminating the uncured hard coat layer 4 formed on the release film 1 prepared in the above step (a) to a transparent plastic substrate film 3. FIG. 5c shows the state of the uncured hard coat layer press-bonded to the transparent substrate film. In the state shown in FIG. 5c, the laminate is subjected to a curing treatment to full cure or half cure the hard coat layer 4. FIG. 5d shows the step of peeling off the release film 1.

In the step (d), the resin composition for a hard coat layer may be full cured. Alternatively, it is also possible to a method wherein the resin composition for a hard coat layer 4 is half cured in the step (d) and then full cured after peeling off the release film 1 in the step (d). Curing of the hard coat layer 4 in two stages, i.e., half cure and full cure, offers the advantage that, for example, when a layer is further provided on the hard coat layer after half curing, the adhesion between the hard coat layer 4 and the layer provided thereon can be increased.

In the above processes for producing transparent functional films, particularly in the production of a transparent functional film wherein the functional ultrafine particle layer is not entirely embedded in the hard coat layer and part thereof is exposed on the surface of the hard coat layer (the second transparent functional film of the present invention), consideration should be given to the viscosity of a resin for a hard coat layer, the kind of the resin, the surface tension of the resin, the particle diameter of functional ultrafine particles, the filling ratio of the ultrafine particles, the wettability of the functional ultrafine particles by the resin for a hard coat layer, and the like.

More specifically, when a resin which has a high viscosity or becomes dry to the touch (described below) upon coating is selected as the resin for a hard coat layer, part of the functional ultrafine particles is likely to expose. Further, the selection of a resin having a low surface tension or functional ultrafine particles having a small particle diameter, which can provide a high filling ratio, gives the same results. Furthermore, the same results can be obtained when the resin and the ultrafine particles are selected so that the wettability of the ultrafine particles by the resin is poor.

Figure 6A:
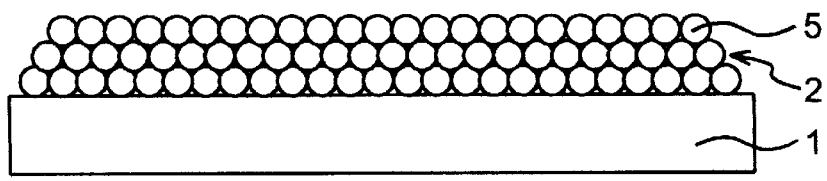
FIGS. 6a–d show a flow diagram showing a process for producing the second transparent functional film of the present invention belonging to group A.
Figure 6B:
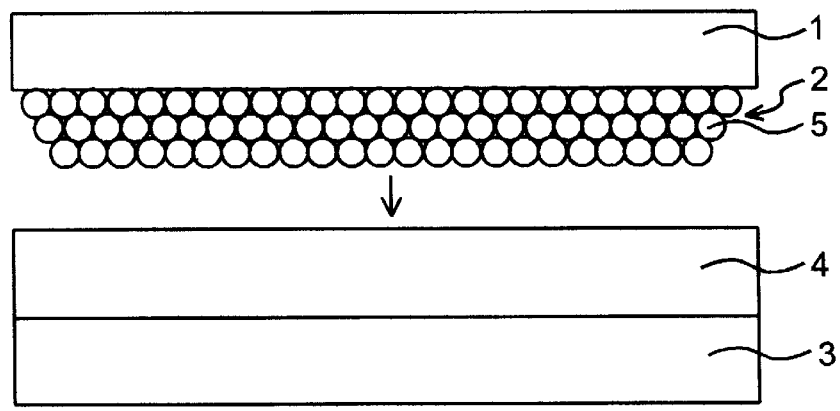
Figure 6C:
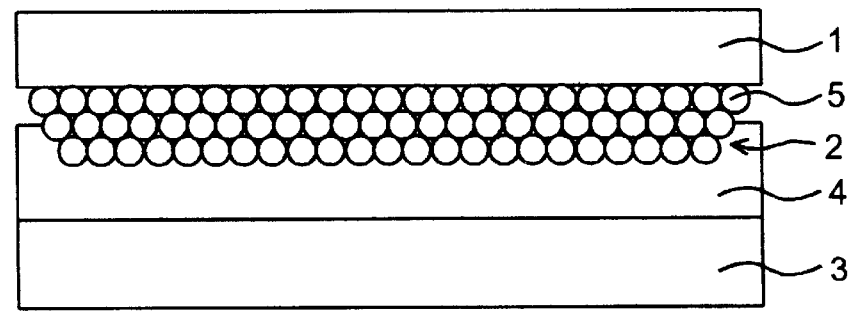
Figure 6D:
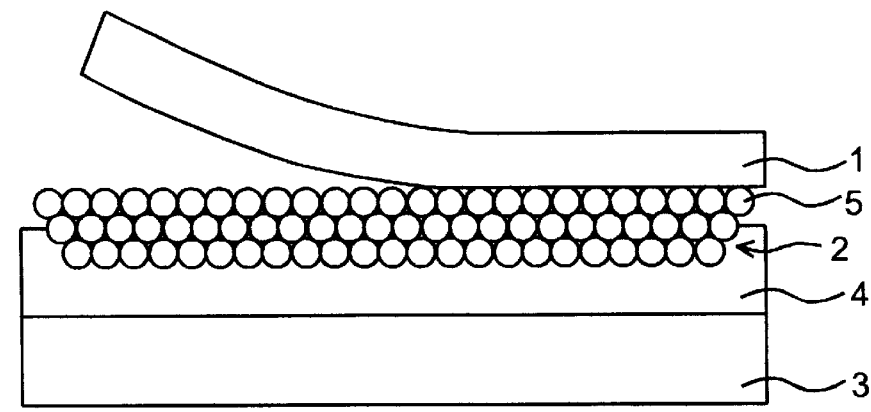

FIGS. 6a–d show a flow diagram showing an embodiment of a process for producing the second transparent functional film according to the present invention. FIG. 6a shows the step of coating a sol of functional ultrafine particles 5 on a release film 1 to form a functional ultrafine particle layer 2. FIG. 6b shows the step of coating a resin composition for a hard coat layer on a transparent plastic substrate film 3 and press-bonding the resultant coating, which is dry to the touch, to the above functional ultrafine particle layer 2 provided on the release film 1. FIG. 6c shows the state of the coating for a hard coat layer, which has been press-bonded to the above functional ultrafine particle layer 2. Since the release film 1 with the functional ultrafine particle layer 2 being formed thereon is press-bonded to the resin composition coating for a hard coat layer in such a state that the resin composition coating for a hard coat layer is dry to touch, the whole functional ultrafine particle layer 2 provided on the release film 1 is not entirely embedded in the hard coat layer 4 with part of the functional ultrafine particle layer 2 remaining outside the hard coat layer. FIG. 6d shows the step of peeling off the release film 1 after irradiating a laminate in the press-bonded state with an ionizing radiation, such as an electron beam or ultraviolet light, to full cure the ionizing radiation curing resin.

Release Film

A sheet, the surface of which has been subject to or not been subjected to a treatment with a silicone, fluorine, acryl-melamine, or the like for rendering the surface of the sheet releasable, is generally used. The surface of the sheet may be uneven. In this case, since the unevenness is formed on the surface of the final product, it is possible to impart an antireflection effect or a glare protection effect to the transparent functional film.

Functional Ultrafine Particles

Examples of the functional ultrafine particles used in the functional ultrafine particle layer include ultrafine particles which have a size of not more than 200 nm and exhibit functions such as a UV screening property, an electrical conductivity, an antistatic property, and an antireflection property. For example, ultrafine particles, such as $SnO_2$ and ITO, are used for the purpose of imparting electrical conductivity or antistatic property to the transparent functional film, while ultrafine particles having a low refractive index, such as $MgF_2$ and $SiO_2$, or ultrafine particles having a high refractive index, such as $Sb_2O_5$, ZnO, ITO, $SnO_2$ and $TiO_2$, are used for the purpose of imparting an antireflection property.

The antireflection film using the ultrafine particles having a high refractive index can be prepared by forming, on a coating containing ultrafine particles having a high refractive index, a thin film having a single layer or multilayer structure using an inorganic material having a low refractive index, such as $MgF_2$ or $SiO_2$, or a metallic material by vapor deposition, sputtering, plasma CVD or the like, or alternatively forming, on a coating containing ultrafine particles having a high refractive index, a coating layer having a single layer or multilayer structure using a resin composition, having a low refractive index, containing an inorganic material having a low refractive index, such as $MgF_2$ or $SiO_2$, a metallic material, or the like.

On the other hand, ultrafine particles, such as $Sb_2O_5$, ZnO, and $TiO_2$, are used for the purpose of imparting the UV screening property.

In the present invention, the term "ultrafine particles" means particles having an average particle diameter of not more than 200 nm, preferably not more than 100 nm, still preferably in the range of from 5 to 70 nm. This definition is true of the inventions belonging to group B and group C which will be described later.

These functional ultrafine particles may be those which have been subjected to a treatment with a coupling agent for rendering the surface thereof hydrophobic. The treatment for rendering the surface hydrophobic introduces a hydrophobic group onto the surface of the functional ultrafine particles, so that the affinity of the ultrafine particles for the ionizing radiation curing resin is increased, enhancing the bond between the ultrafine particles and the ionizing radiation curing resin. Examples of the coupling agent include a silane coupling agent, a titanate coupling agent, and an alumina coupling agent. The amount of the coupling agent added is 0 (zero) exclusive to 30 parts by weight, preferably 0 exclusive to 10 parts by weight.

When the functional ultrafine particles is those having an inert surface, such as $MgF_2$, it is possible to use a method which comprises previously adding a sol of $SiO_2$ to coat $SiO_2$ on the surface of the functional ultrafine particles and treating the coated functional ultrafine particles with a coupling agent. The above coating treatment with $SiO_2$ enables a large amount of a hydrophilic group to be introduced onto the surface of the functional ultrafine particles, which in turn enables the subsequent treatment with a coupling agent thereby to ensurely introduce a larger amount of a hydrophobic group, so that the affinity of the functional ultrafine particles for the resin is further increased to enhance the bond strength between the functional ultrafine particles and the resin.

Method for Forming Functional Ultrafine Particle Layer on Release Film

A functional ultrafine particle layer is formed on a release film by coating on a release film a sol of functional ultrafine particles, as such, or a sol of functional ultrafine particles containing a binder resin.

The functional ultrafine particle layer can be successfully formed on the release film by the binding action of the functional ultrafine particles per se without using any binder resin. If the binding action is weak, the binder resin may be, if necessary, used. The amount of the binder resin is preferably such that the functional ultrafine particles are not entirely embedded in the binder resin, because the functional ultrafine particles are mutually bound with the surface of the functional ultrafine particles being exposed. This is favorable to develop the function of the functional ultrafine particles, particularly when the functional ultrafine particle layer is used as an antireflection film.

The above binder resin may be the conventional binder resins, such as a thermosetting resin, a thermoplastic resin, and an ionizing radiation curing resin. However, when the adhesion to the underlayer (an ionizing radiation curing resin layer) is taken into consideration, the use of an ionizing radiation curing resin is preferred. In this case, the ionizing radiation curing resin is preferably of a solvent semicuring resin. A colorant may be added to the binder resin.

Transparent Plastic Substrate Film

Any transparent plastic film may be suitably used as the transparent plastic substrate film for the transparent functional film, and example thereof include a triacetyl cellulose film, a diacetyl cellulose film, a cellulose acetate butyrate film, a polyether sulfone film, a polyacrylic resin film, a polyurethane resin film, a polyester film, a polycarbonate film, a polysulfone film, a polyether film, a trimethylpentane film, a polyether ketone film, and a (meth)acrylonitrile film. Among them, a triacetyl cellulose film and a uniaxial stretched polyester film are particularly favorable because they have excellent transparency and no optical anisotropy. The thickness of the transparent substrate film is, in general, preferably in the range of from about 8 to 1000 μm.

Hard Coat Layer

The binder resin used in the hard coat layer may be any resin (for example, a thermoplastic resin, a thermosetting resin, and an ionizing radiation curing resin) so far as it is transparent. In order to impart a hard property, the thickness of the hard coat layer is not less than 0.5 pm, preferably not less than 3 μm. When the thickness falls within the above range, it is possible to maintain the hardness, so that the hard property can be imparted to the antireflection film.

In the present invention, "having a hard property" or "hard coat" refers to a coating having a hardness of not less than H as measured by a pencil hardness test specified in JIS K5400.

In order to further improve the hardness of the hard coat layer, it is preferred to use, as the binder resin for the hard coat layer, a reaction curing resin, i.e., a thermosetting resin and/or an ionizing radiation curing resin. Examples of the thermosetting resin include a phenolic resin, a urea resin, a diallyl phthalate resin, a melamine resin, a guanamine resin, an unsaturated polyester resin, a polyurethane resin, an epoxy resin,.an aminoalkyd resin, a melamine-urea copolycondensed resin, a silicon resin, and a polysiloxane resin. If necessary, curing agents, such as crosslinking agents and polymerization initiators, polymerization accelerators, solvents, viscosity modifiers, and the like may be added to these resins.

The ionizing radiation curing resin is preferably one having an acrylate functional group, and examples thereof include a polyester resin, a polyether resin, an acrylic resin, an epoxy resin, a urethane resin, an alkyd resin, a spiroacetal resin, a polybutadiene resin, and a polythiol-polyene resin having a relatively low molecular weight, an oligomer or a prepolymer of a (meth)acrylate or the like of a polyfunctional compound, such as a polyhydric alcohol, and those containing a relatively large amount of a reactive diluent, such as a monofunctional monomer, such as ethyl (meth) acrylate, ethylhexyl (meth)acrylate, styrene, methylstyrene, or N-vinylpyrrolidone, and a polyfunctional monomer, for example, trimethylolpropane tri(meth)acrylate, hexanediol (meth)acrylate, tripropylene glycol di(meth)acrylate, diethylene glycol di(meth)acrylate, pentaerythritol tri(meth) acrylate, dipentaerythritol hexa(meth)acrylate, 1,6-hexanediol di(meth)acrylate, or neopentyl glycol di(meth) acrylate.

Among them, a mixture of a polyester acrylate with polyurethane acrylate is particularly preferred. The reason for this is as follows. The polyester acrylate provides a coating having a very high hardness and is, therefore, suitable for the formation of a hard coat. Since, however, a coating consisting of polyester acrylate alone has low impact resistance and is fragile, the polyurethane acrylate is used in combination with the polyester acrylate to impart the impact resistance and flexibility to the coating. The proportion of the polyurethane acrylate incorporated based on 100 parts by weight of the polyester acrylate is not more than 30 parts by weight. This is because the incorporation of the polyurethane acrylate in an amount exceeding the above upper limit 30 parts by weight makes the coating so flexible that the hard property is lost.

In order to bring the above ionizing radiation curing resin composition to UV curing type, it is preferred to incorporate, into the ionizing radiation curing resin composition, a photopolymerization initiator, such as an acetophenone compound, a benzophenone compound, Michler's benzoylbenzoate, an α-amyloxime ester, tetramethyl thiuram monosulfide, or a thioxanthone compound, and a photosensitizer, such as n-butylamine, triethylamine, or tri-n-butylphosphine. In the present invention, it is particularly preferred to incorporate urethane acrylate or the like as an oligomer and dipentaerythritol hexa(meth)acrylate or the like as a monomer.

In order to impart particularly flexibility to the hard coat layer, a solvent type resin may be incorporated in an amount of 10 to 100 parts by weight based on 100 parts by weight of the ionizing radiation curing resin. A thermoplastic resin is mainly used as the solvent type resin. The solvent type thermoplastic resin added to the ionizing radiation curing resin may be any conventional resin used in the art. In particular, when a blend of a polyester acrylate with a polyurethane acrylate is used as the ionizing radiation curing resin, the use of polymethyl methacrylate acrylate or polybutyl methacrylate acrylate as the solvent type resin enables the hardness of the coating to be kept high. Further, this is advantageous also from the viewpoint of transparency, particularly, low haze value, high transmittance, and compatibility, because since the refractive index of the polymethyl methacrylate acrylate or polybutyl methacrylate acrylate is close to that of the main ionizing radiation curing resin, the transparency of the coating is not lost.

Further, particularly when a cellulosic resin, such as triacetyl cellulose, is used as the transparent plastic substrate film, the use of a cellulosic resin, such as nitrocellulose, acetyl cellulose, cellulose acetate propionate, or ethylhydroxyethyl cellulose, is advantageous from the viewpoint of the adhesion and transparency of the coating.

The reason for this is as follows. If toluene is used as a solvent for the above cellulosic resin, despite the fact that toluene does not dissolve triacetyl cellulose as the transparent plastic substrate film, when a coating solution containing this solvent type resin is coated on the transparent plastic substrate film, the adhesion between the transparent plastic substrate film and the coating resin can be improved.

Further, in this case, since toluene does not dissolve triacetyl cellulose as the transparent plastic substrate film, the surface of the transparent plastic substrate film is not whitened, enabling the transparency to be maintained.

In the hard coat layer, when an ionizing radiation curing resin is used as the binder resin, the ionizing radiation curing resin may be cured by the conventional curing method usually employed for curing ionizing radiation curing resins, that is, applying an electron beam or ultraviolet light. For example, in the case of curing with an electron beam, use may be made of an electron beam or the like having an energy of 50 to 1000 KeV, preferably 100 to 300 Kev, emitted from various electron beam accelerators, such as a Cockcroft-Walton (type) accelerator, a van de Graaff accelerator, a resonance transformer accelerator, an insulation core transformer accelerator, a linear accelerator, a dynatron accelerator, and a high frequency accelerator. On the other hand, in the case of curing with UV, use may be made of ultraviolet light emitted from an ultrahigh pressure mercury lamp, a high pressure mercury lamp, a low pressure mercury lamp, a carbon arc, a xenon arc, a metal halide lamp, and the like.

Half Cure

In the process for producing a transparent functional film according to the present invention, the half cure include a. ionizing radiation curing resin semicrosslinking type half cure, b. ionizing radiation curing resin/thermosetting resin (or thermoplastic resin) blend type half cure, and c. solvent type/half cure type combined half cure.

a. Ionizing Radiation Curing Resin Semicrosslinking Type Half Cure

The ionizing radiation curing resin semicrosslinking type half cure refers to a half cured state created by coating the conventional ionizing radiation curing resin and irradiating the coating with an ionizing radiation, such as UV or an electron beam, under regulated irradiation conditions to cause semicrosslinking.

b. Ionizing Radiation Curing Resin/Thermosetting Resin (or Thermoplastic Resin) Blend Type Half Cure The ionizing radiation curing resin/thermosetting resin (or thermoplastic resin) blend type half cure refers to a half cured state created by coating a resin composition comprising a mixture of an ionizing radiation curing resin with a thermosetting resin or a thermoplastic resin and, when the thermosetting resin is used, applying heat to the coating.

c. Solvent Type/Half Cure Type Combined Half Cure

The solvent type/half cure type combined half cure refers to a half cured state created by coating the conventional ionizing radiation curing resin with a solvent being added thereto, removing the solvent to form a coating, and irradiating the dried coating with an ionizing radiation. This half cured state is the same as the semi-cured state described in Japanese Patent Laid-Open No. 20249/1989.

Dry-to-Touch State

In the production of the second transparent functional film of the present invention, it is necessary to expose part of the functional ultrafine particle layer on the hard coat layer. When the coating of the resin composition for a hard coat layer is dry to the touch, it has a high viscosity. In this state, when a functional ultrafine particle layer is brought into contact with the coating, the whole functional ultrafine particle layer is not entirely embedded in the hard coat layer with part of the functional ultrafine particle layer being exposed. That the hard coat layer is brought to the dry-to-touch state offers the advantage that the adhesion between the hard coat layer and the functional ultrafine particle layer can be improved.

The coating of the resin composition for a hard coat layer can be made dry to the touch by (a) a method wherein an ionizing radiation curing resin, which is dry to the touch, is used, or (b) a method wherein a resin having a pressure-sensitive adhesive property is incorporated in the ionizing radiation curing resin.

In the method a wherein an ionizing radiation curing resin, which is dry to the touch, is used, for example, ionizing radiation curing resins as described in the following (i) and (ii), which are dry to the touch, may be used.

(i) Resin Comprising a Polymer Having a Glass Transition Temperature of 0 to 250° C. with a Radical Polymerizable Unsaturated Group Being Introduced Therein Specifically, mention may be made of resins prepared by polymerizing or copolymerizing the following monomers and introducing a radical copolymerizable unsaturated group into the polymers or copolymers by the methods a) to d) which will be described later.

Monomers having a hydroxyl group: for example, N-methylol (meth)acrylamide, 2-hydroxyethyl (meth) acrylate, 2-hydroxypropyl (meth)acrylate, 2-hydroxybutyl (meth)acrylate, and 2-hydroxypropyl (meth)acrylate.

Monomers having a carboxyl group: for example, (meth) acrylic acid and (meth)acryloyloxyethyl monosuccinate.

Monomers having an epoxy group: for example, glycidyl (meth)acrylate.

Monomers having an aziridinyl group: for example, 2-aziridinyl ethyl (meth)acrylate and 2-aziridinyl allyl propionate.

Monomers having an amino group: for example, (meth) acrylamide, diacetone (meth)acrylamide, dimethylaminoethyl (meth)acrylate, and diethylaminoethyl (meth)acrylate.

Monomers having a sulfone group: for example, 2-(meth) acrylamido-2-methylpropanesulfonic acid.

Monomers having an isocyanate group: for example, an adduct of a diisocyanate with a radical copolymer having an active hydrogen, such as an adduct of 2,4-toluene diisocyanate with 2-hydroxyethyl (meth)acrylate (mole ratio=1:1).

Further, in order to adjust the glass transition temperature of the copolymer or adjust the properties of the cured membrane, it is possible to copolymerize the above monomer with the following copolymerizable compound. Examples of the copolymerizable monomer include methyl (meth)acrylate, propyl (meth)acrylate, butyl (meth)acrylate, isobutyl (meth)acrylate, t-butyl (meth)acrylate, isoamyl (meth)acrylate, cyclohexyl (meth)acrylate, and 2-ethylhexyl (meth)acrylate.

Ionizing radiation curing resins, such as UV curing resins or electron beam curing resins, can be prepared by introducing a radical polymerizable unsaturated group into homopolymers or copolymers of the above monomers by the following methods a) to d).

a) When the homopolymer or copolymer is a homopolymer or a copolymer of a monomer having a hydroxyl group, it is condensed with a monomer having a carboxyl group, such as methacrylic acid, or the like.

b) When the homopolymer or copolymer is a homopolymer or a copolymer of a monomer having a carboxyl group or a sulfonate group, it is condensed with the above monomer having a hydroxyl group.

c) When the homopolymer or copolymer is a homopolymer or a copolymer of a monomer having an epoxy group, an isocyanate group, or an aziridinyl group, it is subjected to an addition reaction with the above monomer having a hydroxyl group or a carboxyl group.

d) When the homopolymer or copolymer is a homopolymer or a copolymer of a monomer having a hydroxyl group or a carboxyl group, it is subjected to an addition reaction with a monomer having an epoxy group, a monomer having an aziridinyl group or a 1:1 adduct of a diisocyanate compound and an acrylic ester monomer having a hydroxyl group.

(ii) Resin, Having a Radical Polymerizable Unsaturated Group, Which Has a Melting Point in the Range of from Room Temperature (20° C.) to 250° C.

In the above reactions, it is preferred to add a very small amount of a polymerization inhibitor, such as hydroquinone, to the reaction systems, and the reactions are carried out while feeding dried air to the reaction systems.

Specific example thereof include stearyl acrylate, stearyl (meth)acrylate, triacryl isocyanate, cyclohexanediol (meth)acrylate, spiroglycol diacrylate, and spiroglycol (meth)acrylate.

The resin having an adhesive property used in the above method b wherein a resin having an adhesive property is incorporated in an ionizing radiation curing resin is a resin which can impart an adhesive property to the ionizing radiation curing resin. Such a resin generally comprises a mixture of a pressure sensitive adhesive with an ionizing radiation curing resin. When the ionizing radiation curing resin is in an uncrosslinked state and not liquid and has an adhesive property, it, as such, may be used. In particular, in order to keep the hardness of the coating high, thermoplastic resins, such as polymethyl methacrylate and polybutyl methacrylate, are suitable for imparting an adhesive property to the ionizing radiation curing resin.

Other resins suitable for imparting the adhesive property to the ionizing radiation curing resin include the conventional resins used for pressure-sensitive adhesive tapes and pressure-sensitive adhesive seals, and examples thereof include rubber resins, such as polyisoprene rubber, polyisobutylene rubber, styrene-butadiene rubber, and butadiene-acrylonitrile rubber, a (meth)acrylic ester resin, a polyvinyl ether resin, a polyvinyl acetate resin, a polyvinyl chloride/vinyl acetate copolymer resin, a polystyrene resin, a polyamide resin, a polychlorinated olefin resin, and a polyvinyl butyral resin. They contain proper tackifiers, such as a rosin, a dammar, a polymerized rosin, a partially hydrogenated rosin, an ester rosin, a polyterpene resin, a modified terpene, a petroleum resin, a cyclopentadiene resin, a phenolic resin, and a coumarone-indene resin, and, if necessary, a softener, a filler, an antioxidant, and the like.

The proportion of the resin having an adhesive property incorporated in the ionizing radiation curing resin is preferably not more than 50 parts by weight based on 100 parts by weight of the ionizing radiation curing resin, from the viewpoint of forming a dry-to-touch coating.

Antireflection Film and Process for Producing the Same

The antireflection film of the present invention can be classified into four types, two types of which are such that ultrafine particles having a low refractive index are used as the functional ultrafine particles and the other two types are such that ultrafine particles having a high refractive index are used as the functional ultrafine particles.

The first antireflection film of the present invention comprises: a hard coat layer with ultrafine particles having a low refractive index being localized in and fixed to said hard coat layer in a region from the interface of the hard coat layer and an air layer to the interior of the hard coat layer; and a transparent plastic substrate film having said hard coat layer fixed thereon, said hard coat layer having a higher refractive index than said ultrafine particles having a low refractive index. This antireflection film is the same as the transparent functional film shown in FIG. 1, except that the functional ultrafine particles are ultrafine particles having a low refractive index.

The second antireflection film of the present invention comprises: a hard coat layer with ultrafine particles having a low refractive index being localized in and fixed to said hard coat layer in a region from the interface of the hard coat layer and an air layer to the interior of the hard coat layer, part of said ultrafine particles having a low refractive index being exposed on the surface of said hard coat layer; and a transparent plastic substrate film having said hard coat layer fixed thereon, said hard coat layer having a higher refractive index than said ultrafine particles having a low refractive index. This antireflection film is the same as the transparent functional film shown in FIG. 2, except that the functional ultrafine particles are ultrafine particles having a low refractive index.

The third antireflection film of the present invention comprises: a hard coat layer with ultrafine particles having a high refractive index being localized in and fixed to said hard coat layer in a region from the surface of said hard coat layer to the interior of said hard coat layer; a transparent plastic substrate film with said hard coat layer being fixed to the reverse surface thereof; and a layer, having a low refractive index, formed on the surface of said hard coat layer with said ultrafine particles having a high refractive index being localized therein, said hard coat layer having a lower refractive index than said ultrafine particles having a high refractive index. This antireflection film corresponds to a transparent functional film shown in FIG. 9, wherein the functional ultrafine particles are ultrafine particles having a high refractive index.

The fourth antireflection film of the present invention comprises: a hard coat layer with ultrafine particles having a high refractive index being localized in and fixed to said hard coat layer in a region from the surface of said hard coat layer to the interior of said hard coat layer, part of said ultrafine particles having a high refractive index being exposed on the surface of said hard coat layer; a transparent plastic substrate film with said hard coat layer being fixed thereon; and a layer, having a low refractive index, formed on the surface of said hard coat layer with said ultrafine particles having a high refractive index being localized therein and part of said ultrafine particles having a high refractive index being exposed thereon, said hard coat layer having a lower refractive index than said ultrafine particles having a high refractive index. This antireflection film corresponds to a transparent functional film shown in FIG. 12, wherein the functional ultrafine particles are ultrafine particles having a high refractive index.

The process for producing the first antireflection film of the present invention is characterized in that, in the above first process for producing the first transparent functional film, ultrafine particles having a low refractive index are used as the functional ultrafine particles and a resin composition for a hard coat layer, having a higher refractive index than the ultrafine particles having a low refractive index, is used as the resin composition for a hard coat layer.

The process for producing the second antireflection film of the present invention is characterized in that, in the above process for producing the second transparent functional film, ultrafine particles having a low refractive index are used as the functional ultrafine particles and a resin composition for a hard coat layer, having a higher refractive index than the ultrafine particles having a low refractive index, is used as the resin composition for a hard coat layer.

The first process for producing the third antireflection film of the present invention comprises the steps of: (1) forming on a release film a layer of ultrafine particles having a high refractive index; (2) coating on a transparent plastic substrate film a resin composition for a hard coat layer, having a lower refractive index than said layer of ultrafine particles having a high refractive index; (3) laminating, by press-bonding, the coated transparent plastic substrate film prepared in said step (2), as such, when said resin composition for a hard coat layer contains no solvent, or after removing a solvent when said resin composition for a hard coat layer contains a solvent as a diluent, to the coated release film prepared in said step (1) so that the layer of ultrafine particles having a high refractive index on the release film faces the resin composition coating for a hard coat layer on said transparent plastic substrate film, thereby causing said layer of ultrafine particles having a high refractive index to be entirely or partly embedded in said resin composition coating for a hard coat layer; (4) full curing said laminate prepared in said step (3) to form a hard coat layer and peeling off said release film to transfer said layer of ultrafine particles having a high refractive index to said transparent plastic substrate film; and (5) forming a layer having a low refractive index on said hard coat layer.

A modified embodiment of the first process for producing the third antireflection film according to the present invention comprises the steps of: (1) forming on a release film a layer of ultrafine particles having a high refractive index; (2) coating on a transparent plastic substrate film a resin composition for a hard coat layer, having a lower refractive index than said layer of ultrafine particles having a high refractive index; (3) laminating, by press-bonding, the coated transparent plastic substrate film prepared in said step (2), as such, when said resin composition for a hard coat layer contains no solvent, or after removing a solvent when said resin composition for a hard coat layer contains a solvent as a diluent, to the coated release film prepared in said step (1) so that the layer of ultrafine particles having a high refractive index on the release film faces the resin composition coating for a hard coat layer on said transparent plastic substrate film, thereby causing said layer of ultrafine particles having a high refractive index to be entirely or partly embedded in said resin composition coating for a hard coat layer; (4) half curing said laminate prepared in said step (3) to form a hard coat layer and peeling off said release film to transfer said layer of ultrafine particles having a high refractive index to said transparent plastic substrate film; (5) forming a layer having a low refractive index on the half cured hard coat layer; and (6) full cure said hard coat layer.

The second process for producing the third antireflection film according to the present invention comprises the steps of: (1) forming on a release film a layer of ultrafine particles having a high refractive index; (2) coating on said layer of ultrafine particles having a high refractive index a resin composition for a hard coat layer, having a lower refractive index than said layer of ultrafine particles having a high refractive index, to a larger thickness than said layer of ultrafine particles having a high refractive index, thereby causing said layer of ultrafine particles having a high refractive index to be entirely or partly embedded in said resin composition coating for a hard coat layer, and full curing the coating to form a hard coat layer; (3) laminating said release film with said hard coat layer formed thereon to a transparent plastic substrate film through an adhesive layer so that said hard coat layer faces said transparent plastic substrate film; (4) peeling off said release film from the laminate prepared in said step (3) to transfer said hard coat layer to said transparent plastic substrate film; and (5) forming a layer having a low refractive index on said hard coat layer.

A modified embodiment of the second process for producing the third antireflection film according to the present invention comprises the steps of: (1) forming on a release film a layer of ultrafine particles having a high refractive index; (2) coating on said layer of ultrafine particles having a high refractive index a resin composition for a hard coat layer, having a lower refractive index than said layer of ultrafine particles having a high refractive index, to a larger thickness than said layer of ultrafine particles having a high refractive index, thereby causing said layer of ultrafine particles having a high refractive index to be entirely or partly embedded in said resin composition coating for a hard coat layer, and half curing the coating to form a hard coat layer; (3) laminating said release film with said hard coat layer formed thereon to a transparent plastic substrate film through an adhesive layer so that said hard coat layer faces said transparent plastic substrate film; (4) peeling off said release film from the laminate prepared in said step (3) to transfer said hard coat layer to said transparent plastic substrate film; (5) forming a layer having a low refractive index on the half cured hard coat layer; and (6) full curing said hard coat layer.

The third process for producing the third antireflection film according to the present invention comprises the steps of: (1) forming on a release film a layer of ultrafine particles having a high refractive index; (2) coating on said layer of ultrafine particles having a high refractive index a resin composition for a hard coat layer, having a lower refractive index than said layer of ultrafine particles having a high refractive index, to a larger thickness than said layer of ultrafine particles having a high refractive index, thereby causing said layer of ultrafine particles having a high refractive index to be entirely or partly embedded in said resin composition coating for a hard coat layer; (3) laminating a transparent plastic substrate film to said release film coated with said resin composition for a hard coat layer so that said resin composition coating for a hard coat layer faces said transparent plastic substrate film, and full curing the resultant laminate to form a hard coat layer; (4) peeling off said release film from the laminate prepared in said step (3) to transfer said hard coat layer to said transparent plastic substrate film; and (5) forming a layer having a low refractive index on the cured hard coat layer.

A modified embodiment of the third process for producing the third antireflection film according to the present invention comprises the steps of: (1) forming on a release film a layer of ultrafine particles having a high refractive index; (2) coating on said layer of ultrafine particles having a high refractive index a resin composition for a hard coat layer, having a lower refractive index than said layer of ultrafine particles having a high refractive index, to a larger thickness than said layer of ultrafine particles having a high refractive index, thereby causing said layer of ultrafine particles having a high refractive index to be entirely or partly embedded in said resin composition coating for a hard coat layer; (3) laminating a transparent plastic substrate film to said release film coated with said resin composition for a hard coat layer so that said resin composition coating for a hard coat layer faces said transparent plastic substrate film, and half curing the resultant laminate to form a hard coat layer; (4) peeling off said release film from the half cured laminate prepared in said step (3) to transfer said hard coat layer to said transparent plastic substrate film; (5) forming a layer having a low refractive index on the half cured hard coat layer; and (6) full curing said hard coat layer.

In the above processes for producing antireflection films, particularly an antireflection film, wherein ultrafine particles having a high refractive index are not entirely embedded in the hard coat layer with part of the ultrafine particles having a high refractive index being exposed on the surface of the hard coat layer (the fourth antireflection film of the present invention), can be produced by increasing the viscosity of the resin for a hard coat layer, properly selecting the kind of the resin, properly selecting a resin having a high surface tension as the above type of resin, and taking into consideration the particle diameter of the ultrafine particles having a high refractive index, the filling ratio of the ultrafine particles, the wettability of the ultrafine particles having a high refractive index by the resin for a hard coat layer, and the like.

An embodiment of a process for producing the fourth antireflection film according to the present invention comprises the steps of: (1) forming on a release film a layer of ultrafine particles having a high refractive index; (2) coating on a transparent plastic substrate film a resin composition for a hard coat layer, having a lower refractive index than said layer of ultrafine particles having a high refractive index; (3) laminating, by press-bonding, the coated transparent plastic substrate film prepared in said step (2) to the coated release film prepared in said step (1), when the coating of the resin composition for a hard coat layer is dry to the touch, so that the layer of ultrafine particles having a high refractive index on the release film faces the coating on said transparent plastic substrate film, thereby causing said layer of ultrafine particles having a high refractive index to be partly embedded in said resin composition coating for a hard coat layer; (4) full curing said laminate prepared in said step (3) to form a hard coat layer and peeling off said release film to transfer said layer of ultrafine particles having a high refractive index to said transparent plastic substrate film; and (5) forming a layer having a low refractive index on said layer of ultrafine particles, having a high refractive index, part of which is exposed on said hard coat layer.

Another embodiment of a process for producing the forth antireflection film according to the present invention comprises the steps of: (1) forming on a release film a layer of ultrafine particles having a high refractive index; (2) coating on a transparent plastic substrate film a resin composition for a hard coat layer, having a lower refractive index than said layer of ultrafine particles having a high refractive index; (3) laminating, by press-bonding, the coated transparent plastic substrate film prepared in said step (2) to the coated release film prepared in said step (1), when the coating of the resin composition for a hard coat layer is dry to the touch, so that the layer of ultrafine particles having a high refractive index on the release film faces the coating on the transparent plastic substrate film, thereby causing said layer of ultrafine particles having a high refractive index to be partly embedded in said resin composition coating for a hard coat layer; (4) half curing said laminate prepared in said step (3) to form a hard coat layer and peeling off said release film to transfer said layer of ultrafine particles having a high refractive index to said transparent plastic substrate film; (5) forming a layer having a low refractive index on said layer of ultrafine particles, having a high refractive index, part of which is exposed on said hard coat layer; and (6) full curing said hard coat layer.

In the processes for producing antireflection films according to the present invention, when a layer having a low refractive index is formed on the hard coat layer by coating or a vapor growth process, the formation of the layer having a low refractive index on the half cured hard coat layer followed by full curing offers the advantage that the adhesion of the layer having a low refractive index can be improved. The half cure is the same as described above in connection with the transparent functional film.

Ultrafine Particle Layer Having High Refractive Index in Antireflection Film

Examples of the ultrafine particles having a high refractive index used in the ultrafine particle layer having a high refractive index in the antireflection film of the present invention include ZnO (refractive index: 1.90), $TiO_2$ (refractive index: 2.3–2.7), $CeO_2$ (refractive index: 1.95), $Sb_2O_5$ (refractive index: 1.71), $SnO_2$, ITO (refractive index: 1.95), $Y_2O_3$ (refractive index: 1.87), $La_2O_3$ (refractive index: 1.95), $ZrO_2$ (refractive index: 2.05), and $Al_2O_3$ (refractive index: 1.63). Among the above ultrafine particles having a high refractive index, ZnO, $TiO_2$, $CeO_2$, and the like are preferred because UV screening properties can be further imparted to the antireflection film of the present invention. Further, the use of an antimony-doped $SnO_2$ or ITO is preferred from the viewpoint of improving electronic conductivity to prevent the adherence of dust by virtue of an antistatic effect, or to attain an electromagnetic wave shielding effect when the antireflection film of the present invention is used in CRT. In order to make the hard coat layer transparent, the particle diameter of the ultrafine particle having a high refractive index is preferably not more than 400 nm.

Ultrafine Particle Layer Having Low Refractive Index in Antireflection Film

Examples of the ultrafine particles having a low refractive index used in the ultrafine particle layer having a low refractive index in the antireflection film of the present invention include inorganic materials, such as LiF (refractive index: 1.4), $MgF_2$ (refractive index: 1.4), $3NaF\text{-}AlF_3$ (refractive index: 1.4), $AlF_3$ (refractive index: 1.4), $Na_3AlF_6$ (cryolite, refractive index: 1.33), and $SiO_x$ (x: $1.50 \leq x \leq 2.00$)(refractive index: 1.35–1.48).

Layer Having Low Refractive Index in Antireflection Film

In the antireflection film of the present invention, a layer having a low refractive index is further provided on the surface of the hard coat layer with ultrafine particles having a high refractive index being localized therein. The refractive index of the layer having a low refractive index is lower than those of the hard coat layer and the ultrafine particle layer having a high refractive index. The refractive index nL of the layer having a low refractive index is, of course, lower than the refractive index nH of the hard coat layer. Further, when the relationship between the refractive index nL of the layer having a low refractive index and the refractive index nH of the hard coat layer is closer to a requirement represented by the following formula, the antireflection effect attained is better. Therefore, it is preferred to provide the layer having a low refractive index and the hard coat layer so that the relationship between the refractive index nL of the layer having a low refractive index and the refractive index $n_H$ of the hard coat layer is as closer to a requirement represented by the following formula as possible.

$$n_L = \sqrt{n_H}$$

The layer having a low refractive index may be formed using any material having a low refractive index so far as the above requirement is met. The material may be any of inorganic materials and organic materials.

Examples of the inorganic material having a low refractive index include LiF (refractive index: 1.4), $MgF_2$ (refractive index: 1.4), $3NaF\text{-}AlF_3$ (refractive index: 1.4), $AlF_3$ (refractive index: 1.4), $Na_3AlF_6$ (cryolite, refractive index: 1.33), and $SiO_x$ (x: $1.50 \leq x \leq 2.00$)(refractive index: 1.35–1.48).

It is preferred to form the layer having a low refractive index using an inorganic material having a low refractive index because the formed layer has a high hardness. In particular, when a layer of $SiO_x$ (wherein x is $1.50 \leq x \leq 4.00$, preferably $1.70 \leq x \leq 2.20$) is formed by the plasma CVD process, it has a good hardness and an excellent adhesion to the hard coat layer and, further, heat damage to the transparent plastic substrate film can be reduced as compared with the case where other vapor growth processes are used.

The organic material having a low refractive index is preferably an organic material, such as a polymer with a fluorine atom being introduced thereinto, because the refractive index is low and not more than 1.45. Polyvinylidene fluoride (refractive index n=1.40) can be mentioned as a resin usable with a solvent because it is easy to handle. When polyvinylidene fluoride is used as the organic material having a low refractive index, the refractive index of the layer having a low refractive index becomes about 1.40. It is also possible to add an acrylate having a low refractive index, such as trifluoroethyl acrylate (refractive index n=1.32), in an amount of 10 to 300 parts by weight, preferably 100 to 200 parts by weight, for the purpose of further lowering the refractive index of the layer having a low refractive index.

It is noted that the trifluoroethyl acrylate is of monofunctional type and, therefore, the strength of the layer having a low refractive index is not satisfactory. For this reason, it is preferred to further add a polyfunctional acrylate, for example, dipentaerythritol hexacrylate (abbreviation: DPHA, tetrafunctional type), which is an ionizing radiation curing resin. The larger the amount of DPHA added, the higher the strength of the layer. However, the lower the amount of DPHA added, the lower the refractive index. For this reason, it is recommended that the amount of DPHA is 1 to 50 parts by weight, preferably 5 to 20 parts by weight.

The layer having a low refractive index can be prepared by forming, on a hard coat layer having a high refractive index, a film having a single layer structure or a multilayer structure using an inorganic material having a low refractive index by a vapor growth process, such as vapor deposition, sputtering, ion plating, or plasma CVD, or alternatively coating, on a hard coat layer having a high refractive index, a resin composition, having a low refractive index, with an inorganic material having a low refractive index being incorporated therein, or an organic material having a low refractive index to form a coating having a single layer structure or a multilayer structure.

In particular, an $SiO_x$ film formed by the plasma CVD process has a higher density than the conventional vacuum-deposited films and, hence, a higher gas barrier property. Therefore, it has excellent moisture resistance and has the advantage that, when the antireflection film of the present invention is used with the antireflection film being laminated to a polarizing element, it can serve as a barrier to moisture for the polarizing element which is recognized as having poor resistance to moisture. Table 1 shows experimental data showing the superiority of an $SiO_x$ film formed by the plasma CVD process. Films used in the experiment on moistureproofness were a triacetyl cellulose film (hereinafter referred to as "TAC"), a triacetyl cellulose film with a coating of a 7 μm-thick hard coat resin coating being formed thereon (hereinafter referred to as "HC (7 μm)/TAC"), a triacetyl cellulose film with a 1 μm-thick vinylidene fluoride coating being formed thereon (hereinafter referred to as "K coat: vinylidene fluoride (1 μm)/TAC")), and a triacetyl cellulose film with a 1000 Å-thick $SiO_x$ film being formed thereon by the plasma CVD process (hereinafter referred to as "$SiO_x$ (1000 Å)/TAC"). The moisture permeability per day of the above films was measured at a humidity of 90% and a temperature of 40° C. according to a moistureproof test specified in JIS.

| Layer construction (layer indicated on the left side be consisting the uppermost layer) | Moisture permeability (per day) |
| --- | --- |
| TAC | 600 g/m² |
| HC(7 μm)/TAC | 300 g/m² |
| K coat: Vinylidene fluoride (1 μM)/TAC | 20 g/m² |
| $SiO_x$(1000 Å)/TAC | Not more than 5 g/m² |

From the above table, it is apparent that $SiO_x$ (1000 Å)/TAC has the lowest moisture permeability, i.e., excellent moistureproof. Although the K coat: vinylidene fluoride (1 μm)/TAC has somewhat good moistureproofness, the coating is excessively flexible and yellows with time, rendering this film unsuitable for use as an optical material.

Further, when a dye or the like is used in the polarizing element or other layers, the plasma CVD film can prevent the deterioration of the dye or the like. Furthermore, the $SiO_x$ film formed by the plasma CVD process has a high density and, hence, is resistant to scratching.

Furthermore, as compared with the conventional vacuum deposited films, the x value in the $SiO_x$ film formed by the plasma CVD process can be relatively easily varied. Furthermore, the x value in the conventional vacuum deposited film is less than 2 at the highest, whereas the x value in the $SiO_x$ film formed by the plasma CVD process can exceed 2. Therefore, the $SiO_x$ film formed by the plasma CVD process can have a lower refractive index than the conventional vacuum deposited films and, hence, a higher transparency. Furthermore, it is superior to the conventional vacuum deposited films in adhesion to the substrate.

Refractive Index of Hard Coat Layer in Antireflection Film

In the first and second antireflection films of the present invention, the refractive index of the hard coat layer is higher than that of the ultrafine particles having a low refractive index. A layer construction having such a refractive index relationship can enhance the antireflection effect and prevent light reflection from the interface of the hard coat layer and other layers. In order to further enhance the antireflection effect, it is preferred for the refractive index of the hard coat layer to be higher than that of the transparent plastic substrate film. The refractive index of the hard coat layer can be enhanced by a method wherein a binder resin having a high refractive index is used in the hard coat layer, a method wherein ultrafine particles having a higher refractive index than the hard coat layer is added to the hard coat layer, or a method wherein the above two methods are combined.

Examples of the binder resin having a high refractive index include (a) a resin containing an aromatic ring, (b) a resin containing a halogen atom other than F, for example, Br, I or Cl, (c) a resin containing an atom, such as S, N or P, and a resin meeting at least one of the above requirements has a high refractive index and, hence, is preferred.

Examples of the resin a include a styrol resin, such as polystyrene, polyethylene terephthalate, polyvinyl carbazole, polycarbonate of bisphenol A. Examples of the resin b include polyvinyl chloride and polytetrabromobisphenol A glycidyl ether.

In the third and fourth antireflection film of the present invention, the refractive index of the hard coat layer in its portion where the ultrafine particle layer having a high refractive index is absent is lower than that of the ultrafine particle layer having a high refractive index. A layer construction having such a refractive index relationship can enhance the antireflection effect and prevent light reflection from the interface of the hard coat layer and other layers. In order to further enhance the antireflection effect, it is preferred for the refractive index of the hard coat layer to be higher than that of the transparent plastic substrate film.

Other Layers

In the antireflection film of the present invention, layers for imparting various functions may be further provided besides the above-described layers. For example, a primer layer or an adhesive layer may be provided on the transparent plastic substrate film for the purpose of improving the adhesion between the hard coat layer and the transparent plastic substrate film. Further, a plurality of hard coat layers may be provided for the purpose of improving the hard property. The refractive index of the above additional layer interposed between the transparent plastic substrate film and the hard coat layer is preferably intermediate between the refractive index of the transparent plastic substrate film and the refractive index of the hard coat layer.

The above additional layer may be formed by coating directly or indirectly on the transparent plastic substrate film. Alternatively, when a hard coat layer is formed on the transparent plastic substrate film by the transfer process, it is possible to use a method wherein the above additional layer is formed by coating on a hard coat layer, which have been previously formed on a transfer film, and the hard coat layer with the above additional layer being formed thereon is transferred to the transparent plastic substrate film.

A pressure-sensitive adhesive may be coated on the underside of the antireflection film of the present invention, and the antireflection film may be used by applying it to an object of antireflection, for example, a polarizing element.

Polarizing Plate and Liquid Crystal Display

A polarizing plate having improved antireflection effect can be prepared by laminating the antireflection film of the present invention to a polarizing element. A polyvinyl alcohol film, a polyvinyl formal film, a polyvinyl acetal film, and a saponified film of an ethylene-vinyl acetate copolymer, these films having been dyed with iodine or a dye and stretched, may be used in the polarizing element. In the lamination of the antireflection film to the polarizing plate, when the substrate film of the antireflection film is, for example, a triacetyl cellulose film, the triacetyl cellulose film is saponified in order to improve the adhesion and for destaticization purposes. The saponification treatment may be carried out before or after the application of the hard coat on the triacetyl cellulose film.

Figure 13:
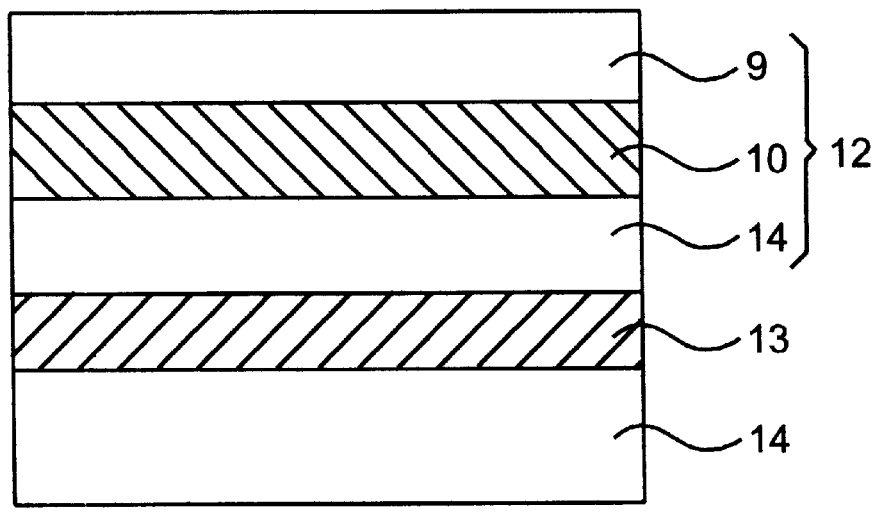
FIG. 13 is a diagram showing a layer construction of a polarizing sheet with the antireflection film of the present invention being laminated thereto.

FIG. 13 is an embodiment of a polarizing plate using the antireflection film of the present invention. In the drawing, numeral 12 designates the antireflection film of the present invention, and the antireflection film 12 is laminated onto a polarizing element 13. A triacetyl cellulose film (abbreviation: TAC film) 14 is laminated onto the other side of the polarizing element 13. The antireflection film 12 of the present invention may be laminated onto both sides of the polarizing element 13.

Figure 14:
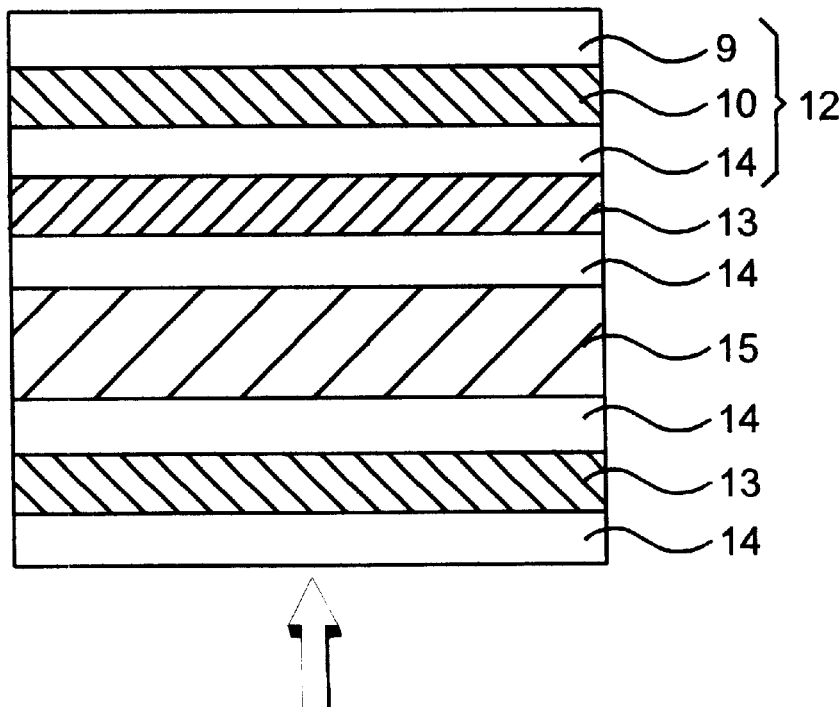
FIG. 14 is a diagram showing a layer construction of a liquid crystal display using a polarizing sheet with the antireflection film of the present invention being laminated thereto;.

FIG. 14 is an embodiment of a liquid crystal display using the antireflection film of the present invention. A polarizing plate shown in FIG. 13, that is, a polarizing plate having a layer construction of TAC film/polarizing element/antireflection film is laminated onto a liquid crystal display device 15. On the other hand, a polarizing plate having a layer construction of TAC film/polarizing element/TAC film is laminated onto the other side of the liquid crystal display device 15. In the case of an STN type liquid crystal display, a phase plate is inserted between the liquid crystal display device and the polarizing plate.

Invention Belonging to Group B

Antireflection Sheet

Figure 15:
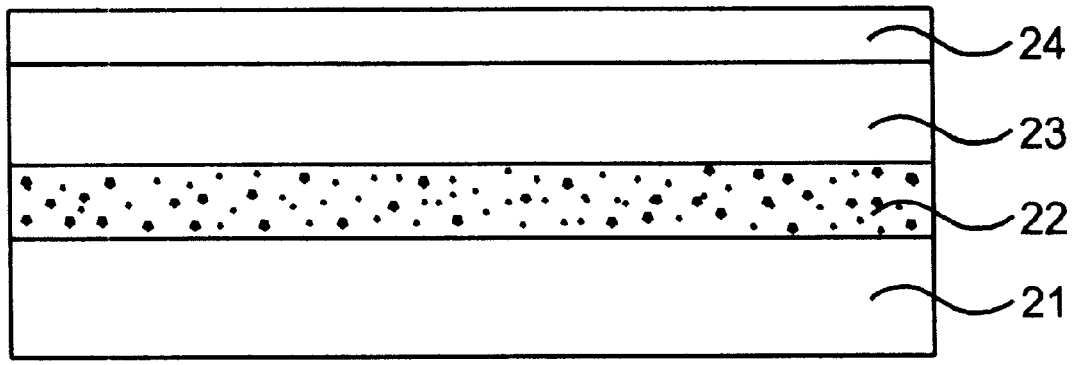
FIG. 15 is a cross-sectional view of an antireflection sheet of type I of the present invention belonging to group B.
Figure 16:
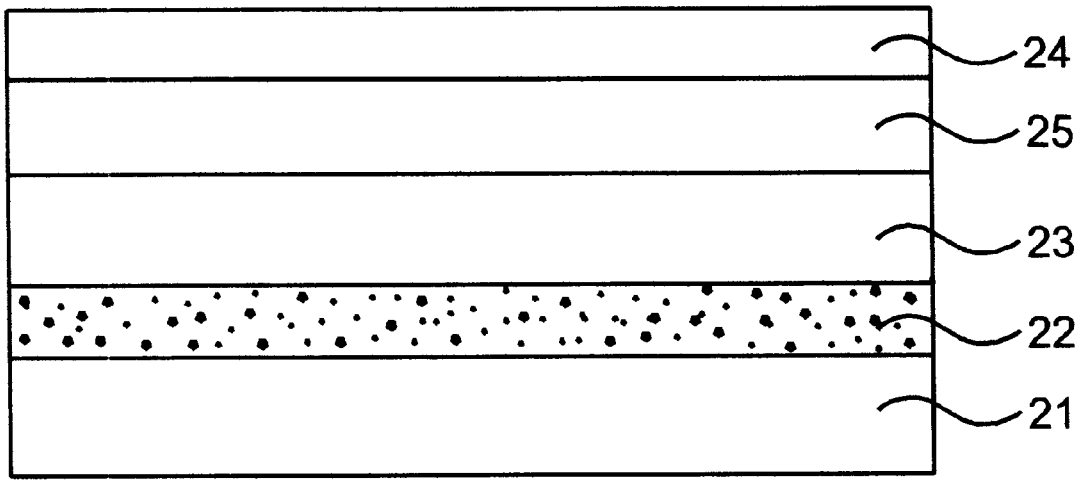
FIG. 16 is a cross-sectional view of an antireflection sheet of type II of the present invention belonging to group B.

The antireflection sheet of the present invention is divided into type I, wherein no layer having a high refractive index is provided, and type II, wherein a layer having a high refractive index is provided. An antireflection sheet of type I of the present invention is shown in FIG. 15. Numeral 21 designates a transparent substrate film, and a hard coat layer 23 and a layer 24 having a low refractive index are formed on the transparent substrate film 21 through an adhesive layer 22. An antireflection sheet of type II of the present invention is shown in FIG. 16. The antireflection sheet of type II is the same as the antireflection sheet of type I, except that a layer 25 having a high refractive index is further provided between the hard coat layer 23 and the layer 24 having a low refractive index.

Process for Producing Antireflection Sheet

Figure 17A:
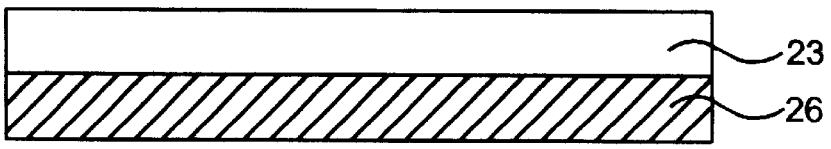
FIGS. 17a–d show a flow diagram showing an embodiment of the first process for producing an antireflection sheet of type I of the present invention belonging to group B.
Figure 17B:
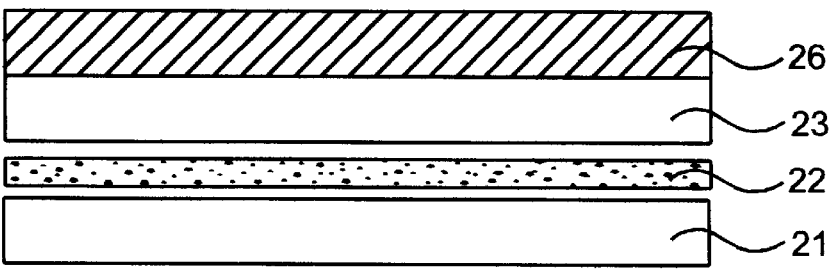
Figure 17C:
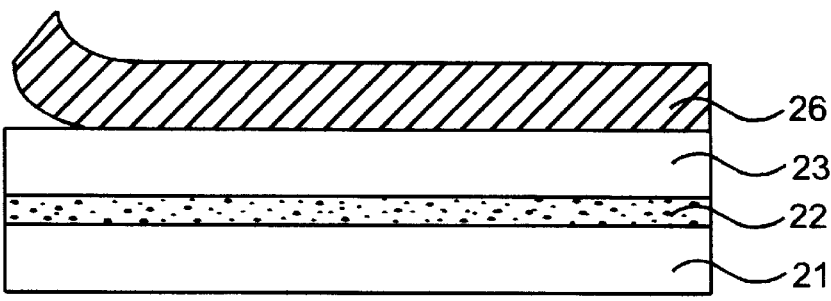
Figure 17D:
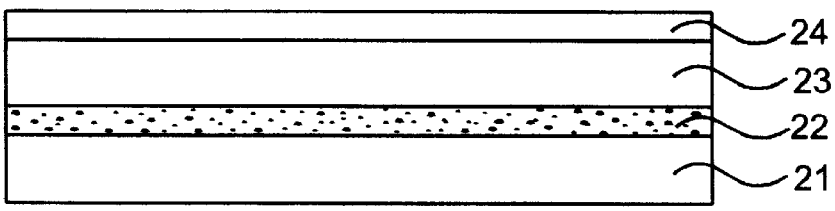

FIG. B3 is a flow diagram showing an embodiment of the first process for producing an antireflection sheet of type I of the present invention. FIG. 17a shows the step of forming a hard coat layer 23 on a release film 26. The hard coat layer 23 may be, if necessary, subjected to a treatment, such as aging or ionizing radiation curing. FIG. 17b shows the step of laminating the hard coat layer 23 to a transparent substrate film 21 through an adhesive layer 22 of an adhesive. The adhesive layer 22 may be formed by coating an adhesive on the transparent substrate film 21 or the hard coat layer 23. The adhesive may be used as such or after dissolution or dispersion thereof in a solvent. FIG. 17c shows the step of peeling off the release film 26 from the laminate to transfer the coating provided on the release film 26 to the transparent substrate film 21. FIG. 17d shows the step of forming a layer 24 having a low refractive index on the exposed hard coat layer 23.

In the production process shown in FIG. 17a–d, an antireflection sheet of type II according to the present invention can be produced by forming, on the release film 26 shown in FIG. 17a, first a layer having a high refractive index and then a hard coat layer 23 and repeating the procedure described above.

Figure 18A:
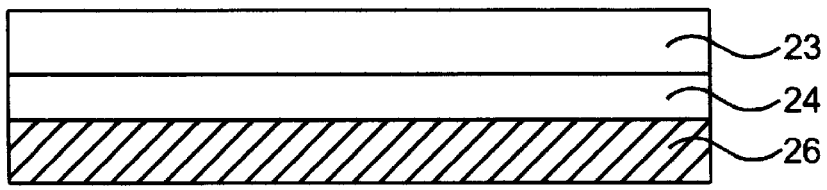
FIGS. 18a–c show a flow diagram showing an embodiment of the second process for producing an antireflection sheet of type I of the present invention belonging to group B.
Figure 18B:
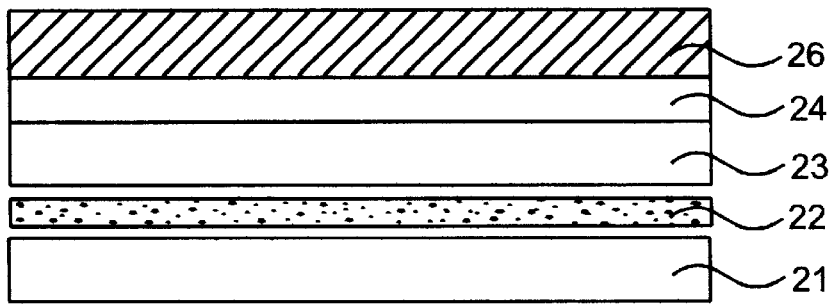
Figure 18C:
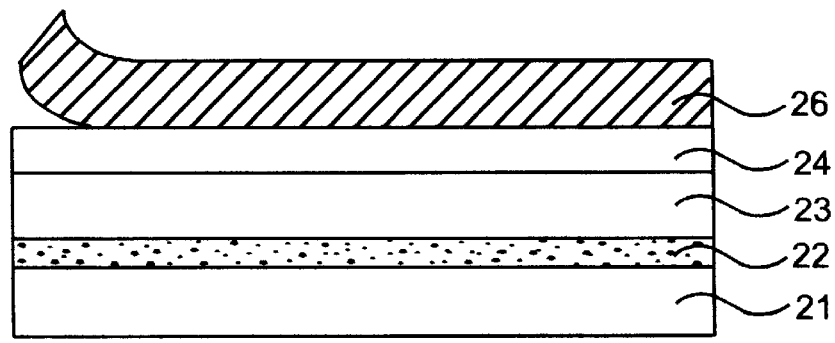

FIGS. 18a–c show a flow diagram showing an embodiment of the second process for producing an antireflection sheet of type I according to the present invention. FIG. 18a shows the step of forming a layer 24 having a low refractive index on a release film 26 and forming a hard coat layer 23 on the layer 24 having a low refractive index. FIG. 18b shows the step of laminating on a release film 26 each layer formed in the step (a) to a transparent substrate film 1 through an adhesive layer 22 comprising an adhesive. The adhesive layer 22 may be formed by coating an adhesive on either the transparent substrate film 21 or the hard coat layer 23. The adhesive may be used as such or after dissolution or dispersion in a solvent. FIG. 18c shows the step of peeling off the release film 26 from the laminate to transfer the coating on the release film 26 to the transparent substrate film 21.

In the production process shown in FIGSS. 18a–c, an antireflection sheet of type II according to the present invention can be produced by forming, between the layer 24 having a low refractive index and the hard layer 23 on the release film 26 in the step (a), a layer having a high refractive index and then repeating the procedure described above.

In the above processes, in an embodiment where a urethane adhesive is used as the adhesive, the urethane adhesive is coated in a solution form, the solvent is removed and lamination is carried out. At this time, the urethane adhesive has a pressure-sensitive adhesive property, and, therefore, even immediately after the lamination, exhibits a certain degree of bond strength. In this case, a roll used for lamination is preferably heated to 40 to 80° C. to further improve the bond strength immediately after lamination. Further, in order to attain a sufficient bond strength between the transparent substrate film and the hard coat layer of the antireflection sheet, the thickness on a dry basis of the adhesive layer should be 0.5 to 20 μm, preferably 1 to 10 μm.

Release Film

A sheet, the surface of which has been subject to or not been subjected to a treatment with a silicone, fluorine, acryl-melamine, or the like for rendering the surface of the sheet releasable, is generally used. The surface of the sheet may be uneven. In this case, since the unevenness is formed on the surface of the final product, it is possible to impart an antireflection effect or a glare protection effect to the transparent functional film.

Transparent Plastic Substrate Film

Any transparent plastic film may be suitably used as the transparent plastic substrate film for the transparent functional film, and example thereof include a triacetyl cellulose film, a diacetyl cellulose film, a cellulose acetate butyrate film, a polyether sulfone film, a polyacrylic resin film, a polyurethane resin film, a polyester film, a polycarbonate film, a polysulfone film, a polyether film, a trimethylpentane film, a polyether ketone film, and a (meth)acrylonitrile film. Among them, a triacetyl cellulose film and a uniaxial stretched polyester film are particularly favorable because they have excellent transparency and no optical anisotropy. The thickness of the transparent substrate film is, in general, preferably in the range of from about 8 to 1000 μm.

Hard Coat Layer

In the present invention, "hard coat layer" or "having a hard property" refers to a coating having a hardness of not less than H as measured by a pencil hardness test specified in JIS K5400.

The hard coat layer may comprise any material regardless of inorganic materials and organic materials. When an inorganic material is used as a material for a hard coat layer, the hard coat layer may be formed, for example, using a metal oxide by a known process, such as vacuum deposition, ion plating, sputtering or (plasma) CVD. Alternatively, a film of a double oxide may be formed by the sol-gel process. When the material for the hard coat layer is an organic material, any resin (for example, a thermoplastic resin, a thermosetting resin, or an ionizing radiation curing resin) may be used as a binder resin so far as it is transparent. In order to impart a hard property, the thickness of the hard coat layer is not less than 0.5 μm, preferably not less than 3 μm. When the thickness falls within the above range, it is possible to maintain the hardness, so that the hard property can be imparted to the antireflection sheet.

In order to further improve the hardness of the hard coat layer, it is preferred to use, as the binder resin for the hard coat layer, a reaction curing resin, i.e., a thermosetting resin and/or an ionizing radiation curing resin. The ionizing radiation curing resin is best suited as the binder resin for a hard coat layer from the viewpoint of productivity, energy efficiency, heat damage to the release film, and the like.

Examples of the thermosetting resin include a phenolic resin, a urea resin, a diallyl phthalate resin, a melamine resin, a guanamine resin, an unsaturated polyester resin, a polyurethane resin, an epoxy resin, an aminoalkyd resin, a melamine-urea copolycondensed resin, a silicon resin, and a polysiloxane resin. If necessary, curing agents, such as crosslinking agents and polymerization initiators, polymerization accelerators, solvents, viscosity modifiers, and the like may be added to these resins.

The ionizing radiation curing resin is preferably one having an acrylate functional group, and examples thereof include a polyester resin, a polyether resin, an acrylic resin, an epoxy resin, a urethane resin, an alkyd resin, a spiroacetal resin, a polybutadiene resin, and a polythiol-polyene resin having a relatively low molecular weight, an oligomer or a prepolymer of a (meth)acrylate or the like of a polyfunctional compound, such as a polyhydric alcohol, and those containing a relatively large amount of a reactive diluent, such as a monofunctional monomer, such as ethyl (meth) acrylate, ethylhexyl (meth)acrylate, styrene, methylstyrene, or N-vinylpyrrolidone, and a polyfunctional monomer, for example, trimethylolpropane tri(meth)acrylate, hexanediol (meth)acrylate, tripropylene glycol di(meth)acrylate, diethylene glycol di(meth)acrylate, pentaerythritol tri(meth) acrylate, dipentaerythritol hexa(meth)acrylate, 1,6-hexanediol di(meth)acrylate, or neopentyl glycol di(meth) acrylate.

Among them, a mixture of a polyester acrylate with polyurethane acrylate is particularly preferred. The reason for this is as follows. The polyester acrylate provides a coating having a very high hardness and is, therefore, suitable for the formation of a hard coat. Since, however, a coating consisting of polyester acrylate alone has low impact resistance and is fragile, the polyurethane acrylate is used in combination with the polyester acrylate to impart the impact resistance and flexibility to the coating. The proportion of the polyurethane acrylate incorporated based on 100 parts by weight of the polyester acrylate is not more than 30 parts by weight. This is because the incorporation of the polyurethane acrylate in an amount exceeding the above upper limit 30 parts by weight makes the coating so flexible that the hard property is lost.

In order to bring the above ionizing radiation curing resin composition to UV curing type, it is preferred to incorporate, into the ionizing radiation curing resin composition, a photopolymerization initiator, such as an acetophenone compound, a benzophenone compound, Michler's benzoylbenzoate, an α-amyloxime ester, tetramethyl thiuram monosulfide, or a thioxanthone compound, and a photosensitizer, such as n-butylamine, triethylamine, or tri-n-butylphosphine. In the present invention, it is particularly preferred to incorporate urethane acrylate or the like as an oligomer and dipentaerythritol hexa(meth)acrylate or the like as a monomer.

In order to impart particularly flexibility to the hard coat layer, a solvent type resin may be incorporated in an amount of 10 to 100 parts by weight based on 100 parts by weight of the ionizing radiation curing resin. A thermoplastic resin is mainly used as the solvent type resin. The solvent type thermoplastic resin added to the ionizing radiation curing resin may be any conventional resin used in the art. In particular, when a blend of a polyester acrylate with a polyurethane acrylate is used as the ionizing radiation curing resin, the use of polymethyl methacrylate acrylate or polybutyl methacrylate acrylate as the solvent type resin enables the hardness of the coating to be kept high. Further, this is advantageous also from the viewpoint of transparency, particularly, low haze value, high transmittance, and compatibility, because since the refractive index of the polymethyl methacrylate acrylate or polybutyl methacrylate acrylate is close to that of the main ionizing radiation curing resin, the transparency of the coating is not lost.

In the hard coat layer, when an ionizing radiation curing resin is used as the binder resin, the ionizing radiation curing resin may be cured by the conventional curing method usually employed for curing ionizing radiation curing resins, that is, applying an electron beam or ultraviolet light. For example, in the case of curing with an electron beam, use may be made of an electron beam or the like having an energy of 50 to 1000 KeV, preferably 100 to 300 Kev, emitted from various electron beam accelerators, such as a Cockcroft-Walton (type) accelerator, a van de Graaff accelerator, a resonance transformer accelerator, an insulation core transformer accelerator, a linear accelerator, a dynatron accelerator, and a high frequency accelerator. On the other hand, in the case of curing with UV, use may be made of ultraviolet light or the like emitted from an ultrahigh pressure mercury lamp, a high pressure mercury lamp, a low pressure mercury lamp, a carbon arc, a xenon arc, a metal halide lamp, and the like.

In order to improve the antireflection effect, it is preferred for the refractive index of the hard coat layer to be higher than that of the transparent substrate. When the hard coat layer comprises an inorganic material, a high refractive index can be easily attained by using a transparent metal or a metal oxide having a desired refractive index. On the other hand, when the hard coat layer comprises an organic material, the refractive index of the hard coat layer can be made high by the following methods.

(a) A resin for a hard coat layer with ultrafine particles having a high refractive index being dispersed therein is used. (b) A resin having a high refractive index with a large amount of molecules or atoms having a high refractive index being introduced into a component constituting the resin is used.

Examples of the above ultrafine particles having a high refractive index include ZnO (refractive index: 1.90), $TiO_2$ (refractive index: 2.3–2.7), $CeO_2$ (refractive index: 1.95), $Sb_2O_5$ (refractive index: 1.71), $SnO_2$, ITO (refractive index: 1.95), $Y_2O_3$ (refractive index: 1.87), $La_2O_3$ (refractive index: 1.95), $ZrO_2$ (refractive index: 2.05), and $Al_2O_3$ (refractive index: 1.63).

Examples of the molecule and atom of the component, which can improve the refractive index, include (a) an aromatic ring, (b) a halogen atom other than F, and (c) an atom such as S, N, or P.

Layer Having Low Refractive Index

The refractive index of the layer having a low refractive index should be lower than that of at least the hard coat layer. The layer having a low refractive index may comprise any material regardless of an inorganic material and an organic material. The thickness thereof should be as low as about 0.1 $\mu$m. The refractive index of the layer having a low refractive index preferably meet a requirement represented by the formula (1) or (2) from the viewpoint of enhancing the antireflection effect.

The material having a low refractive index used in the formation of the layer having a low refractive index may be any inorganic or organic material so far as it can meet a requirement represented by the formula (1) or (2).

Examples of the inorganic material having a low refractive index include LiF (refractive index: 1.4), $MgF_2$ (refractive index: 1.4), $3NaF-AlF_3$ (refractive index: 1.4), $AlF_3$ (refractive index: 1.4), $Na_3AlF_6$ (cryolite, refractive index: 1.33), and $SiO_x$ (x: $1.50 \leq x \leq 2.00$) (refractive index: 1.35–1.48). A film formed using an inorganic material having a low refractive index has increased hardness. In particular, when a layer of $SiO_x$ (wherein x is $1.50 \leq x \leq 4.00$, preferably $1.70 \leq x \leq 2.20$) is formed by the plasma CVD process, it has good hardness and an excellent adhesion to the hard coat layer and, further, heat damage to the transparent plastic substrate film can be reduced as compared with the case where other vapor growth processes are used. The layer having a low refractive index using an inorganic material having a low refractive index may be prepared by forming a film having a single layer structure or a multilayer structure using an inorganic material having a low refractive index by a vapor growth process, such as vapor deposition, sputtering, ion plating, or plasma CVD, or alternatively coating, on a hard coat layer having a high refractive index, a resin composition, having a low refractive index, with an inorganic material having a low refractive index being incorporated therein, or an organic material having a low refractive index to form a coating having a single layer structure or a multilayer structure.

In particular, an $SiO_x$ film formed by the plasma CVD process has a higher density than the conventional vacuum-deposited films and, hence, a higher gas barrier property. Therefore, it has excellent moisture resistance and has the advantage that, when the antireflection sheet of the present invention is used with the antireflection sheet being laminated to a polarizing element, it can serve as a barrier to moisture for the polarizing element which is recognized as having poor resistance to moisture.

The organic material having a low refractive index is preferably a polymer with a fluorine atom being introduced thereinto because the refractive index is low and not more than 1.45. Polyvinylidene fluoride (refractive index n=1.40) can be mentioned as a resin usable with a solvent because it is easy to handle. When polyvinylidene fluoride is used as the organic material having a low refractive index, the refractive index of the layer having a low refractive index becomes about 1.40. It is also possible to add an acrylate having a low refractive index, such as trifluoroethyl acrylate (refractive index n=1.32), in an amount of 10 to 300 parts by weight, preferably 100 to 200 parts by weight, for the purpose of further lowering the refractive index of the layer having a low refractive index.

It is noted that the trifluoroethyl acrylate is of monofunctional type and, therefore, the strength of the layer having a low refractive index is not satisfactory. For this reason, it is preferred to further add a polyfunctional acrylate, for example, dipentaerythritol hexacrylate (abbreviation: DPHA, tetrafunctional type), which is an ionizing radiation curing resin. The larger the amount of DPHA added, the higher the strength of the layer. However, the lower the amount of DPHA added, the lower the refractive index. For this reason, it is recommended that the amount of DPHA is 1 to 50 parts by weight, preferably 5 to 20 parts by weight.

Layer Having High Refractive Index

In order to further improve the antireflection effect through the prevention of light reflection from the interface of layers, a layer having a higher refractive index than the hard coat layer is preferably formed between the layer having a low refractive index and the hard coat layer. The thickness of the layer having a high refractive index should be as small as about 0.1 $\mu$m. For example, a thin film of a metal or a metal oxide having a high refractive index may be formed in the same manner as described above in connection with the hard coat layer. Alternatively, a dispersion of ultrafine particles having a high refractive index, cited above in connection with the description of the hard coat layer, in a binder resin may be used. Further, it is also possible to use a resin containing a molecule or an atom of a component capable of improving the refractive index as described above in connection with the description of the hard coat layer.

Urethane Adhesive

In order to form a strong bond between the hard coat layer and the transparent substrate and, at the same time, to impart sufficient hardness and durability to the antireflection sheet, it is indispensable to use a urethane adhesive. Preferred examples of the urethane adhesive include reaction curing urethane adhesives, such as moisture curing (one-pack type) and thermosetting (two-pack type) urethane adhesives. More specifically, for the moisture curing urethane adhesive, an oligomer or a prepolymer of a polyisocyanate compound may be used. On the other hand, for the thermosetting urethane adhesive, a mixture of a monomer, an oligomer, or a prepolymer of a polyisocyanate compound with an oligomer or a prepolymer of a polyol compound may be used. When these reaction curing urethane adhesives are used, aging at a temperature in the range of from room temperature to about 80° C. after lamination is favorable from the viewpoint of avoiding thermal influence on the antireflection sheet.

When the transparent substrate film has an OH group, for example, when the transparent substrate film is a triacetyl cellulose film, which has been treated with an alkali, an isocyanate group contained in the urethane adhesive reacts with the OH group containing the transparent substrate film to form a strong bond.

Polarizing Plate and Liquid Crystal Display

A pressure-sensitive adhesive may be applied on the underside of the antireflection film according to the present invention, and the antireflection film may be applied to an object of antireflection, for example, a polarizing element to provide a polarizing plate.

A polyvinyl alcohol film, a polyvinyl formal film, a polyvinyl acetal film, and a saponified film of an ethylene-vinyl acetate copolymer, these films having been colored by iodine or a dye and stretched, may be used in the polarizing element. In the lamination of the antireflection film to the polarizing plate, when the substrate film of the antireflection film is, for example, a triacetyl cellulose film, the triacetyl cellulose film is saponified in order to improve the adhesion and for destaticization purposes. The saponification treatment may be carried out before or after the application of the hard coat on the triacetyl cellulose film.

Figure 19:
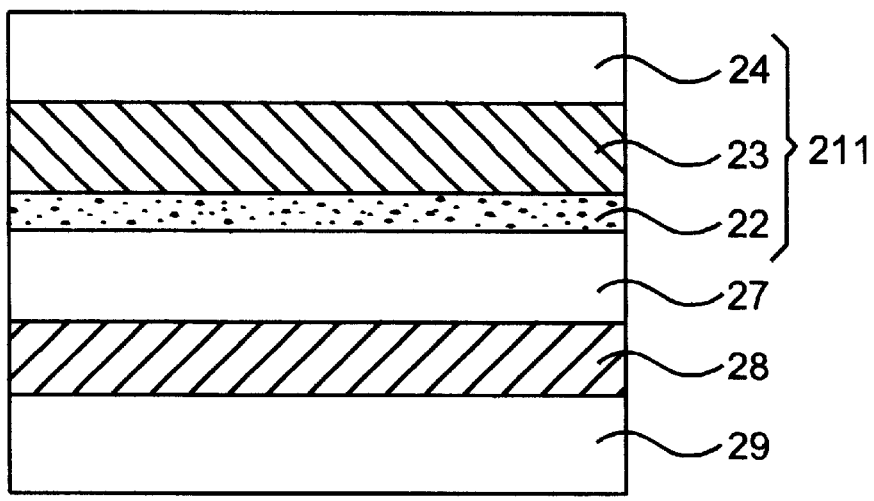
FIG. 19 is a cross-sectional view of an embodiment of a polarizing sheet using an antireflection film of the present invention belonging to group B.

FIG. 19 is an embodiment of a polarizing plate using the antireflection film of the present invention. In the drawing, numeral 211 designates the antireflection film of the present invention having an antireflection effect, and the antireflection film 211 is laminated onto a polarizing element 28. A triacetyl cellulose film (abbreviation: TAC film) 29 is laminated onto the other side of the polarizing element 28. The antireflection film 211 of the present invention may be laminated onto both sides of the polarizing element 28.

Figure 20:
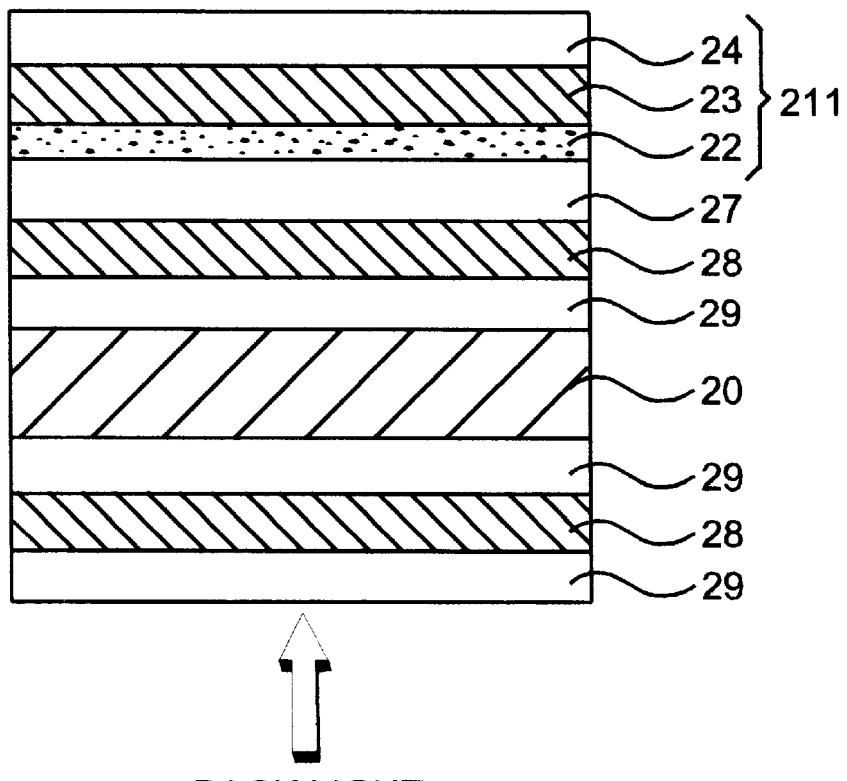
FIG. 20 is a cross-sectional view of an embodiment of a liquid crystal display using an antireflection film of the present invention belonging to group B.

FIG. 20 is an embodiment of a liquid crystal display using the antireflection film of the present invention. A polarizing plate shown in FIG. 19, that is, a polarizing plate having a layer construction of TAC film/polarizing element/antireflection film is laminated onto a liquid crystal display device 20. On the other hand, a polarizing plate having a layer construction of TAC film/polarizing element/TAC film is laminated onto the other side of the liquid crystal display device 20. In the case of an STN type liquid crystal display, a phase plate is inserted between the liquid crystal display and the polarizing plate.

Invention Belonging to Group C
Transparent Functional Membrane and Transparent Functional Film A transparent functional membrane according to the present invention belonging group C comprises (1) a functional ultrafine particle layer having a multilayer structure, two or more layers constituting said functional ultrafine particle layer being integrated with each other and comprising respective separate aggregates of two or more types of functional ultrafine particles or comprising respective aggregates of two or more types of functional ultrafine particles partly mixed with each other, (2) said functional ultrafine particle layer having a multilayer structure being in contact with a resin layer and localized in and fixed to said resin layer in a region ranging from the interface of said functional ultrafine particle layer and said resin layer to the interior of said resin layer.

In the transparent functional film of the present invention, the transparent functional membrane may be formed on the transparent plastic substrate film.

A transparent functional film of type I having an antireflection effect according to the present invention comprises (1) a functional ultrafine particle layer having a multilayer structure, two or more layers constituting said functional ultrafine particle layer being integrated with each other and comprising respective separate aggregates of two or more types of functional ultrafine particles or comprising respective aggregates of two or more types of functional ultrafine particles partly mixed with each other, (2) said functional ultrafine particle layer having a multilayer structure being localized in and fixed to a resin layer in a region ranging from the interface of said functional ultrafine particle layer and an air layer to the interior of said resin layer, thereby forming a transparent functional membrane, (3) said transparent functional membrane being provided on a transparent plastic substrate film, (4) said two or more layers constituting said functional ultrafine particle layer being provided in the following repeated order from the interface of said functional ultrafine particle layer and said air layer toward the interior of said resin layer: an ultrafine particle layer having a low refractive index, an ultrafine particle layer having a high refractive index, an ultrafine particle layer having a low refractive index, an ultrafine particle layer having a high refractive index and so on. The functional ultrafine particle layer may be partly exposed on the surface of the resin layer or alternatively may be entirely embedded in the resin layer.

In the present specification, the term "low refractive index" or "high refractive index" is used to indicate that the refractive index is "high" or "low" as compound with the refractive index of a layer(s) in contact with the contemplated layer.

Figure 21:
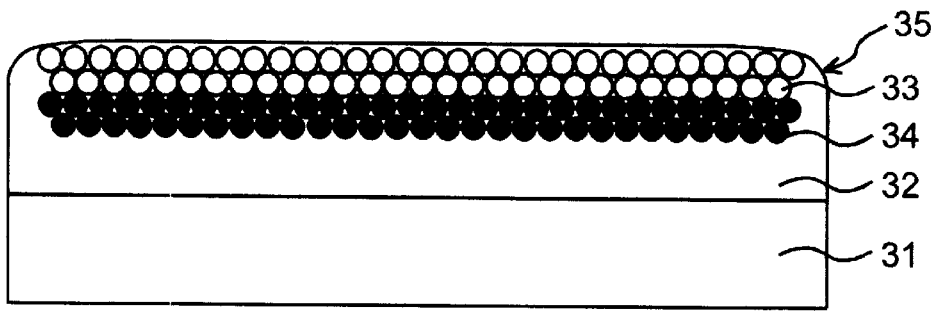
FIG. 21 is a diagram showing an embodiment of a layer construction of a transparent functional film, having an antireflection effect, of type I of the present invention belonging to group C, wherein a functional ultrafine particle layer is entirely embedded in a resin layer.
Figure 22:
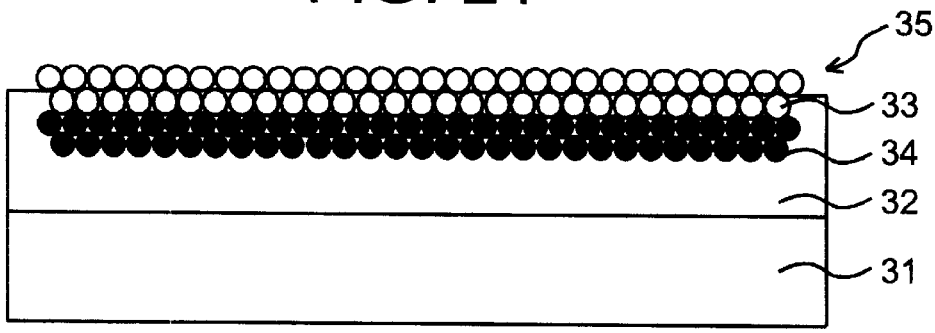
FIG. 22 is a diagram showing an embodiment of a layer construction of a transparent functional film, having an antireflection effect, of type I of the present invention belonging to group C, wherein a functional ultrafine particle layer is partly exposed on a resin layer.

FIGS. 21 and 22 show embodiments of a layer construction of a transparent functional film of type I having an antireflection effect according to the present invention, wherein for an embodiment shown in FIG. 21, a functional ultrafine particle layer is entirely embedded in a resin layer, while for an embodiment shown in FIG. 22, part of the functional ultrafine particle layer is exposed on the surface of the resin layer. In FIG. 21, numeral 31 designates a transparent plastic substrate film, numeral 32 a resin layer, numeral 33 an ultrafine particle layer having a low refractive index, and numeral 34 an ultrafine particle layer having a high refractive index. For the ultrafine particle layer 33 having a low refractive index and the ultrafine particle layer 34 having a high refractive index, two or more types of functional ultrafine particles are separately aggregated to form two or more different layers which are integrated with each other, thereby forming a functional ultrafine particle layer 35 having a multilayer structure, or alternatively two or more types of functional ultrafine particles partly mixed with each other are separately aggregated to form two or more different layers which are integrated with each other, thereby forming a functional ultrafine particle layer 35 having a multilayer structure. The functional ultrafine particle layer 35 is entirely embedded in the resin layer 32.

The construction of the transparent functional film having an antireflection effect shown in FIG. 22 is the same as that shown in FIG. 21, except that part of a functional ultrafine particle layer 35 comprising an ultrafine particle layer 33 having a low refractive index and an ultrafine particle layer 34 having a high refractive index is exposed on the surface of a resin layer 2.

A transparent functional film of type II having an antireflection effect according to the present invention comprises (1) a functional ultrafine particle layer having a multilayer structure, two or more layers constituting said functional ultrafine particle layer being integrated with each other and comprising respective separate aggregates of two or more types of functional ultrafine particles or comprising respective aggregates of two or more types of functional ultrafine particles partly mixed with each other, (2) said functional ultrafine particle layer having a multilayer structure being localized in and fixed to a resin layer in a region from the uppermost surface of a resin layer to the interior of said resin layer, (3) a resin layer having a low refractive index, or a layer having a low refractive index, comprising an inorganic layer having a low refractive index formed by a vapor growth process, being provided on said resin layer, thereby forming a transparent functional membrane, (4) said transparent functional membrane being provided on a transparent plastic substrate film, (5) said two or more layers constituting said functional ultrafine particle layer being provided in the following repeated order from the uppermost surface of said resin layer toward the interior of said resin layer: an ultrafine particle layer having a high refractive index, an ultrafine particle layer having a low refractive index, an ultrafine particle layer having a high refractive index, and so on. The surface of the functional ultrafine particle layer may be partly exposed on the resin layer or alternatively may be entirely embedded in the resin layer.

Figure 23:
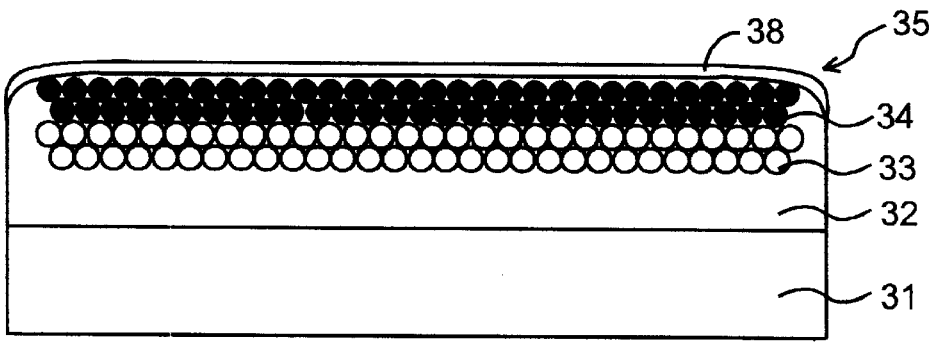
FIG. 23 is a diagram showing an embodiment of a layer construction of a transparent functional film, having an antireflection effect, of type II of the present invention belonging to group C, wherein a functional ultrafine particle layer is entirely embedded in a resin layer.
Figure 24:
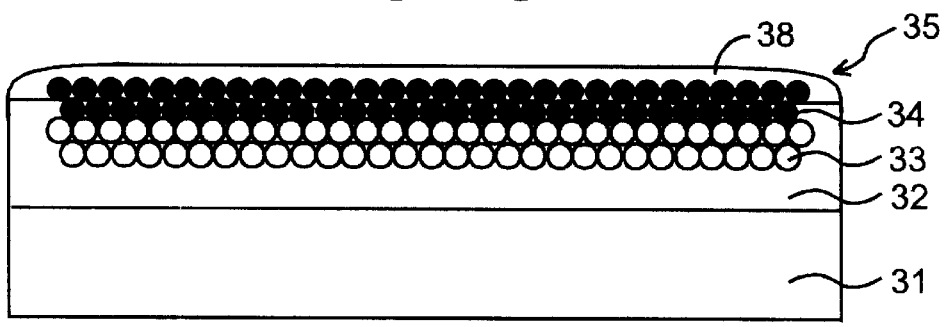
FIG. 24 is a diagram showing an embodiment of a layer construction of a transparent functional film, having an antireflection effect, of type II of the present invention belonging to group C, wherein part of a functional ultrafine particle layer is partly exposed on a resin layer.

FIGS. 23 and 24 show embodiments of a layer construction of a transparent functional film of type II having an antireflection effect according to the present invention, wherein for an embodiment shown in FIG. 23, a functional ultrafine particle layer is entirely embedded in a resin layer, while for an embodiment shown in FIG. 24, part of the functional ultrafine particle layer is exposed on the surface of the resin layer.

In FIG. 23, numeral 31 designates a transparent plastic substrate film, numeral 32 a resin layer, numeral 33 an ultrafine particle layer having a low refractive index, and numeral 34 an ultrafine particle layer having a high refractive index. For the ultrafine particle layer 33 having a low refractive index and the ultrafine particle layer 34 having a high refractive index, two or more types of functional ultrafine particles are separately aggregated to form two or more different layers which are integrated with each other, thereby forming a functional ultrafine particle layer 35 having a multilayer structure, or alternatively two or more types of functional ultrafine particles partly mixed with each other are separately aggregated to form two or more different layers which are integrated with each other, thereby forming a functional ultrafine particle layer 35 having a multilayer structure. The functional ultrafine particle layer 35 having an integral structure is entirely embedded in the resin layer 32. A layer 38, having a low refractive index, of a resin or a layer 38, having a low refractive index, of an inorganic layer having a low refractive index formed by a vapor growth process is provided as the uppermost layer of the transparent functional film.

The construction of the transparent functional film having an antireflection effect shown in FIG. 24 is the same as that shown in FIG. 23, except that part of a functional ultrafine particle layer 35 comprising an ultrafine particle layer 33 having a low refractive index and an ultrafine particle layer 34 having a high refractive index is exposed on the surface of a resin layer 32 and, further, a layer 38 having a low refractive index is formed on the functional ultrafine particle layer 35.

In the transparent functional film of type II having an antireflection effect according to the present invention as shown in FIGS. 23 and 24, the two or more layers constituting the functional ultrafine particle layer 35 are provided in the following repeated order from the interface of the layer 38 having a low refractive index and the resin layer 32 toward the interior of the resin layer 32: an ultrafine particle layer 34 having a high refractive index, an ultrafine particle layer 33 having a low refractive index, an ultrafine particle layer 34 having a high refractive index and so on The number of layers constituting the functional ultrafine particle layer 35 may be any number of two or more.

In the transparent functional membrane and the transparent functional film according to the present invention, the uppermost surface may be finely uneven. In this case, a glare protection effect and/or an antireflection effect can be imparted to the transparent functional membrane and the transparent functional film. When the transparent functional film is used for antireflection purposes, the above finely uneven surface serves to further enhance the antireflection effect. The surface can be made uneven, for example, by laminating each layer onto a release film having a finely uneven surface, laminating the resultant laminate onto a transparent plastic substrate film, and peeling off the release film, thereby forming a laminate having a finely uneven surface.

Process for Producing a Transparent Functional Film

The first process for producing a transparent functional film according to the present invention comprises the steps of: (1) successively forming on a release film two or more different functional ultrafine particle layers respectively using different functional ultrafine particles; (2) coating a resin on a transparent plastic substrate film to form an uncured resin layer; (3) laminating, by press-bonding, the coated transparent plastic substrate film prepared in said step (2), as such, when said resin contains no solvent, or after removing a solvent when said resin contains a solvent as a diluent, to the coated release film prepared in said step (1) so that the functional ultrafine particle layer on the release film faces the resin layer on said transparent plastic substrate film, thereby causing said functional ultrafine particle layer to be entirely or partly embedded in said resin layer; and (4) curing said resin layer and peeling off said release film to transfer said functional ultrafine particle layer to said transparent plastic substrate film.

The second process for producing a transparent functional film according to the present invention comprises the steps of: (1) successively forming on a release film two or more different functional ultrafine particle layers respectively using different functional ultrafine particles; (2) coating a resin on said functional ultrafine particle layer and permitting said resin to penetrate into between said functional ultrafine particles, thereby causing said functional ultrafine particle layer to be embedded in said resin layer to form a resin layer having a larger thickness than said functional ultrafine particle layer, (3) laminating, by press-bonding, a transparent plastic substrate film to the coated release film, with said resin layer being in an uncured state, prepared in said step (2), as such, when said resin contains no solvent, or after removing a solvent when said resin contains a solvent as a diluent so that the functional ultrafine particle layer on the release film faces said transparent plastic substrate film; and (4) curing said resin layer and peeling off said release film to transfer said laminate on said release film to said transparent plastic substrate film.

The third process for producing a transparent functional film according to the present invention comprises the steps of: (1) successively forming on a release film two or more different functional ultrafine particle layers respectively using different functional ultrafine particles; (2) coating a resin on said functional ultrafine particle layer and permitting said resin to penetrate into between said functional ultrafine particles, thereby forming a resin layer having a larger thickness than said functional ultrafine particle layer, and curing said resin layer; (3) coating an adhesive on either said resin layer formed on said release film or a separately prepared transparent plastic substrate film, and laminating said coated release film and said transparent plastic substrate film to each other so that said resin layer faces said transparent plastic substrate film; and (4) peeling off said release film to transfer said laminate on said release film to said transparent plastic substrate film.

In the above processes for producing the first to third transparent functional films, particularly in the production of a transparent functional film wherein the functional ultrafine particle layer is not entirely embedded in the resin layer and part thereof is exposed on the surface of the resin layer (transparent functional films shown in FIGS. 22 and 24), consideration should be given to the viscosity of a resin for a resin layer, the kind of the resin, the surface tension of the resin, the particle diameter of functional ultrafine particles, the filling ratio of the ultrafine particles, the wettability of the functional ultrafine particles by the resin for a resin layer, and the like.

More specifically, when a resin which has a high viscosity or is dry to the touch at the time of coating is selected as the resin for a resin layer, part of the functional ultrafine particles is likely to expose. Further, the selection of a resin having a low surface tension or functional ultrafine particles having a small particle diameter, which can provide a high filling ratio, gives the same results. Furthermore, the same results can be obtained when the resin and the ultrafine particles are selected so that the wettability of the ultrafine particles by the resin is poor.

In the above processes for producing the first to third transparent functional films, when the transparent functional film of type I according to the present invention is produced, the functional ultrafine particle layer comprising two or more different layers provided on a release film is prepared by forming an ultrafine particle layer having a low refractive index and an ultrafine particle layer having a high refractive index in that order.

In the above processes for producing the first to third transparent functional films, the transparent functional film of type II according to the present invention can produced as follows. A functional ultrafine particle layer comprising two or more layers provided on a release film is prepared by forming an ultrafine particle layer having a high refractive index and an ultrafine particle layer having a low refractive index in that order. Then, the functional ultrafine particle layer on the release film is transferred onto a transparent plastic substrate film. Thereafter, a resin layer having a low refractive index is formed on the functional ultrafine particle layer by coating a resin, or alternatively a layer, having a low refractive index, of an inorganic layer having a low refractive index is formed by the vapor growth process using an inorganic material. Further, the layer having a low refractive index may be formed by a method different from the above method, i.e., a method wherein a layer of a resin having a low refractive index or a layer, having a low refractive index, formed by a vapor growth process is first provided on said release film and, thereafter, two or more different functional ultrafine particle layers are successively formed respectively using different functional ultrafine particles, thereby preparing a transparent functional film having on its uppermost surface a layer of a resin having a low refractive index or a layer, having a low refractive index, formed by a vapor growth process.

FIGS. 25–d shoe a flow diagram showing an embodiment of the first process for producing a transparent functional film of type I according to the present invention. FIG. 25a shows the step of coating a sol of ultrafine particles having a low refractive index on a release film 36 to form an ultrafine particle layer 33 having a low refractive index and coating a sol of ultrafine particles having a high refractive index on the ultrafine particle layer 33 to form an ultrafine particle layer 34 having a high refractive index, thereby forming a functional ultrafine particle layer 35 comprising two different layers. FIG. 25b shows the step of laminating, press bonding, the functional ultrafine particle layer 35 formed on the release film 36 to a resin layer 32 formed on a transparent plastic substrate film 31. FIG. 25c shows the state of the resultant laminate wherein the functional ultrafine particle layer 35 has been press-bonded to the resin layer 32 with the functional ultrafine particle layer 35 being entirely embedded in the resin layer 32.

In step (c), the resin constituting the resin layer 2 may be full cured. Alternatively, it is possible to use a method wherein the resin constituting the resin layer 2 is half cured and transferred to step (d) of peeling off the release film 36 and the resin constituting the resin layer 32 is full cured. Curing of the resin layer 32 in two stages, i.e., half cure and full cure, offers the advantage that, for example, when a layer is further provided on the resin layer after half curing, the adhesion between the resin layer 32 and the layer provided thereon can be increased.

FIGS. 26a–d show a flow diagram showing a process for producing a transparent functional film. The process shown in FIGS. 26a–d show the same as the first process shown in FIGS. 25a–d for producing a transparent functional film of type I according to the present invention, except that in press bonding in the step (c), the functional ultrafine particle layer 35 is partly exposed on the resin layer 32 without being entirely embedded in the resin layer 32.

Figure 27A:
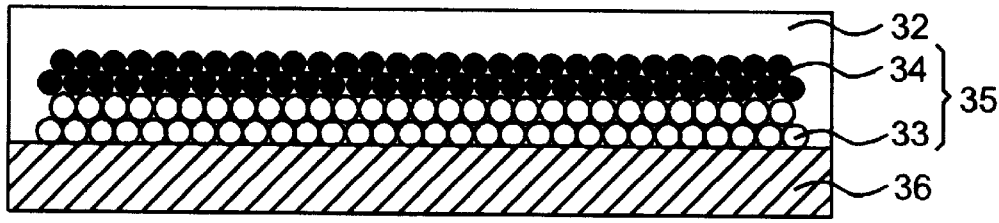
FIGS. 27a–d show a diagram showing an embodiment of the second process for producing a transparent functional film of type I of the present invention belonging to group C.
Figure 27B:
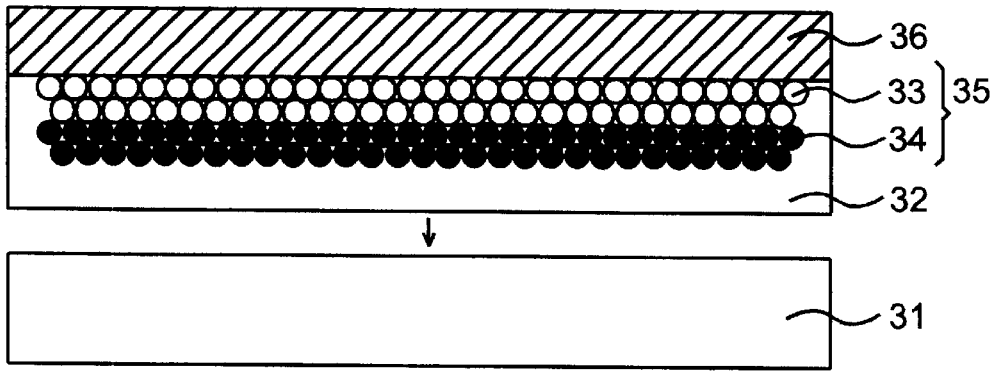
Figure 27C:
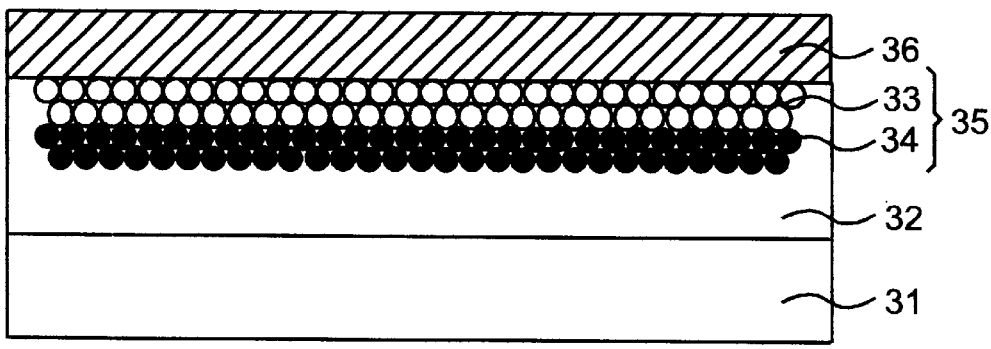
Figure 27D:
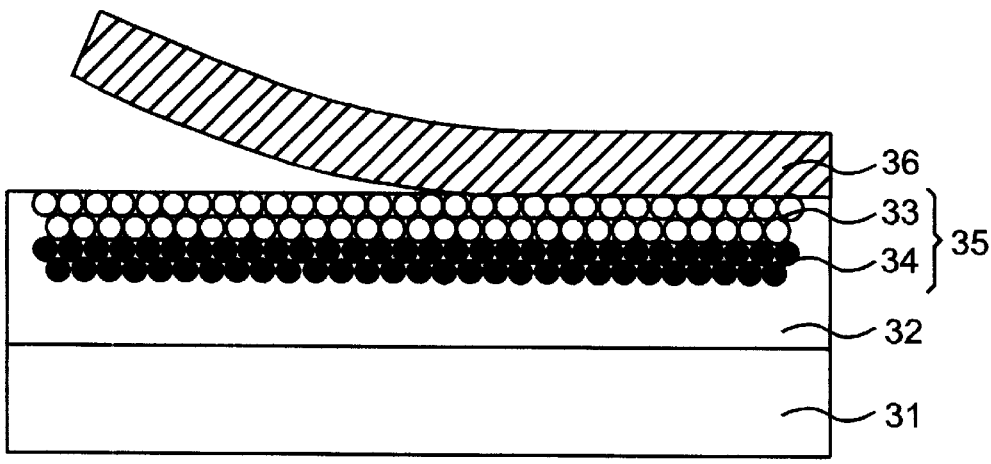

FIGS. 27a–d show a flow diagram showing an embodiment of the second process for producing a transparent functional film of type I according to the present invention. FIG. 27a shows the step of coating a sol of ultrafine particles having a low refractive index on a release film 36 to form an ultrafine particle layer 33 having a low refractive index and coating a sol of ultrafine particles having a high refractive index on the ultrafine particle layer 33 to form an ultrafine particle layer 34 having a high refractive index, thereby forming a functional ultrafine particle layer 35 comprising two different layers, and further coating on the functional ultrafine particle layer 35 a resin composition for a resin layer 32 to a larger thickness than the functional ultrafine particle layer 35. In step (a), the resin layer 32 has not been yet subjected to any curing treatment. FIG. 27b shows the step of laminating the uncured resin layer 32 formed on the release film 36 in the step (a) to a transparent plastic substrate film 31. FIG. 27c shows the state of the resultant laminate wherein the uncured resin layer 32 has been press bonded to a transparent plastic substrate film 31. In the state shown in FIG. 27c, a curing treatment is carried out to full cure or half cure the resin layer 32. FIG. 27d shows the step of peeling the release film 36 to transfer the laminate to the transparent plastic substrate film.

In step (d), the resin composition for a resin layer may be full cured. Alternatively, it is also possible to a method wherein the resin composition for a resin layer 32 is half cured in step (c) and then full cured after peeling off the release film 36 in step (d). Curing of the resin layer 32 in two stages, i.e., half cure and full cure, offers the advantage that, for example, when a layer is further provided on the resin layer after half curing, the adhesion between the resin layer 32 and the layer provided thereon can be increased.

Figure 25A:
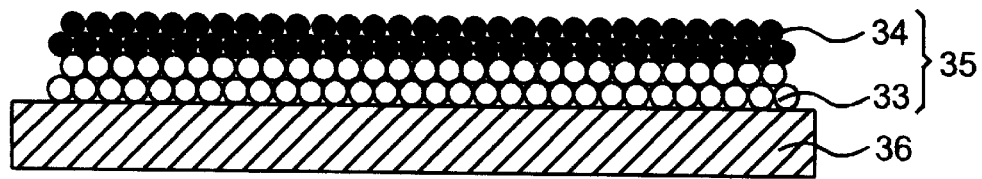
FIGS. 25a–d show a diagram showing an embodiment of the first process for producing a transparent functional film of type I of the present invention belonging to group C.
Figure 25B:
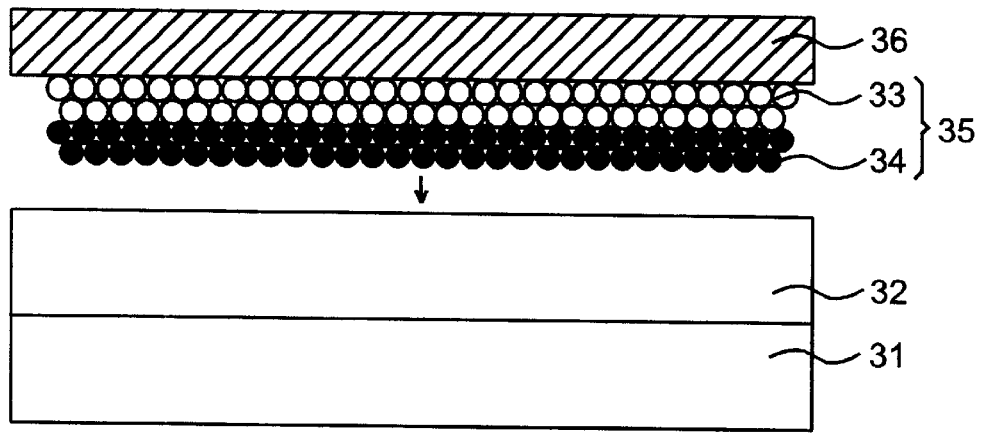
Figure 25C:
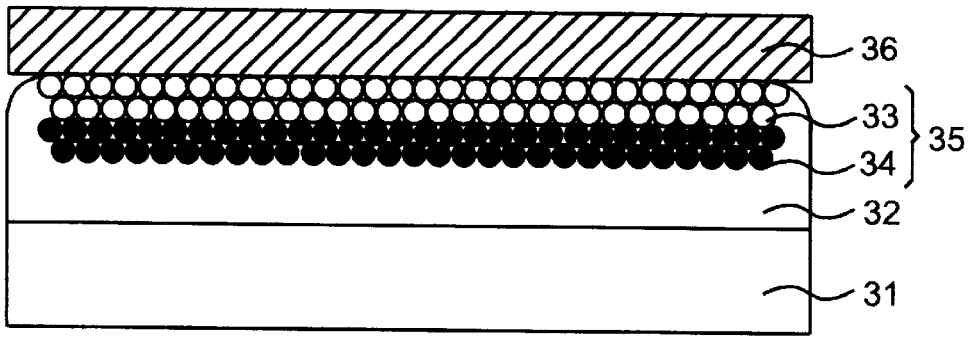
Figure 25D:
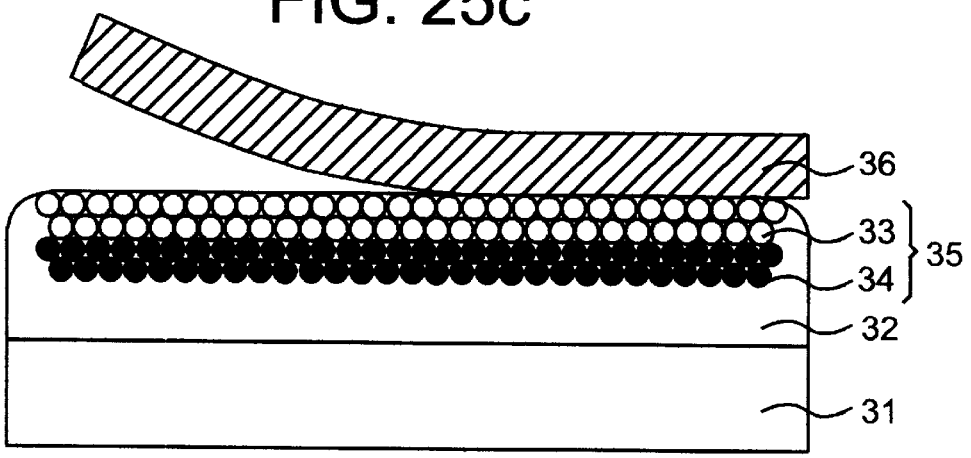
Figure 26A:
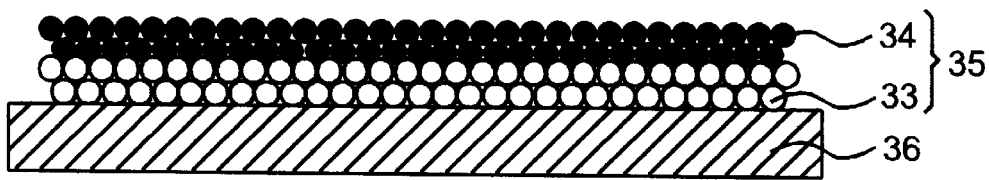
FIGS. 26a–d show a diagram showing an embodiment of the first process for producing a transparent functional film of type I of the present invention belonging to group C, wherein a transparent functional film is produced so that a functional ultrafine particle layer is not entirely embedded in a resin layer with part of the functional ultrafine particle layer being exposed on the surface of the resin layer.
Figure 26B:
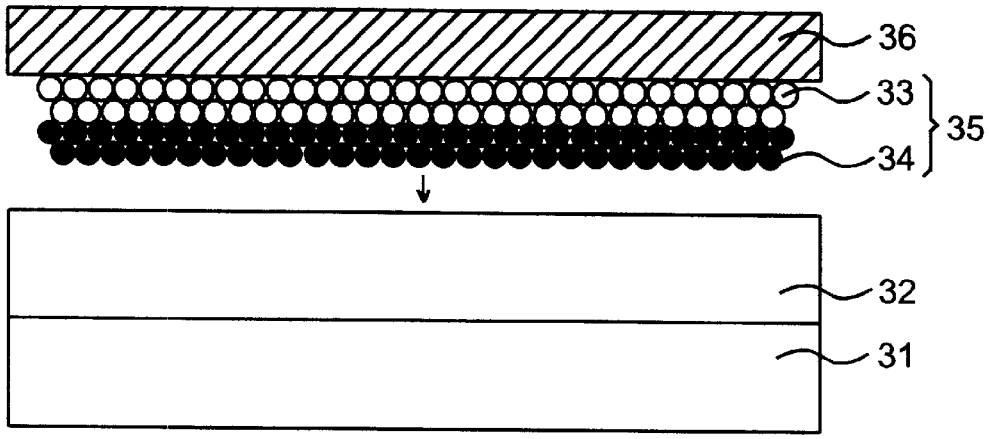
Figure 26C:
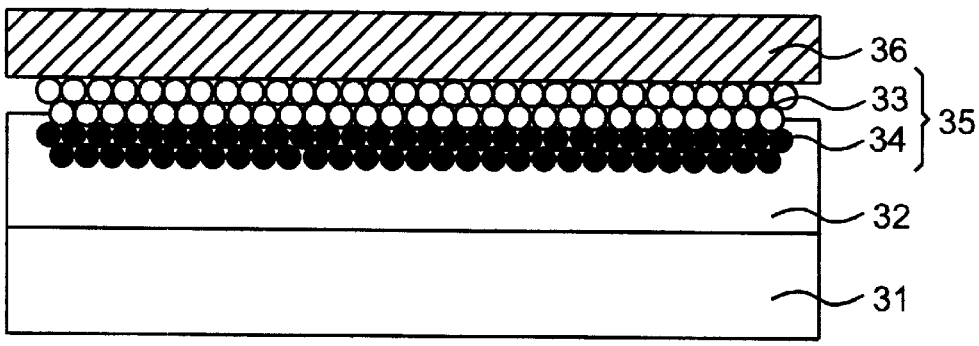
Figure 26D:
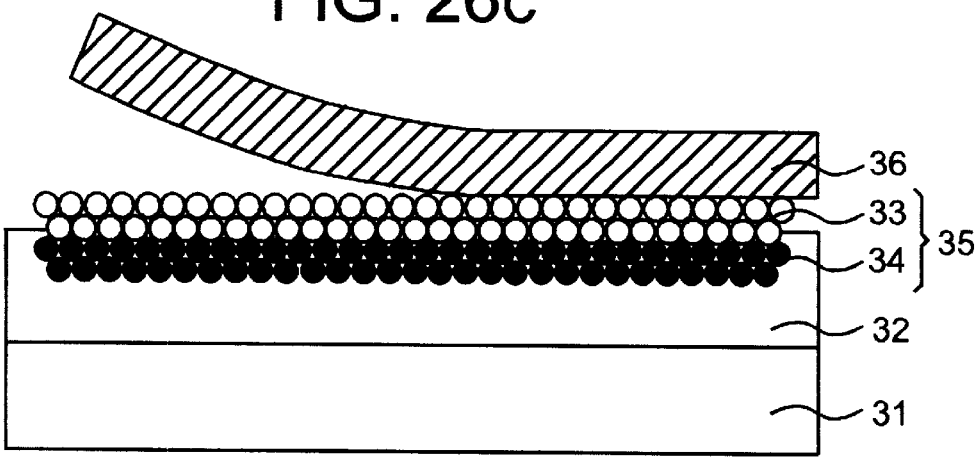
Figure 28A:
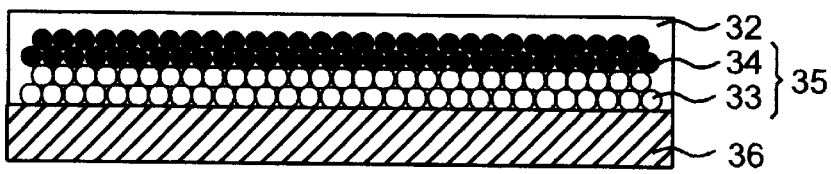
FIGS. 28a–d show a diagram showing an embodiment of the third process for producing a transparent functional film of type I of the present invention belonging to group C.
Figure 28B:
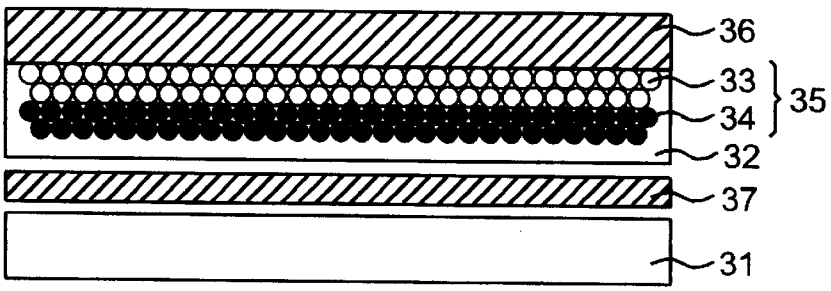
Figure 28C:
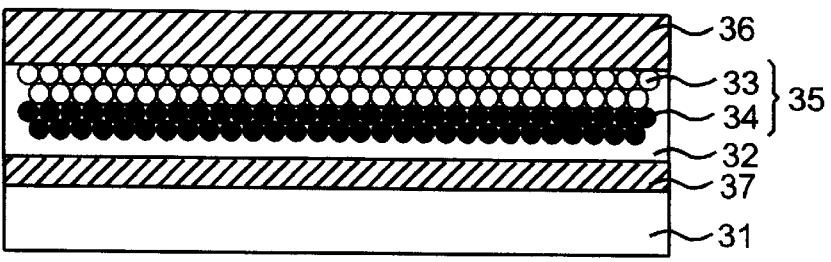
Figure 28D:
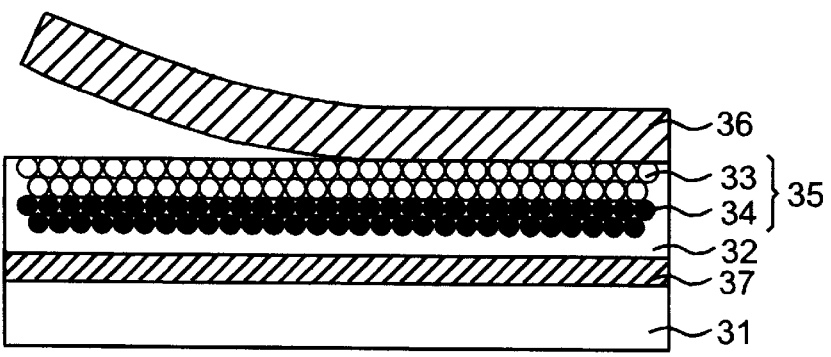

FIG. 28a–d show a flow diagram showing an embodiment of the third process for producing a transparent functional film of type I according to the present invention. FIG. 25a shows the step of coating a sol of ultrafine particles having a low refractive index on a release film 36 to form an ultrafine particle layer 33 having a low refractive index and coating a sol of ultrafine particles having a high refractive index on the ultrafine particle layer 33 to form an ultrafine particle layer 34 having a high refractive index, thereby forming a functional ultrafine particle layer 35 comprising two different layers, and further coating on the functional ultrafine particle layer 35 a resin composition for a resin layer 32 to a larger thickness than the functional ultrafine particle layer 35. In step (a), the resin layer 32 may be full cured or half cured. FIG. 28b shows the step of laminating the resin layer 32 provided on the release film 36 in step (a) to a transparent plastic substrate film 31 through an adhesive layer 37. The adhesive layer 37 may be formed by coating on the resin layer 32 or coating on the transparent plastic substrate film 31. FIG. 28c shows the state of the resin layer 32 which has been press-bonded to the transparent plastic substrate film 31. FIG. 28d shows the step of peeling off, in this press-bonded state, the release film 36.

When the resin layer 32 is half cured in the step of FIG. 28a, the resin layer 32 can be full cured after peeling off the release film 36 in step (d). Curing of the resin layer 32 in two stages, i.e., half cure and full cure, offers the advantage that, for example, when a layer is further provided on the resin layer after half curing, the adhesion between the resin layer 32 and the layer provided thereon can be increased.

The process for producing a transparent functional film of type II according to the present invention may be carried out according to the flow diagrams shown in FIGS. 25a–d to 28a–d, wherein in step (a), an ultrafine particle layer 34 having a high refractive index and an ultrafine particle layer 33 having a low refractive index are formed in that order on a release film 36 to provide a functional ultrafine particle layer 35, the release film 36 is peeled off in step (d), and a resin layer having a low refractive index or an inorganic layer having a low refractive index is formed on the surface of the transferred layer.

Other processes for producing a transparent functional film of type II according to the present invention include (a) a process comprising the steps of: forming on a release film first a resin layer having a low refractive index or an inorganic layer having a low refractive index, then an ultrafine particle layer having a high refractive index and finally an ultrafine particle layer having a low refractive index; and press-bonding the resultant assembly to a resin layer formed on a transparent plastic substrate film so that both coating faces each other, thereby causing said functional ultrafine particle layer to be entirely or partly embedded in said resin layer, (b) a process comprising the steps of: forming on a release film first a resin layer having a low refractive index or an inorganic layer having a low refractive index, then an ultrafine particle layer having a high refractive index and finally an ultrafine particle layer having a low refractive index; coating a resin on said functional ultrafine particle layer and permitting said resin to penetrate into between said functional ultrafine particles, thereby causing said functional ultrafine particle layer to be entirely or partly embedded in said resin layer to form a resin layer having a thickness equal to or larger than said functional ultrafine particle layer; laminating, by press-bonding, a transparent plastic substrate film to the coated release film, with said resin layer being in an uncured state, prepared in the previous step, as such, when said resin contains no solvent, or after removing a solvent when said resin contains a solvent as a diluent so that the functional ultrafine particle layer on the release film faces said transparent plastic substrate film; and curing said resin layer and peeling off said release film to transfer said laminate on said release film to said transparent plastic substrate film, (c) a process comprising the steps of: forming on a release film first a resin layer having a low refractive index or an inorganic layer having a low refractive index, then an ultrafine particle layer having a high refractive index and finally an ultrafine particle layer having a low refractive index; coating a resin on said functional ultrafine particle layer and permitting said resin to penetrate into between said functional ultrafine particles, thereby causing said functional ultrafine particle layer to be entirely or partly embedded in said resin layer to form a resin layer having a thickness equal to or larger than said functional ultrafine particle layers and curing said resin layer; coating an adhesive on either said resin layer formed on said release film or a separately prepared transparent plastic substrate film, and laminating said coated release film and said transparent plastic substrate film to each other so that said resin layer faces said transparent plastic substrate film; and peeling off said release film to transfer said laminate on said release film to said transparent plastic substrate film.

Figure 29A:
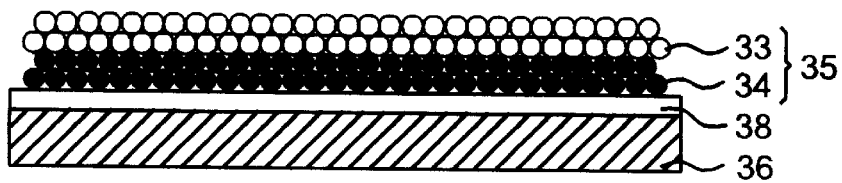
FIGS. 29a–d show a diagram showing an embodiment of a process for producing a transparent functional film of type II of the present invention belonging to group C.
Figure 29B:
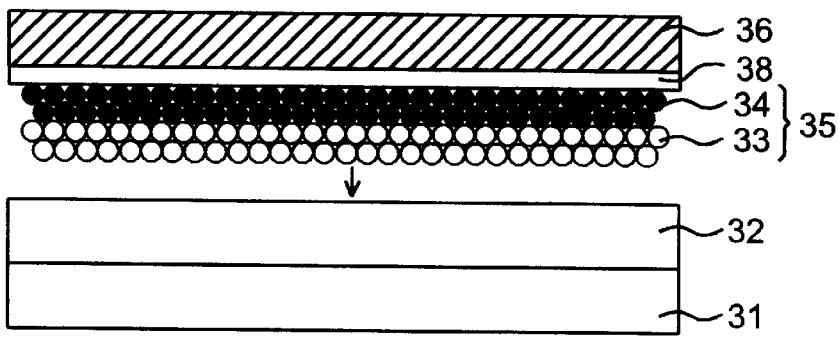
Figure 29C:
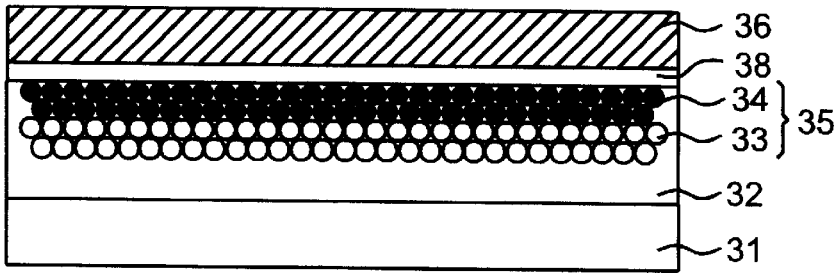
Figure 29D:
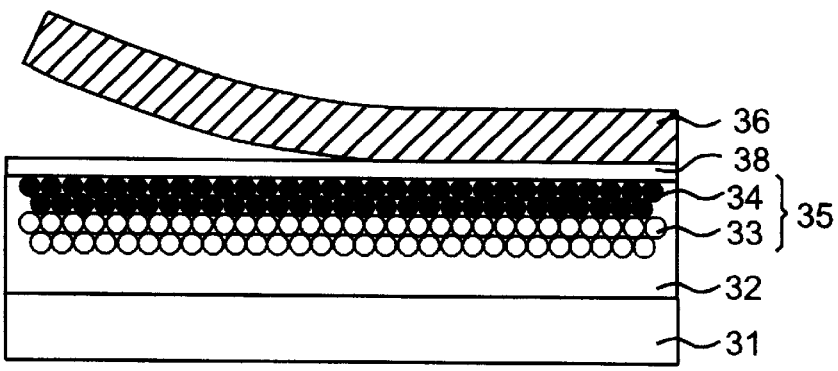

FIGS. 29a–d show a flow diagram showing an embodiment of a process for producing a transparent functional film of type II of the present invention. FIG. 29a shows the step of forming a layer 38 having a low refractive index on a release film 36, coating a sol of functional ultrafine particles having a high refractive index on the layer 38 to form an ultrafine particle layer 34 having a high refractive index and coating thereon a sol of ultrafine particles having a low refractive index to form an ultrafine particle layer 33 having a low refractive index, thereby forming a functional ultrafine particle layer 35 comprising two different ultrafine particle layers. FIG. 29b shows the step of press-bonding the resultant assembly comprising the release film 36 having formed thereon the functional ultrafine particle layer 35 and the layer having a low refractive index 38 to a resin layer 32 formed on a transparent plastic substrate film 1. FIG. 29c shows the state of the resultant laminate wherein the functional ultrafine particle layer 35 has been entirely embedded in the resin layer 32. In the state shown in FIG. 29d, the resin constituting the resin layer 32 is cured in the press-bonded state, and the release film 36 is then peeled off to transfer the laminate to the transparent plastic substrate film.

In the above processes for producing transparent functional films of types I and types II, the integration of the functional ultrafine particle layer 35 formed on the release film 36 can be carried out by incorporating a binder resin into functional ultrafine particles to bind functional ultrafine particles to one another. Alternatively, the integration may be carried out by taking advantage of the binding action of the functional ultrafine particles per se.

The half cure and the full cure in the above resin are defined as follows.

Half Cure and Full Cure

In the process for producing a transparent functional film according to the present invention, the half cure include (a). ionizing radiation curing resin semicrosslinking type half cure, (b). ionizing radiation curing resin/thermosetting resin (or thermoplastic resin) blend type half cure, and (c). solvent type/half cure type combined half cure. The full cure refers to such a state that the half cured state of the above (a). to (c). is further cured to a full cured state.

a. Ionizing Radiation Curing Resin Semicrosslinking Type Half Cure

The ionizing radiation curing resin semicrosslinking type half cure refers to a half cured state created by coating the conventional ionizing radiation curing resin and irradiating the coating with an ionizing radiation, such as UV or an electron beam, under regulated irradiation conditions to cause semicrosslinking.

b. Ionizing Radiation Curing Resin/thermosetting Resin (or Thermoplastic Resin) Blend Type Half Cure The ionizing radiation curing resin/thermosetting resin (or thermoplastic resin) blend type half cure refers to a half cured state created by coating a resin composition comprising a mixture of an ionizing radiation curing resin with a thermosetting resin or a thermoplastic resin and, when the thermosetting resin is used, applying heat to the coating.

c. Solvent Type/half Cure Type Combined Half Cure

The solvent type/half cure type combined half cure refers to a half cured created by coating the conventional ionizing radiation curing resin with a solvent being added thereto, removing the solvent to form a coating, and irradiating the dried coating with an ionizing radiation. This half cured state is the same as the semi-cured state described in Japanese Patent Laid-Open No. 20249/1989.

Release Film

A sheet the surface of which has been subject to or not been subjected to a treatment with a silicone, fluorine, acryl-melamine, or the like for rendering the surface of the sheet releasable is generally used. The surface of the sheet may be uneven. In this case, since the unevenness is formed on the surface of the final product, it is possible to impart an antireflection effect or a glare protection effect to the transparent functional film.

Functional Ultrafine Particles

Examples of the functional ultrafine particles used in the functional ultrafine particle layer include ultrafine particles which have a size of not more than 200 nm and exhibit functions such as a UV screening property, an electrical conductivity, an antistatic property, and an antireflection property. For example, ultrafine particles, such as $SnO_2$ and ITO, are used for the purpose of imparting electrical conductivity or antistatic property to the transparent functional film.

Ultrafine particles for imparting the antireflection property are as follows. Examples of the ultrafine particles having a low refractive index for forming a layer having a low refractive index include inorganic materials, such as LiF (refractive index: 1.4), $MgF_2$ (refractive index: 1.4), $3NaF-AlF_3$ (refractive index: 1.4), $AlF_3$ (refractive index: 1.4), $Na_3AlF_6$ (cryolite, refractive index: 1.33), and $SiO_x$ (x: $1.50 \leq x \leq 2.00$) (refractive index: 1.35–1.48). On the other hand, examples of the ultrafine particles having a high refractive index for forming a layer having a high refractive index include ZnO (refractive index: 1.90), $TiO_2$ (refractive index: 2.3–2.7), $CeO_2$ (refractive index: 1.95), $Sb_2O_5$ (refractive index: 1.71), $SnO_2$, ITO (refractive index: 1.95), $Y_2O_3$ (refractive index: 1.87), $La_2O_3$ (refractive index: 1.95), $ZrO_2$ (refractive index: 2.05), and $Al_2O_3$ (refractive index: 1.63).

Among the above ultrafine particles having a high refractive index, ZnO, $TiO_2$, $CeO_2$, $Sb_2O_5$, and the like are preferred because UV screening properties in addition to the antireflection effect can be further imparted to the antireflection film of the present invention. Further, the use of an antimony-doped $SnO_2$ or ITO is preferred from the viewpoint of improving electronic conductivity to prevent the adherence of dust by virtue of an antistatic effect, or to attain an electromagnetic wave shielding effect when the transparent functional film of the present invention is used in CRT. In order to make the resin layer transparent, the particle diameter of the ultrafine particle having a high refractive index is preferably not more than 400 nm.

These functional ultrafine particles may be those which has been subjected to a treatment with a coupling agent for rendering the surface thereof hydrophobic. The treatment for rendering the surface hydrophobic introduces a hydrophobic group onto the surface of the functional ultrafine particles, so that the affinity of the ultrafine particles for the ionizing radiation curing resin is increased, enhancing the bond between the ultrafine particles and the ionizing radiation curing resin. Examples of the coupling agent include a silane coupling agent, a titanate coupling agent, and an alumina coupling agent. The amount of the coupling agent added is 0 (zero) exclusive to 30 parts by weight, preferably 0 exclusive to 10 parts by weight.

When the functional ultrafine particles is those having an inert surface, such as $MgF_2$, it is possible to use a method which comprises previously adding a sol of $SiO_2$ to coat $SiO_2$ on the surface of the functional ultrafine particles and treating the coated functional ultrafine particles with a coupling agent. The above coating treatment with $SiO_2$ enables a large amount of a hydrophilic group to be introduced onto the surface of the functional ultrafine particles, which in turn enables the subsequent treatment with a coupling agent to ensurely introduce a larger amount of a hydrophobic group, so that the affinity of the functional ultrafine particles for the resin is further increased to enhance the bond strength between the functional ultrafine particles and the resin.

Method for Forming Functional Ultrafine Particle Layer on Release Film

A functional ultrafine particle layer is formed on a release film by coating on a release film a sol of functional ultrafine particles, as such, or a sol of functional ultrafine particles containing a binder resin. When the functional ultrafine particles per se have a binding ability, no binder resin may be used. If the binding ability is weak, the binder resin may be, if necessary, used. The amount of the binder resin may be such that the functional ultrafine particles are mutually bound. The use of the binder resin in such an amount as to cause the functional ultrafine particles to be dispersed in the binder rein is unsuitable because the functional ultrafine particles are not mutually bound.

The above binder resin may be the conventional binder resins, such as a thermosetting resin, a thermoplastic resin, and an ionizing radiation curing resin. However, when the adhesion to the underlayer (an ionizing radiation curing resin layer) is taken into consideration, the use of an ionizing radiation curing resin is preferred. In this case, the ionizing radiation curing resin i preferably a solvent semicuring resin. A colorant may be added to the binder resin.

Transparent Plastic Substrate Film

Any transparent plastic film may be used as the transparent plastic substrate film for the transparent functional film. A triacetyl cellulose film and a polyethylene terephthalate film (hereinafter referred to as "PET") are particularly preferred because they have excellent transparency. Resin layer:

Any resin may be used for forming the resin layer on the transparent plastic substrate film. For example, it is possible to use thermoplastic resins and/or ionizing radiation curing resins, such as resins described above in connection with the half cure and the full cure.

When a hard property is imparted to the resin layer, an ionizing radiation curing resin is used which cures upon being exposed to UV or electron beams. Examples of the ionizing radiation curing resin are as follows.

The ionizing radiation curing resin is preferably one having an acrylate resin having a functional group, and examples thereof include a polyester resin, a polyether resin, an acrylic resin, an epoxy resin, a urethane resin, an alkyd resin, a spiroacetal resin, a polybutadiene resin, and a polythiol-polyene resin having a relatively low molecular weight, an oligomer or a prepolymer of a (meth)acrylate or the like of a polyfunctional compound, such as a polyhydric alcohol, and those containing a relatively large amount of a reactive diluent, such as a monofunctional monomer, such as ethyl (meth)acrylate, ethylhexyl (meth)acrylate, styrene, methylstyrene, or N-vinylpyrrolidone, and a polyfunctional monomer, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate.

In order to convert the above electron beam curing resin to a UV curing resin, it is preferred to incorporate, into the electron beam curing resin, a photopolymerization initiator, such as an acetophenone compound, a benzophenone compound, Michler's benzoylbenzoate, an α-amyloxime ester, tetramethyl thiuram monosulfide, or a thioxanthone compound, and a photosensitizer, such as n-butylamine, triethylamine, or tri-n-butylphosphine. In the present invention, it is particularly preferred to incorporate urethane acrylate or the like as an oligomer and dipentaerythritol hexacrylate or the like as a monomer.

The thickness of the resin layer is 0.5 to 10 μm, preferably 3 to 7 μm. Particles having a function identical to or different from the above functional ultrafine particles are, if necessary, added and dispersed in the resin layer. Further, the resin layer may be colored by a colorant.

Irradiation Device

The ionizing radiation curing resin used in the present invention can be cured by the conventional curing method usually employed for curing ionizing radiation curing resins, that is, applying an electron beam or ultraviolet light. For example, in the case of curing with an electron beam, use may be made of an electron beam or the like having an energy of 50 to 1000 KeV, preferably 100 to 300 Kev, emitted from various electron beam accelerators, such as a Cockcroft-Walton (type) accelerator, a van de Graaff accelerator, a resonance transformer accelerator, an insulation core transformer accelerator, a linear accelerator, a dynatron accelerator, and a high frequency accelerator. On the other hand, in the case of curing with UV, use may be made of ultraviolet light or the like emitted from an ultrahigh pressure mercury lamp, a high pressure mercury lamp, a low pressure mercury lamp, a carbon arc, a xenon arc, a metal halide lamp, and the like.

Layer Having Low Refractive Index

In the transparent functional film of type II according to the present invention, a resin layer having a low refractive index or a layer having a low refractive index of an inorganic layer having a low refractive index formed by the vapor growth process is further provided on the ultrafine particle layer having a high refractive index.

The material having a low refractive index used in the formation of a layer having a low refractive index may be any material so far as it can meet the above requirements. It may be any of an inorganic material or an organic material.

Examples of the inorganic material having a low refractive index include LiF (refractive index: 1.4), $MgF_2$ (refractive index: 1.4), $3NaF-AlF_3$ (refractive index: 1.4), $AlF_3$ (refractive index: 1.4), $Na_3AlF_6$ (cryolite, refractive index: 1.33), and $SiO_x$ (x: $1.50 \leq x \leq 2.00$) (refractive index: 1.35–1.48).

It is preferred to form the layer having a low refractive index using an inorganic material having a low refractive index because the formed layer has a high hardness. In particular, when a layer of $SiO_x$ (wherein x is $1.50 \leq x \leq 4.00$, preferably $1.70 \leq x \leq 2.20$) is formed by the plasma CVD process, it has a good hardness and an excellent adhesion to the hard coat layer and, further, heat damage to the transparent plastic substrate film can be reduced as compared with the case where other vapor growth processes are used.

The organic material having a low refractive index is preferably a polymer with a fluorine atom being introduced thereinto because the refractive index is low and not more than 1.45. Polyvinylidene fluoride (refractive index n=1.40) can be mentioned as a resin usable with a solvent because it is easy to handle. When polyvinylidene fluoride is used as the organic material having a low refractive index, the refractive index of the layer having a low refractive index becomes about 1.40. It is also possible to add an acrylate having a low refractive index, such as trifluoroethyl acrylate (refractive index n=1.32), in an amount of 10 to 300 parts by weight, preferably 100 to 200 parts by weight, for the purpose of further lowering the refractive index of the layer having a low refractive index.

It is noted that the trifluoroethyl acrylate is of monofunctional type and, therefore, the strength of the layer having a low refractive index is not satisfactory. For this reason, it is preferred to further add a polyfunctional acrylate, for example, dipentaerythritol hexacrylate (abbreviation: DPHA, tetrafunctional type), which is an ionizing radiation curing resin. The larger the amount of DPHA added, the higher the strength of the layer. However, the amount of DPHA added is preferably small from the viewpoint of lowering the refractive index of the layer having a low refractive index. For this reason, it is recommended that the amount of DPHA be 1 to 50 parts by weight, preferably 5 to 20 parts by weight.

The inorganic layer having a low refractive index can be prepared by forming, on an ultrafine particle layer having a high refractive index, a film having a single layer structure or a multilayer structure using an inorganic material having a low refractive index by a vapor growth process, such as vapor deposition, sputtering, ion plating, or plasma CVD. The resin layer having a low refractive index can be prepared by coating a resin composition, having a low refractive index, containing an inorganic material having a low refractive index, or an organic material having a low refractive index to form a coating having a single layer structure or a multilayer structure.

In particular, an $SiO_x$ film formed by the plasma CVD process has a higher density than the conventional vacuum-deposited films and, hence, a higher gas barrier property. Therefore, it has excellent moisture resistance and has the advantage that, when the antireflection film of the present invention is used with the antireflection film being laminated to a polarizing element, it can serve as a barrier to moisture for the polarizing element which is recognized as having poor resistance to moisture.

Polarizing Plate and Liquid Crystal Display

A polarizing plate having improved antireflection effect can be prepared by laminating the antireflection film having an antireflection effect according to the present invention to a polarizing element. A polyvinyl alcohol film, a polyvinyl formal film, a polyvinyl acetal film, and a saponified film of an ethylene-vinyl acetate copolymer, these films having been dyed with iodine or a dye and stretched, may be used in the polarizing element. In the lamination of the antireflection film to the polarizing plate, when the substrate film of the transparent functional film is, for example, a triacetyl cellulose film, the triacetyl cellulose film is saponified in order to improve the adhesion and for destaticization purposes. The saponification treatment may be carried out before or after the application of the hard coat on the triacetyl cellulose film.

Figure 30:
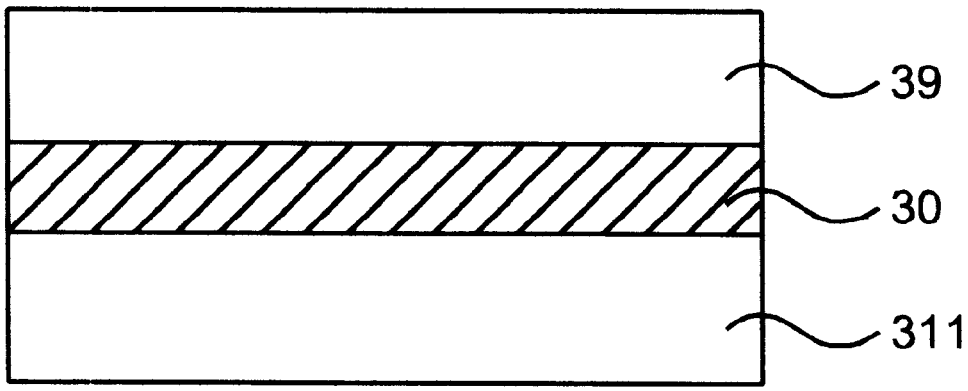
FIG. 30 is a diagram showing an embodiment of a polarizing sheet using a transparent functional film of the present invention belonging to group C.

FIG. 30 is an embodiment of a polarizing plate using the transparent functional film of the present invention. In FIG. 30, numeral 39 designates the transparent functional film having an antireflection effect according to the present invention, and the transparent functional film 39 is laminated onto a polarizing element 30 so that the transparent plastic substrate film 31 faces the polarizing element 30. On the other hand, a triacetyl cellulose film (abbreviation: TAC film) 11 is laminated onto the other side of the polarizing element 30. The transparent functional film 39 of the present invention may be laminated onto both sides of the polarizing element 30.

Figure 31:
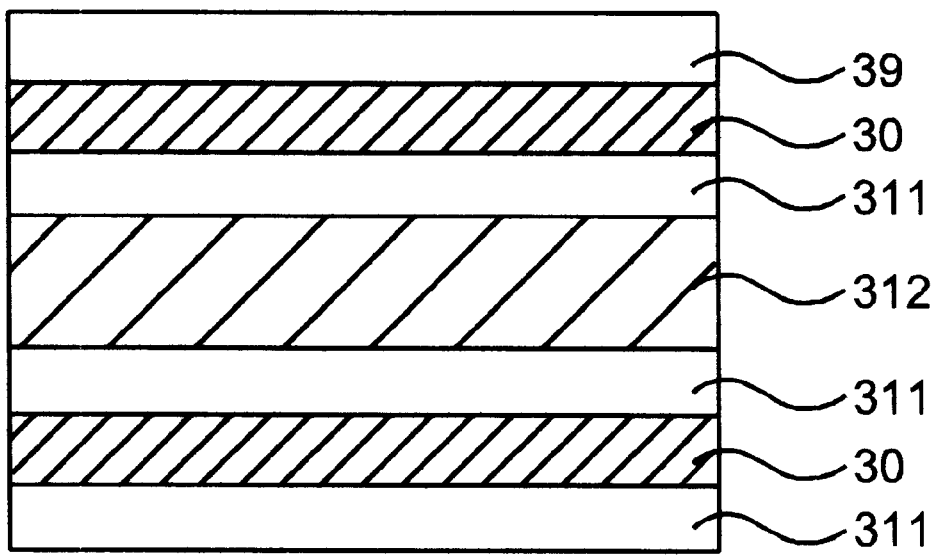
FIG. 31 is a diagram showing an embodiment of a liquid crystal display using a transparent functional film of the present invention belonging to group C.

FIG. 31 is an embodiment of a liquid crystal display using the transparent functional film of the present invention. A polarizing plate shown in FIG. 30, that is, a polarizing plate having a layer construction of TAC film/polarizing element/transparent functional film is laminated onto a liquid crystal display device 312. On the other hand, a polarizing plate having a layer construction of TAC film/polarizing element/TAC film is laminated onto the other side of the liquid crystal display device 312. In the case of an STN type liquid crystal display, a phase plate is inserted between the liquid crystal display device 312 and the polarizing plate.

Example A1

An $MgF_2$ sol having a refractive index of 1.4 (manufactured by Nissan Chemical Industries Ltd.) was coated on a release film (MC-19 (trade name) manufactured by REIKO CO., LTD.; the surface thereof having been treated with acryl-melamine) to a thickness of 100 nm.

Separately, an electron beam curing resin (EXG (trade name) manufactured by Dainichiseika Color & Chemicals Manufacturing. Co., Ltd.) was coated on an 80 μm-thick triacetyl cellulose film to a thickness of 5 μm on a dry basis. The coated triacetyl cellulose film was then put on the coated release film so that the coating surfaces faced each other. The assembly was subjected to press bonding to prepare a laminate which was then irradiated with an electron beam under conditions of 4 Mrad and 10 m/min to cure the electron beam curing resin. Then, the release film was peeled off from the laminate. The transparent functional film thus obtained had a total light transmittance of 95% (the total light transmittance of the triacetyl cellulose film as the substrate film being 92%), and the surface thereof was resistant to scratching with a nail. The above results show that the transparent functional film can serve as an antireflection film.

The transparent functional film prepared in the present Example A1 corresponds to a film shown in FIG. 1.

Example A2

A 1:2 mixture of an $MgF_2$ sol having a refractive index of 1.4 (manufactured by Nissan Chemical Industries Ltd.) and a fluoroacrylate (manufactured by Osaka Organic Chemical Industry Ltd.) was coated on the same release film as used in Example A1 to a thickness of 100 nm.

A 1:2 mixture of an electron beam curing resin (X-12–2400 manufactured by The Shin-Etsu Chemical Co., Ltd.) and an $Sb_2O_5$ having a refractive index of 1.68 (manufactured by Nissan Chemical Industries Ltd.) was coated on a PET film to a thickness of 5 μm on a dry basis, and the above coated release film was laminated thereto. The resultant laminate was irradiated with an electron beam under conditions of 4 Mrad and 10 m/min to cure the electron beam curing resin. Then, the release film was peeled off from the laminate. The transparent functional film thus formed had a total light transmittance of 91% (the total light transmittance of the PET film as the substrate film being 87%), and the surface thereof was resistant to scratching with a nail. The above results show that the transparent functional film can serve as an antireflection film.

Figure 7:
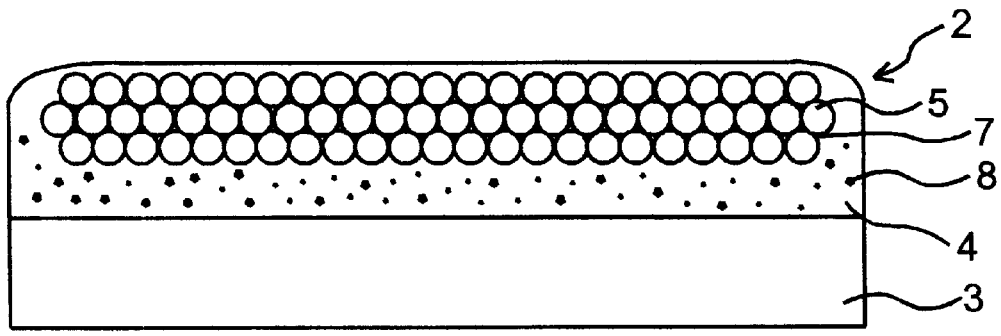
FIGS. 7 is a cross-sectional view of a transparent functional film prepared in Example A2.

FIG. 7 shows a cross-sectional view of the transparent functional film formed in the present Example A2. The transparent functional film comprises a transparent plastic substrate film 3, a hard coat layer 4 of an electron beam curing resin coated thereon, and a functional ultrafine particle layer 2 formed in a region from within the hard coat layer 4 to on the surface of the hard coat layer 4. As shown in FIG. 7, the functional ultrafine particle layer 2 is bound by the binding capability of each functional ultrafine particles 5 per se and a binder resin 7. The whole functional ultrafine particle layer 2 is entirely embedded in the hard coat layer 4 comprising an electron beam curing resin. Further, ultrafine particles 8 of $Sb_2O_5$ (refractive index: 1.68) are included in the hard coat layer 4.

Example A3

A transparent functional film having an antireflection effect was formed in the same manner as in Example A1, except that Matt PET (X-45 (trade name) manufactured by Toray Industries, Inc.) having a finely uneven surface was used as the release film instead of the release film MC-19 used in Example A1.

Figure 8:
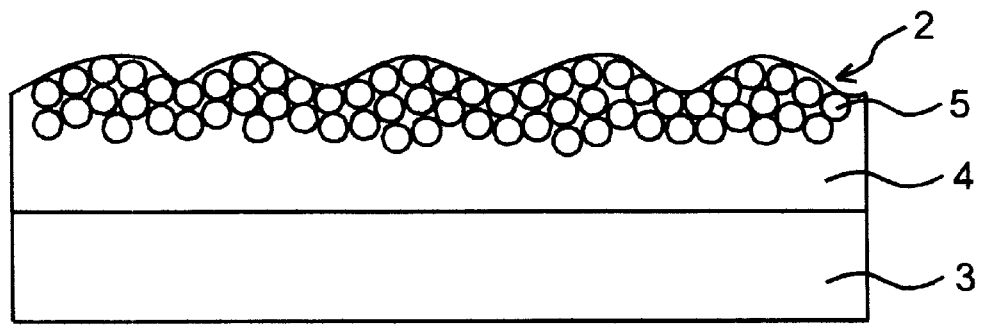
FIG. 8 is a cross-sectional view of a transparent functional film prepared in Example A3.

FIG. 8 shows a cross-sectional view of the transparent functional film formed in the present Example A3. The transparent functional film comprises a transparent plastic substrate film 3, a hard coat layer 4 of an electron beam curing resin coated thereon, and a functional ultrafine particle layer 2 formed in a region from within the hard coat layer 4 to on the surface of the hard coat layer 4. As shown in FIG. 8, the surface of the functional ultrafine particle layer 2 has a fine uneven pattern corresponding to that on the surface of the release film.

Example A4

A transparent functional film having an antireflection effect was formed in the same manner as in Example 2, except that Matt PET (X-45 (trade name) manufactured by Toray Industries, Inc.) having a finely uneven surface was used as the release film instead of the release film MC-19 used in Example 2.

Example A5

A dispersion of ultrafine ZnO particles having a refractive index of 1.9 was coated on a release film (MC-19 (trade name) manufactured by REIKO CO., LTD.; the surface thereof having been treated with acryl-melamine) to a thickness of 72 nm. Separately, an electron beam curing resin (EXG (trade name) manufactured by Dainichiseika Color & Chemicals Manufacturing. Co., Ltd.) was coated on an 80 $\mu$m-thick triacetyl cellulose film (TAC film) to a thickness of 5 $\mu$m on a dry basis. The coated triacetyl cellulose film was then put on and laminated to the coated release film so that the coating surfaces faced each other. The laminate was then irradiated with an electron beam at 2 Mrad to half cure the resin. Then, the release film was peeled off from the laminate, thereby transferring the layer of ultrafine ZnO particles to the electron beam curing resin layer. A fluoroacrylate (Viscoat 8F (trade name) manufactured by Osaka Organic Chemical Industry Ltd.) was coated on the above transferred layer to a thickness of 100 nm. The coated layer was then irradiated with an electron beam at 3 Mrad to full cure the resin layer, thereby forming a transparent functional film having an antireflection effect. The transparent functional film thus obtained had a total light transmittance of 95%.

Figure 9:
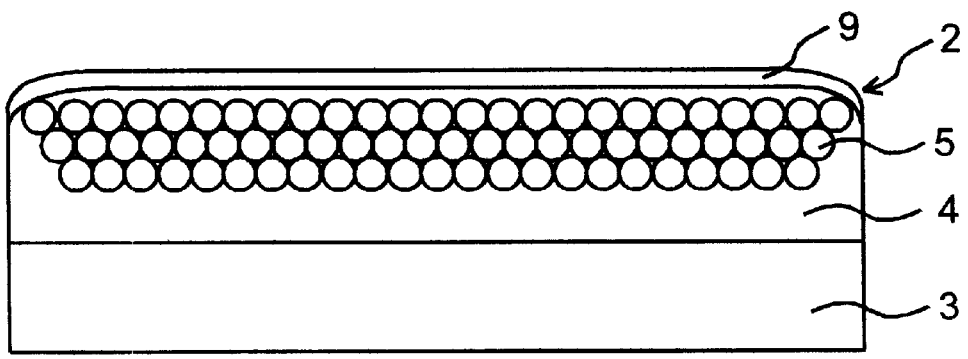
FIG. 9 is a cross-sectional view of a transparent functional film prepared in Example A5.

FIG. 9 shows a cross-sectional view of the transparent functional film formed in the present Example A5. The transparent functional film comprises: a transparent plastic substrate film 3; a hard coat layer 4 of an electron beam curing resin formed thereon; a functional ultrafine particle layer 2 comprised of functional ultrafine particles 5 having a high refractive index, which are localized and fixed in a region from within the hard coat layer 4 to on the surface of the hard coat layer 4, and a thin film of the electron curing resin covering the whole outermost surface of the ultrafine particles 5; and, further, a layer 9 having a low refractive index provided on the thin film of the electron curing resin, thereby forming a transparent functional film having an antireflection effect.

Example A6

A dispersion of ultrafine ZnO particles having a refractive index of 1.9 was coated on a release film (MC-19 (trade name) manufactured by REIKO CO., LTD.; the surface thereof having been treated with acryl-melamine) to a thickness of 72 nm. Separately, a resin (refractive index: 1.65) comprising a 2:1 (weight ratio) mixture of a dispersion of ultrafine ZnO particles and an electron beam curing resin (HN-5A (trade name) manufactured by Mitsubishi Petrochemical Co., Ltd.) was coated on an 80 $\mu$m-thick triacetyl cellulose film (TAC film) to a thickness of 5 $\mu$m on a dry basis. The coated triacetyl cellulose film was then put on and laminated to the coated release film so that the coating surfaces faced each other. The laminate was then irradiated with an electron beam at 2 Mrad to half cure the resin. Then, the release film was peeled off from the laminate, thereby transferring the layer of ultrafine ZnO particles to the electron beam curing resin layer with ultrafine particles being dispersed therein. A fluoroacrylate (Viscoat 8F (trade name) manufactured by Osaka Organic Chemical Industry Ltd.) was coated on the above transferred layer to a thickness of 100 nm. The coated layer was then irradiated with an electron beam at 3 Mrad to full cure the resin layer, thereby forming a transparent functional film having an antireflection effect. The transparent functional film thus obtained had a total light transmittance of 95%.

Example A7

A dispersion of ultrafine ZnO particles having a refractive index of 1.9 was coated on a release film (MC- 19 (trade name) manufactured by REIKO CO., LTD.; the surface thereof having been treated with acryl-melamine) to a thickness of 72 nm. A resin (refractive index: 1.65) comprising a 2:1 (weight ratio) mixture of a dispersion of ultrafine ZnO particles and an electron beam curing resin (HN-5A (trade name) manufactured by Mitsubishi Petrochemical Co., Ltd.) was coated thereon to a thickness of 3 $\mu$m on a dry basis. The film was then irradiated with an electron beam at 10 Mrad to full cure the resin. A 6:1 mixture of a urethane adhesive (Takelac (trade name) manufactured by Takeda Chemical Industries, Ltd.) and a curing agent was coated thereon. The coated film was then laminated to an 80 $\mu$m-thick triacetyl cellulose film.

The laminate was aged at 40° C. for 3 days, and the release film was peeled off from the laminate. A 100 nm-thick $SiO_x$ film was then formed on the aged layer by plasma deposition. The transparent functional film thus obtained had a total light transmittance of 95.1%.

Example A8

A dispersion of ultrafine ZnO particles having a refractive index of 1.9 was coated on a release film (MC-19 (trade name) manufactured by REIKO CO., LTD.; the surface thereof having been treated with acryl-melamine) to a thickness of 72 nm. A resin (refractive index: 1.65) comprising a 2:1 (weight ratio) mixture of a dispersion of ultrafine ZnO particles and an electron beam curing resin (HN-5A (trade name) manufactured by Mitsubishi Petrochemical Co., Ltd.) was coated thereon to a thickness of 3 $\mu$m on a dry basis. The film was then irradiated with an electron beam at 2 Mrad to half cure the resin. A 6:1 mixture of a urethane adhesive (Takelac (trade name) manufactured by Takeda Chemical Industries, Ltd.) and a curing agent was coated thereon. The coated film was laminated to an 80 $\mu$m-thick triacetyl cellulose film.

The laminate was aged at 40° C. for 3 days, and the release film was then peeled off from the laminate. A fluoroacrylate (Viscoat 8F (trade name) manufactured by Osaka Organic Chemical Industry Ltd.) was then coated on the aged layer to a thickness of 100 nm. Thereafter, the coated film was irradiated with an electron beam at 3 Mrad to full cure the resin layer, thereby forming a transparent functional film having an antireflection effect. The transparent functional film thus obtained had a total light transmittance of 95%.

Example A9

A dispersion of ultrafine ZnO particles having a refractive index of 1.9 was coated on a release film (MC-19 (trade name) manufactured by REIKO CO., LTD.; the surface thereof having been treated with acryl-melamine) to a thickness of 72 nm. An electron beam curing resin (EXG (trade name) manufactured by Dainichiseika Color & Chemicals Manufacturing. Co., Ltd.) was coated thereon to a thickness of 5 $\mu$m on a dry basis. An 80 $\mu$m-thick triacetyl cellulose film was laminated to the coated film so that the triacetyl cellulose film faced the electron beam curing resin. Thereafter, the laminate was irradiated with an electron beam at 5 Mrad to full cure the resin, and the release film was then peeled off from the laminate. A 100 nm-thick $SiO_x$ film was formed on the cured resin layer by plasma deposition. The transparent functional film thus obtained had a total light transmittance of 95.1%.

Example A10

A dispersion of ultrafine ZnO particles having a refractive index of 1.9 was coated on a release film (MC-19 (trade name) manufactured by REIKO CO., LTD.; the surface thereof having been treated with acryl-melamine) to a thickness of 72 nm. An electron beam curing resin (EXG (trade name) manufactured by Dainichiseika Color & Chemicals Manufacturing. Co., Ltd.) was coated thereon to a thickness of 5 μm on a dry basis. An 80 μm-thick triacetyl cellulose film was laminated to the coated film so that the triacetyl cellulose film faced the electron beam curing resin. Thereafter, the laminate was irradiated with an electron beam at 2 Mrad to half cure the resin, and the release film was then peeled off from the laminate. A fluoroacrylate (Viscoat 8F (trade name) manufactured by Osaka Organic Chemical Industry Ltd.) was coated on the cured resin layer to a thickness of 100 nm. Thereafter, the coated layer was irradiated with an electron beam at 3 Mrad to full cure the resin layer, thereby forming a transparent functional film having an antireflection effect. The transparent functional film thus obtained had a total light transmittance of 95.3%.

Example A11

An MgF$_2$ sol having a refractive index of 1.4 (manufactured by Nissan Chemical Industries Ltd.) was coated on a release film (MC-19 (trade name) manufactured by REIKO CO., LTD.; the surface thereof having been treated with acryl-melamine) to a thickness of 100 nm.

Separately, a resin blend of an electron beam curing pressure-sensitive adhesive with an electron beam curing resin was coated on a 100 μm-thick PET film to a thickness of 5 μm on a dry basis. The resultant coating was dried by evaporating the solvent (at 100° C. for 30 min). The coated PET film was then put on the coated release film so that the coating surfaces faced each other. The assembly was subjected to press bonding to prepare a laminate which was then irradiated with an electron beam under conditions of 4 Mrad and 10 m/min to cure the electron beam curing resin blend. Then, the release film was peeled off from the laminate. The transparent functional film thus obtained had a total light transmittance of 92% (the total light transmittance of the PET film as the substrate film being 87%), and the surface thereof was resistant to scratching with a nail. The above results show that the transparent functional film can serve as an antireflection film.

The transparent functional film prepared in the present Example A11 corresponds to a film shown in FIG. 2.

Example A12

A 1:2 mixture of an MgF$_2$ sol having a refractive index of 1.4 (manufactured by Nissan Chemical Industries Ltd.) and a fluoroacrylate (manufactured by Osaka Organic Chemical Industry Ltd.) was coated on the same release film as used in Example A11 to a thickness of 100 nm.

Separately, a 1:2 mixture of a resin blend of an electron beam curing pressure-sensitive adhesive and an electron beam curing resin and an Sb$_2$O$_5$ having a refractive index of 1.68 (manufactured by Nissan Chemical Industries Ltd.) was coated on a PET film to a thickness of 5 μm on a dry basis. The coated PET film was put on and laminated to the above coated release film so that the coating surfaces faced each other, and the laminate was irradiated with an electron beam under conditions of 4 Mrad and 10 m/min to cure the electron beam curing resin blend. Then, the release film was peeled off from the laminate. The transparent functional film thus formed had a total light transmittance of 93% (the total light transmittance of the PET film as the substrate film being 87%), and the surface thereof was resistant to scratching with a nail. The above results show that the transparent functional film can serve as an antireflection film.

Figure 10:
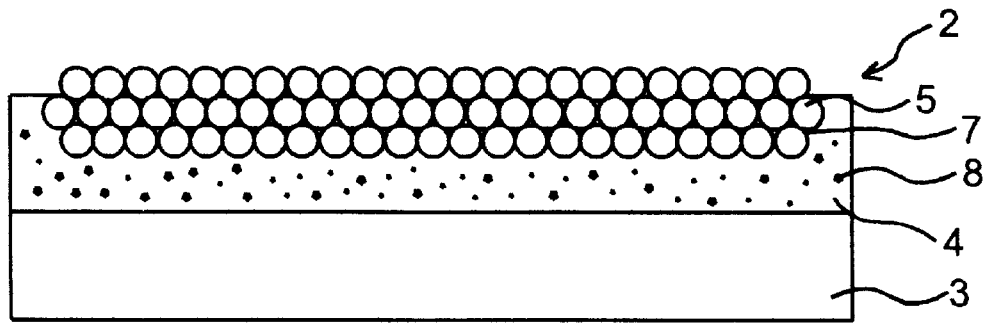
FIG. 10 is a cross-sectional view of a transparent functional film prepared in Example A12.

FIG. 10 shows a cross-sectional view of the transparent functional film formed in the present Example A12. The transparent functional film comprises a transparent plastic substrate film 3, a hard coat layer 4 coated thereon, the hard coat layer 4 comprising a resin blend of an electron beam curing pressure-sensitive adhesive with an electron beam curing resin, and a functional ultrafine particle layer 2 formed in a region from within the hard coat layer 4 to on the surface of the hard coat layer 4. As shown in FIG. 10, the functional ultrafine particle layer 2 is bound by the binding capability of each functional ultrafine particles 5 per se and a binder rein 7. The functional ultrafine particle layer 2 is not entirely embedded in the hard coat layer 4 of an electron beam curing resin blend, and the surface thereof is in direct contact with an air layer. Further, ultrafine particles 8 of Sb$_2$O$_5$ (refractive index: 1.68) are included in the hard coat layer 4.

Example A13

An antireflection film was formed in the same manner as in Example A11, except that Matt PET (X-45 (trade name) manufactured by Toray Industries, Inc.) having a finely uneven surface was used as the release film instead of the release film MC19 used in Example A11.

Figure 11:
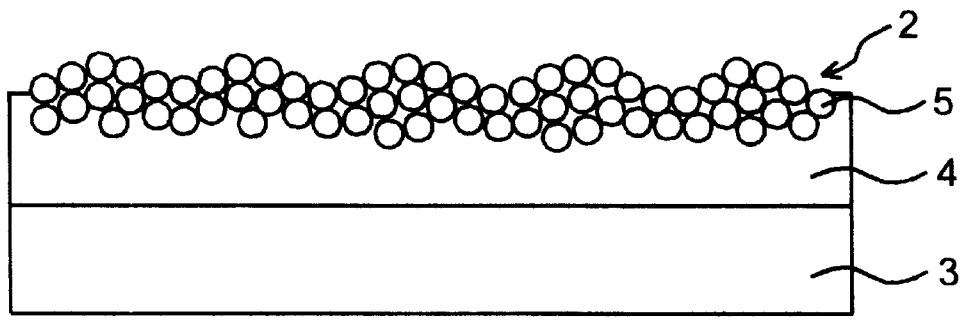
FIG. 11 is a cross-sectional view of a transparent functional film prepared in Example A13.

FIG. 11 shows a cross-sectional view of the transparent functional film formed in the present Example A13. The transparent functional film comprises a transparent plastic substrate film 3; a hard coat layer 4, coated on the transparent plastic substrate film 3, comprising a resin blend of an electron beam curing pressure-sensitive adhesive with an electron beam curing resin; and a functional ultrafine particle layer 2 formed in a region from within the hard coat layer 4 to on the surface of the hard coat layer 4. As shown in FIG. 11, the surface of the functional ultrafine particle layer 2 had a finely uneven pattern corresponding to that on the surface of the release film.

Example A14

A fluoroacrylate (Viscoat 8F (trade name) manufactured by Osaka Organic Chemical Industry Ltd.) was coated on the transparent functional film formed in the above Example A11 to a thickness of 100 nm. The coated film was then irradiated with an electron beam at 3 Mrad to full cure the resin layer, thereby forming a transparent functional film having an antireflection effect. The transparent functional film thus obtained had a total light transmittance of 95%.

Figure 12:
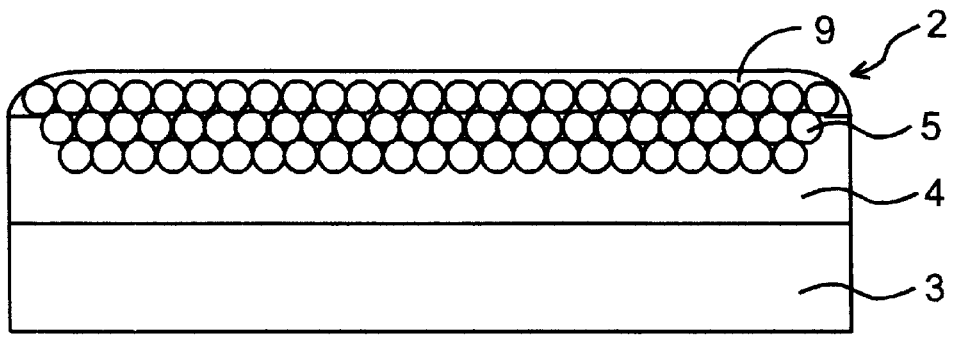
FIG. 12 is a cross-sectional view of a transparent functional film prepared in Example A14.

FIG. 12 shows a cross-sectional view of the transparent functional film formed in the present Example A14. The transparent functional film comprises: a transparent plastic substrate film 3; coated on the transparent plastic substrate film 3, a hard coat layer 4 of a resin blend of an electron beam curing pressure-sensitive adhesive with an electron beam curing resin; a functional ultrafine particle layer 2 formed in a region from within the hard coat layer 4 to on the surface of the hard coat layer 4; and, further, a layer 9 having a low refractive index provided on the functional ultrafine particle layer 2, thereby forming a transparent functional film having an antireflection effect.

The first and second transparent functional membranes or transparent functional films of the present invention contain functional ultrafine particles localized in and fixed to a hard coat layer in a region from the interface of the hard coat layer and an air layer to within the hard coat layer. Unlike the case of mere incorporation of functional ultrafine particles in a coating, the above constitution enables the properties of functional ultrafine particles to be easily developed even when the amount of the functional ultrafine particle used is small. Further, in the above constitution, the adhesion between the functional ultrafine particles and the hard coat layer is better than the case where a layer containing functional ultrafine particles is merely formed on a hard coat layer. The antireflection films of the present invention using, as functional ultrafine particles, ultrafine particles having a low refractive index or a high refractive index can also exhibit the same effects as attained by the above transparent functional films.

In the first and second antireflection films of the present invention, the refractive index of the hard coat layer is higher than that of ultrafine particles having a low refractive index and higher than that of a transparent plastic substrate film, which enhances the antireflection effect and can prevent light from being reflected by the interface of the hard coat layer and other layers.

In the third and fourth antireflection films of the present invention, the refractive index of the hard coat layer in its portion, where the ultrafine particles having a high refractive index is absent, is higher than that of the transparent plastic substrate film to such an extent as not to exceed the refractive index of the ultrafine particle layer having a high refractive index, which enhances the antireflection effect and can prevent light from being reflected by the interface of the hard coat layer and other layers.

Example B1

A 30 wt.% solution of an acrylic ester monomer (Kayarad DPHA (trade name) manufactured by The Nippon Kayaku Co., Ltd.) in methyl ethyl ketone was coated on a 50 µm-thick polyethylene terephthalate film (Lumirror T60 (trade name) manufactured by Toray Industries, Inc.) as a release film to a thickness of about 5 µm on a dry basis by means of roll coating, and methyl ethyl ketone was removed in an oven at 100° C. to dry the coating. The dried coating was irradiated with an electron beam under conditions of 175 kV and 5 Mrad using an electron beam irradiator (CURETRON® (trade name) manufactured by NISSHIN-HIGH VOLTAGE CO., LTD.) to cure the coating, thereby forming a hard coat layer. A urethane adhesive having the following composition was coated on the hard coat layer to a thickness of about 3 µm on a dry basis by gravure reverse coating. Ethyl acetate as a solvent was removed from the coating. Thereafter, the coating was laminated to a saponified triacetyl cellulose film (refractive index: 1.49) at 40° C. by means of a lamination roll. The laminate film was aged in an oven at 40° C. for 48 hr. The polyethylene terephthalate film was then peeled off from the aged laminate film, thereby transferring the hard coat layer to the triacetyl cellulose film.

An about 90 nm-thick SiO$_2$ film (refractive index: 1.46) was formed on the hard coat layer by vacuum deposition to prepare an antireflection sheet.

Composition of urethane adhesive:

| Composition of urethane adhesive: | | | |
|---|---|---|---|
| Main agent | Takelac A-310 (Manufactured by Takeda Chemical Industries, Ltd.) | 16 | parts by weight |
| Curing agent | Takenate A-3 (Manufactured by Takeda Chemical Industries, Ltd.) | 4 | parts by weight |
| Solvent | Ethyl acetate | 80 | parts by weight |

Example B2

The procedure of Example B1 was repeated to prepare an antireflection sheet, except that the following hard coat composition was used instead of the acrylic ester.

| Hard coat composition: | | | |
|---|---|---|---|
| Ultrafine particles of ZnO | ZS-300 (Manufactured by Sumitomo Cement Co., Ltd.) | 20 | parts by weight |
| Acrylic ester monomer | HN-5A (Manufactured by Mitsubishi Petrochemical Co., Ltd.) | 10 | parts by weight |
| Solvent | Toluene | 60 | parts by weight |
| | Methyl ethyl ketone | 10 | parts by weight |
| | Refractive index: 1.62 | | |

Example B3

An about 90 nm-thick SiO$_2$ film (refractive index: 1.46) was formed by vacuum deposition on a 50 µm-thick polyester film which had been treated with acryl-melamine (MC-19 (trade name) manufactured by REIKO CO., LTD.) as a release film. The hard coat composition used in Example A2 was coated on the SiO$_2$ film, and the resultant coating was cured in the same manner as in Example B1 to form a hard coat layer. Then, the resultant assembly was used to form a laminate film in the same manner as in Example B1 using the same urethane adhesive composition as used in Example B1. Thereafter, the release film was peeled off from the laminate film to prepare an antireflection sheet.

Example B4

The following composition for a layer having a high refractive index was coated on a 50 µm-thick polyester film which had been treated with acryl-melamine (MC-19 (trade name) manufactured by REIKO CO., LTD.) as a release film to a thickness of about 100 nm on a dry basis by means of slide coating, and the coating was irradiated with an electron beam under conditions of 175 kV and 2 Mrad using an electron beam irradiator (CURETRON® (trade name) manufactured by NISSHIN-HIGH VOLTAGE CO., LTD.) to cure the coating. An ionizing radiation curing resin composition (EXG40-9 (trade name) manufactured by Dainichiseika Color & Chemicals Manufacturing. Co., Ltd.; solid content: 30 wt.%) was coated thereon to a thickness of about 5 µm on a dry basis by roll coating. The solvent was removed from the coating in an oven at 100° C. The dried coating was irradiated by an electron beam under conditions of 175 kV and 5 Mrad to form a hard coat layer. Then, the resultant assembly was used to form a laminate film in the same manner as in Example B1 using the same urethane adhesive composition as used in Example B1. Thereafter, the release film was peeled off from the laminate, thereby transferring both the layer having a high refractive index and the hard coat layer to the triacetyl cellulose film. The following resin composition having a low refractive index was coated on the layer having a high refractive index to a thickness of about 100 nm on a dry basis by slide coating. The solvent contained in the coating was removed in an oven at 100° C. The dried coating was irradiated with ultraviolet rays at 300 mJ to cure the resin composition coating having a low refractive index, thereby preparing an antireflection sheet.

| Composition having a high refractive index; refractive index: 1.70–1.75 | | |
|---|---|---|
| Ultra-fine particles of ZnO | ZS-300 (Manufactured by Sumitomo Cement Co., Ltd.) | 3.9 parts by weight |
| Acrylic ester monomer | HN-5A (Manufactured by Mitsubishi Petrochemical Co., Ltd.) | 0.1 parts by weight |
| Solvent | Toluene | 96 parts by weight |

| Resin composition having a low refractive index; refractive index: 1.42 | |
|---|---|
| Fluororesin | 2.4 parts by weight |
| Acrylic ester monomer | 1.6 parts by weight |
| Solvent Methyl isobutyl ketone | 96 parts by weight |

Comparative Example B1

An antireflection sheet was prepared by forming an about 90 nm-thick $SiO_2$ film (refractive index: 1.46) on an about 80 μm-thick triacetyl cellulose film as a transparent substrate film by vacuum deposition.

Comparative Example B2

30 wt.% solution of an acrylic ester monomer (Kayarad DPHA (trade name) manufactured by The Nippon Kayaku Co., Ltd.) in methyl ethyl ketone was coated on an about 80 μm-thick saponified triacetyl cellulose film as a transparent substrate film to a thickness of about 5 μm on a dry basis by means of roll coating, and the methyl ethyl ketone contained in the coating was removed in an oven at 100° C. The dried coating was irradiated with an electron beam under conditions of 175 kV and 5 Mrad using an electron beam irradiator (CURETRON® (trade name) manufactured by NISSHIN-HIGH VOLTAGE CO., LTD.) to cure the coating, thereby forming a hard coat layer. An about 90 nm-thick $SiO_2$ film (refractive index: 1.46) was formed on the hard coat layer by vacuum deposition to prepare an antireflection sheet.

Comparative Example B3

An antireflection sheet was prepared in the same manner as in Example B1, except that an acrylic pressure-sensitive adhesive was used as the adhesive. The resultant antireflection sheet had a low bonding strength between the hard coat layer and the triacetyl cellulose film, and the fixation was unsatisfactory not only in an early stage but also after standing. Further, the antireflection sheet had a lowered pencil hardness.

The products prepared in the above examples and comparative example were subjected to measurement of the following properties and compared with one another for the properties.
(a) Reflectance: as measured on the surface of the antireflection sheet at 550 nm using a spectrophotometer.
(b) Pencil hardness: as measured by a method specified JIS K5400.
(c) Adhesion: as measured by a cross-cut test immediately after the preparation (initial adhesion) and after standing at 80° C. and 90% humidity for 1000 hr.

TABLE B1

| | Reflectance | Pencil hardness | Adhesion Initial | Adhesion After standing |
|---|---|---|---|---|
| Example 1 | 2.5% | 2H | 100/100 | 100/100 |
| Example 2 | 1.2% | 2H | 100/100 | 100/100 |
| Example 3 | 1.2% | 2H | 100/100 | 100/100 |
| Example 4 | 0.5% | 2H | 100/100 | 100/100 |
| Comparative Example 1 | 2.5% | 3B | 100/100 | 80/100 |
| Comparative Example 2 | 2.5% | 2H | 90/100 | 10/100 |
| Comparative Example 3 | 2.5% | H | 90/100 | 30/100 |

From Table B1, it is apparent that the antireflection sheets of the present invention have a high antireflection effect, excellent scratch resistance, and excellent adhesion of coating even after storage for a long period of time.

As is apparent from the results of the above examples and comparative examples, the antireflection sheets of the present invention give rise to neither cracking nor falling of the coating, i.e., are durable, and have scratch resistance.

In the antireflection film of the present invention, after layers such as a hard coat layer and a layer having a high refractive index are formed on a release film, these layers are transferred to a transparent substrate film. Therefore, it is possible to prevent the transparent substrate film from being damaged or colored by heating, application of an ionizing radiation, or the like during the production of the antireflection film.

Example C1

An $MgF_2$ sol having a refractive index of 1.4 (manufactured by Nissan Chemical Industries Ltd.) was coated on a release film (MC-19 (trade name) manufactured by REIKO CO., LTD.; the surface thereof having been treated with acryl-melamine) to a thickness of 100 nm, thereby forming a layer of ultrafine particles having a low refractive index. A ZnO sol having a refractive index of 1.9 (manufactured by Sumitomo Cement Co., Ltd.) was coated thereon to a thickness of 140 nm, thereby forming a layer of ultrafine particles having a high refractive index.

Separately, an ionizing radiation curing resin (EXG (trade name) manufactured by Dainichiseika Color & Chemicals Manufacturing. Co., Ltd.) was coated on an 80 μm-thick triacetyl cellulose film (hereinafter referred to as "TAC film") to a thickness of 5 μm on a dry basis. The coated triacetyl cellulose film was then put on the coated release film so that the coating surfaces faced each other. The assembly was subjected to press bonding to prepare a laminate which was then irradiated with an electron beam at 4 Mrad to cure the resin. Then, the release film was peeled off from the laminate. The transparent functional film thus obtained in the present Example C1 had a total light transmittance of 95.5% (the total light transmittance of the TAC film as the transparent plastic substrate film being 92%) and a pencil hardness of 2H.

Example C2

The procedure of Example C1 was repeated to form on a release film a layer of ultrafine particles having a low refractive index and a layer of ultrafine particles having a high refractive index. An ionizing radiation curing resin (HN (trade name) manufactured by Mitsubishi Petrochemical Co., Ltd.) was coated thereon to a thickness of 5 μm on a dry basis. The coated release film was irradiated with an electron beam at 4 Mrad to cure the resin. A TAC film was provided, and the above release film with an ultrafine particle layer and a resin layer being formed thereon, prepared in the above step, was laminated to the TAC film through a urethane adhesive layer [adhesive layer thickness: 3 pm on a dry basis; Takenate (trade name) manufactured by Takeda Chemical Industries, Ltd. + curing agent] in such a manner that the coating on the release film faced the TAC film. The laminate was aged at 40° C. for 3 days to full cure the adhesive layer. Thereafter, the release film was peeled off from the laminate. The resultant transparent functional film of the present Example C2 had a total light transmittance of 95.5% (the total light transmittance of the TAC film being 92%) and a pencil hardness of 2H.

Example C3

The procedure of Example C1 was repeated to form on a release film a layer of ultrafine particles having a low refractive index and a layer of ultrafine particles having a high refractive index. An $Sb_2O_5$ sol having a refractive index of 1.68 (manufactured by Nissan Chemical Industries, Ltd.) was further coated thereon to a thickness of 90 nm to form another layer of ultrafine particles having a low refractive index. An ionizing radiation curing resin (HN (trade name) manufactured by Mitsubishi Petrochemical Co., Ltd.) was coated thereon to a thickness of 5 μm on a dry basis. The coated release film was irradiated with an electron beam at 4 Mrad to cure the resin. A TAC film was provided, and the coated release film prepared in the above step was laminated to the TAC film through a urethane adhesive layer [adhesive layer thickness: 3 μm on a dry basis; Takenate (trade name) manufactured by Takeda Chemical Industries, Ltd. + curing agent] in such a manner that the coating on the release film faced the TAC film. The laminate was aged at 40° C. for 3 days to full cure the adhesive layer. Thereafter, the release film was peeled off from the laminate. The resultant transparent functional film of the present Example C3 had a total light transmittance of 95.5% (the total light transmittance of the TAC film being 92%) and a pencil hardness of 2H.

Example C4

Transparent functional films were prepared in the same manner as in Examples 1 to 3, except that a matt film having a finely uneven surface (X-45 (trade name) manufactured by Toray Industries, Inc.), which had been treated with acryl-melamine for imparting a releasability to the film, was used as the release film. The three transparent functional films of the present Example C4 each had a total light transmittance of 93%, a haze value of 9, and a pencil hardness of 2H.

Example C5

A ZnO sol,having a refractive index of 1.9 (manufactured by Sumitomo Cement Co., Ltd.) was coated on a release film (MC-19 (trade name) manufactured by REIKO CO., LTD.; the surface thereof having been treated with acryl-melamine) to a thickness of 140 nm to form a layer of ultrafine particles having a high refractive index. An $Sb_2O_5$ sol having a refractive index of 1.68 (manufactured by Nissan Chemical Industries Ltd.) was then coated thereon to a thickness of 90 nm to form a layer of ultrafine particles having a low refractive index. Thereafter, in the same manner as in Example C1, a transparent plastic substrate film was laminated to the coated release film to form a laminate which was then cured. The release film was peeled off from the laminate. A resin, having a low refractive index, of an acrylate composed mainly of a fluoropolymer (that is, an ionizing radiation curing fluororesin composition comprising 60 parts by weight of a fluorine-containing copolymer of 60 parts by weight of vinylidene fluoride with 20 parts by weight of hexafluoropropylene, and 20 parts by weight of tetrafluoroethylene and, mixed with the copolymer, 40 parts by weight of dipentaerythritol hexacrylate) (KZ (trade name) manufactured by Japan Synthetic Rubber Co., Ltd.) was further coated on the outermost layer to a thickness of 100 nm on a dry basis, and the resultant coating was irradiated with an electron beam at 3 Mrad to cure the coating. The transparent functional film of the present Example C2 thus obtained had a total light transmittance of 96% and a pencil hardness of 2H.

Example C6

An ionizing radiation curing fluororesin having a refractive index of 1.43 (that is, an ionizing radiation curing fluororesin composition comprising 60 parts by weight of a fluorine-containing copolymer of 60 parts by weight of a vinylidene fluoride with 20 parts by weight of hexafluoropropylene and 20 parts by weight of tetrafluoroethylene and, mixed with the copolymer, 40 parts by weight of dipentaerythritol hexacrylate) (KZ (trade name) manufactured by Japan Synthetic Rubber Co., Ltd.) was coated on a release film (MC-19 (trade name) manufactured by REIKO CO., LTD.; the surface thereof having been treated with acryl-melamine) to a thickness of 100 nm on a dry basis, and the resultant coating was irradiated with an electron beam at 1 Mrad to cure the coating, thereby forming a layer having a low refractive index.

A ZnO sol having a refractive index of 1.9 (manufactured by Sumitomo Cement Co., Ltd.) was coated on the layer having a low refractive index to a thickness of 140 nm to form a layer of ultrafine particles having a high refractive index. An $Sb_2O_5$ sol having a refractive index of 1.68 (manufactured by Nissan Chemical Industries Ltd.) was coated thereon to a thickness of 90 nm to form a layer of ultrafine particles having a low refractive index. Thereafter, in the same manner as in Example C1, a transparent plastic substrate film was laminated to the coated release film to form a laminate which was then cured. The release film was then peeled off. The transparent functional film of the present Example C6 thus obtained had a total light transmittance of 96% and a pencil hardness of 2H.

Example C7

A sol of ultrafine $MgF_2$ particles (manufactured by Nissan Chemical Industries Ltd.) was coated on the same release film as used in Example C1 to a thickness of 100 nm. A coating solution comprising a 20:1 mixture of a sol of ultrafine $TiO_2$ particles (manufactured by Sumitomo Cement Co., Ltd.) and an ionizing radiation curing resin (HN-5A (trade name) manufactured by Mitsubishi Petrochemical Co., Ltd.) was coated thereon to a thickness of 130 nm. The coated release film was then irradiated with an electron beam at 2 Mrad to cure the resin layer containing ultrafine $TiO_2$ particles. A coating solution comprising a 20:1 mixture of a sol of ultrafine ZnO particles (manufactured by Sumitomo Cement Co., Ltd.) and an ionizing radiation curing resin (HN-5A (trade name) manufactured by Mitsubishi Petrochemical Co., Ltd.) was coated on the cured resin layer to a thickness of 70 nm. The coating was then irradiated with an electron beam at 2 Mrad to cure the resin layer containing ultrafine ZnO particles. Further, an ionizing radiation curing resin (EXG (trade name) manufactured by Dainichiseika Color & Chemicals Manufacturing. Co., Ltd.) was coated thereon to a thickness of 5 μm on a dry basis. The coated release film was irradiated with an electron beam at 5 Mrad to cure the resin layer consisting of an ionizing radiation curing resin. A urethane adhesive (manufactured by Takeda Chemical Industries, Ltd.) was coated thereon to a thickness of 3 μm on a dry basis. The resultant coating was laminated to a saponified TAC film. The laminate was aged at 40° C. for 2 days. Thereafter, the release film was peeled off, thereby transferring the laminate, formed on the release film, to the saponified TAC film.

The transparent functional film of the present Example C7 thus obtained had a total light transmittance of 96% and a pencil hardness of 2H.

As is apparent from the above examples, in the transparent functional membranes and the transparent functional films according to the present invention, two or more types of functional ultrafine particles are separately aggregated, and the aggregates are integrated with each other and fixed in a region from the interface of the functional ultrafine particle layer and the resin layer to the interior of the resin layer. By virtue of the above constitution, the transparent functional membranes and the transparent functional films have the effect of easily developing the function of the functional ultrafine particles. In particular, the transparent functional films using a combination of ultrafine particle layers having different refractive indexes have a high total light transmittance, i.e., an excellent antireflection effect.

Further, the transparent functional films of the present invention have good adhesion between the resin layer and the transparent functional membrane.

What is claimed is:

1. A process for producing a transparent functional film, comprising the steps of:
   (1) forming a layer of functional ultrafine particles on a release film;
   (2) coating on a transparent plastic substrate film a resin composition for a hard coat layer;
   (3) laminating, by press-bonding, the coated transparent plastic substrate film prepared in said step (2), as such, when said resin composition for a hard coat layer contains no solvent, or after removing a solvent when said resin composition for a hard coat layer contains a solvent as a diluent, to the coated release film prepared in said step (1) so that the layer of functional ultrafine particles on the release film faces the resin composition coating for a hard coat layer on said transparent plastic substrate film, thereby causing said layer of functional ultrafine particles to be entirely or partly embedded in said resin composition coating for a hard coat layer; and
   (4) full curing said laminate prepared in said step (3) and peeling off said release film to transfer said layer of functional ultrafine particles to said transparent plastic substrate film.

2. The process according to claim 1, wherein entire or partial embedding of said layer of functional ultrafine particles in said resin for a hard coat layer is regulated by the viscosity of the resin for a hard coat layer, the kind of said resin, the surface tension of said resin, the particle diameter of said functional ultrafine particles, the degree of filling of said ultrafine particles, and the wettability of said functional ultrafine particles by said resin for a hard coat layer.

3. The process according to claim 1, wherein said resin composition for a hard coat layer is composed mainly of an ionizing radiation curing resin.

4. The process according to claim 1, wherein said resin composition for a hard coat layer is dry to the touch at the time of coating.

5. The process according to claim 1, wherein said resin composition for a hard coat layer comprises an ionizing radiation curing resin as a main component and a thermosetting resin.

6. The process according to claim 1, wherein said layer of functional ultrafine particles contains a binder resin in such an amount that said functional ultrafine particles are not entirely embedded in said binder resin.

7. The process according to claim 1, wherein the surface of said functional ultrafine particles has a hydrophobic nature which has been imparted by a coupling agent.

8. The process according to claim 1, wherein said release film has a finely uneven surface.

9. A process for producing an antireflection film, comprising the steps of:
   (1) forming on a release film a layer of ultrafine particles having a high refractive index;
   (2) coating on a transparent plastic substrate film a resin composition for a hard coat layer, having a lower refractive index than said layer of ultrafine particles having a high refractive index;
   (3) laminating, by press-bonding, the coated transparent plastic substrate film prepared in said step (2), as such, when said resin composition for a hard coat layer contains no solvent, or after removing a solvent when said resin composition for a hard coat layer contains a solvent as a diluent, to the coated release film prepared in said step (1) so that the layer of ultrafine particles having a high refractive index on the release film faces the resin composition coating for a hard coat layer on said transparent plastic substrate film, thereby causing said layer of ultrafine particles having a high refractive index to be entirely or partly embedded in said resin composition coating for a hard coat layer;
   (4) full curing said laminate prepared in said step (3) to form a hard coat layer and peeling off said release film to transfer said layer of ultrafine particles having a high refractive index to said transparent plastic substrate film; and
   (5) forming a layer having a low refractive index on said hard coat layer.

10. The process according to claim 9, wherein entire or partial embedding of said layer of ultrafine particles having a high refractive index in said resin for a hard coat layer is regulated by the viscosity of the resin for a hard coat layer, the kind of said resin, the surface tension of said resin, the particle diameter of said ultrafine particles having a high refractive index, the degree of filling of said ultrafine particles having a high refractive index, and the wettability of said ultrafine particles having a high refractive index by said resin for a hard coat layer.

11. The process according to claim 9, wherein said resin composition for a hard coat layer is composed mainly of an ionizing radiation curing resin.

12. The process according to claim 9, wherein said resin composition for a hard coat layer is dry to the touch at the time of coating.

13. The process according to claim 9, wherein said resin composition for a hard coat layer comprises an ionizing radiation curing resin as a main component and a thermosetting resin.

14. The process according to claim 9, wherein said layer of ultrafine particles having a high refractive index contains a binder resin in such an amount that said ultrafine particles are not entirely embedded in said binder resin.

15. The process according to claim 9, wherein the surface of said ultrafine particles having a high refractive index has a hydrophobic nature which has been imparted by a coupling agent.

16. The process according to claim 9, wherein said release film has a finely uneven surface.

17. The process according to claim 9, wherein said layer having a low refractive index is formed by coating.

18. The process according to claim 9, wherein said layer having a low refractive index is formed by a vapor growth process.

* * * * *